US010162900B1

(12) United States Patent
Chatterjee et al.

(10) Patent No.: US 10,162,900 B1
(45) Date of Patent: Dec. 25, 2018

(54) METHOD AND SYSTEM OF AN OPINION SEARCH ENGINE WITH AN APPLICATION PROGRAMMING INTERFACE FOR PROVIDING AN OPINION WEB PORTAL

(71) Applicant: MOODWIRE, INC., Menlo Park, CA (US)

(72) Inventors: Manjirnath Chatterjee, San Francisco, CA (US); Erick Watson, Sammamish, WA (US); Kevin Perillo, San Jose, CA (US); Rabia Turan, Redwood Shores, CA (US)

(73) Assignee: Interos Solutions Inc., Arlington, VT (US)

( * ) Notice: Subject to any disclaimer, the term of this patent is extended or adjusted under 35 U.S.C. 154(b) by 200 days.

(21) Appl. No.: 15/065,559

(22) Filed: Mar. 9, 2016

Related U.S. Application Data

(60) Provisional application No. 62/130,446, filed on Mar. 9, 2015, provisional application No. 62/130,436, filed on Mar. 9, 2015.

(51) Int. Cl.
*G06F 17/30* (2006.01)
*H04L 12/58* (2006.01)

(52) U.S. Cl.
CPC .... *G06F 17/30867* (2013.01); *G06F 17/3053* (2013.01); *G06F 17/30554* (2013.01); *G06F 17/30675* (2013.01); *H04L 51/32* (2013.01)

(58) Field of Classification Search
CPC . G06F 17/30867; G06F 17/30; G06F 17/3053
USPC .................................................. 707/600–899
See application file for complete search history.

(56) References Cited

U.S. PATENT DOCUMENTS 8,504,550 B2 * 8/2013 Hall ....................... H04L 51/32
707/710

\* cited by examiner

*Primary Examiner* — Isaac M Woo
(74) *Attorney, Agent, or Firm* — Dentons US LLP

(57) ABSTRACT

Embodiments of the present disclosure are directed to methods, computer program products, computer systems for providing a computing search platform for conducting opinion searches over the Internet concerning aggregated social media electronic messages about public opinions and public sentiments for a wide variety of matrices, such as social media posting of a particular industry over a specified time period, electronic social media posting on the public sentiments, public buzz, and public mood. Methods and systems of the present disclosure are directed to collecting and analyzing unstructured social media messages and correlating with structured entity representations in order to discern amount of interest in (buzz) and feelings about (mood) the real world organizations, people, products, and locations described by those entity representations transforming the data into a readily understandable visual display of the aggregated results on a computer display.

18 Claims, 72 Drawing Sheets

"Entity Comparison View"

Opinion Search

BMW i8

654 — About & Image

656 — Sentiment and Buzz

658 — Related Links — both moodwire & off property.

Perhaps make mini table, clickable, with sentiment for each linked item (if on property).

660 — News Stories and Quotes

662 — Syndicated Content

664 — Comments

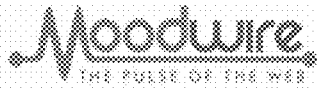

Opinion Search See what people think.

[Enter a query]

Found: Air Transportation

Database-Record Type: Industry or Group
Documents found (last 30 days) with Air Transportation: 740772

About
The airline industry is divided into four categories by the U.S. Department of Transportation: International – Those with 130+ seat planes that can take passengers just about anywhere in the world. These companies typically have annual revenues of > USD $1 Billion. National – These airlines seat 100-150 people and have revenues between USD $100M and $1B. Regional – Companies with revenues < $100M that focus on short-haul flights. Cargo – These are airlines generally transport goods. Moodwire covers all four categories. We scan for social media mentions and sentiment, then perform TypeRank™ analysis across pricing, ticketing, food quality, crew service, cabin seating and other topics of interest.

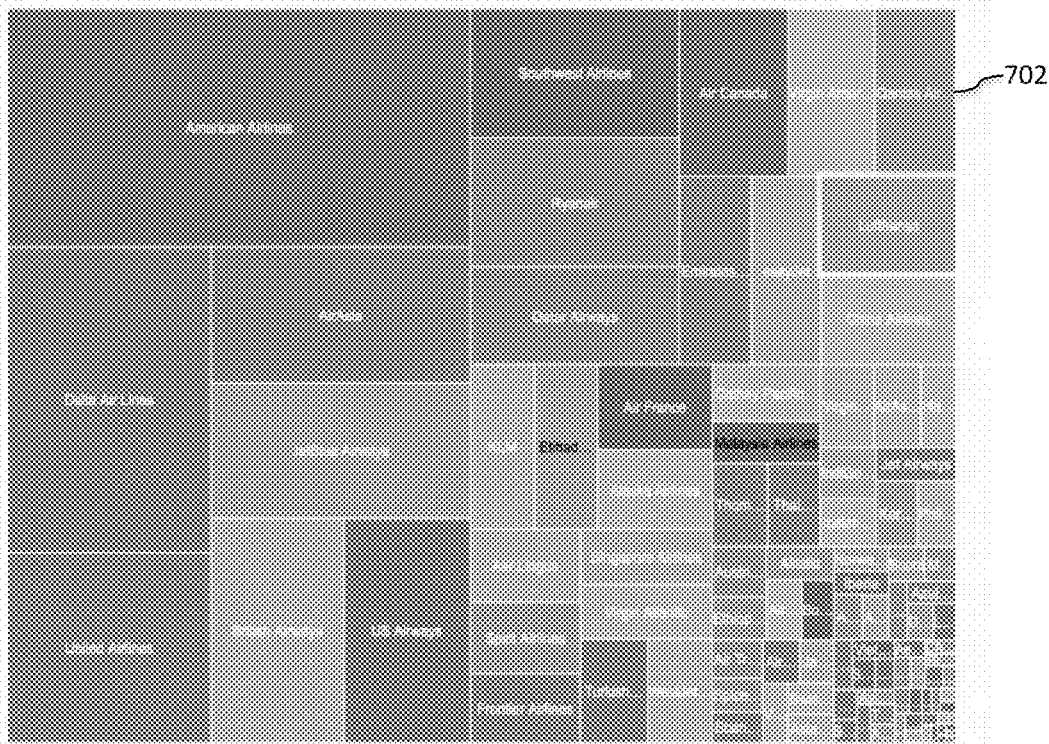

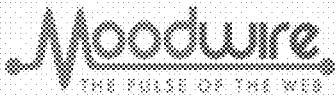

Opinion Search  See what people think.

[Enter a query]

Found: Motor Vehicles

Database-Record Type: Industry or Group
Documents found (last 30 days) with Motor Vehicles: 2729696

About
Moodwire Motor Vehicles covers major and high-end auto makers. We cover car brands that are in production for global distribution and scan for sentiment, mentions, and perform textual grouping across purchasing process, safety, price, performance, quality, warranty and other topics. Key sources of information on auto manufacturers are Twitter, Facebook, and a multitude of data feeds that provide coverage across a large swath of both consumer opinion and financial news coverage.

FIG. 39B

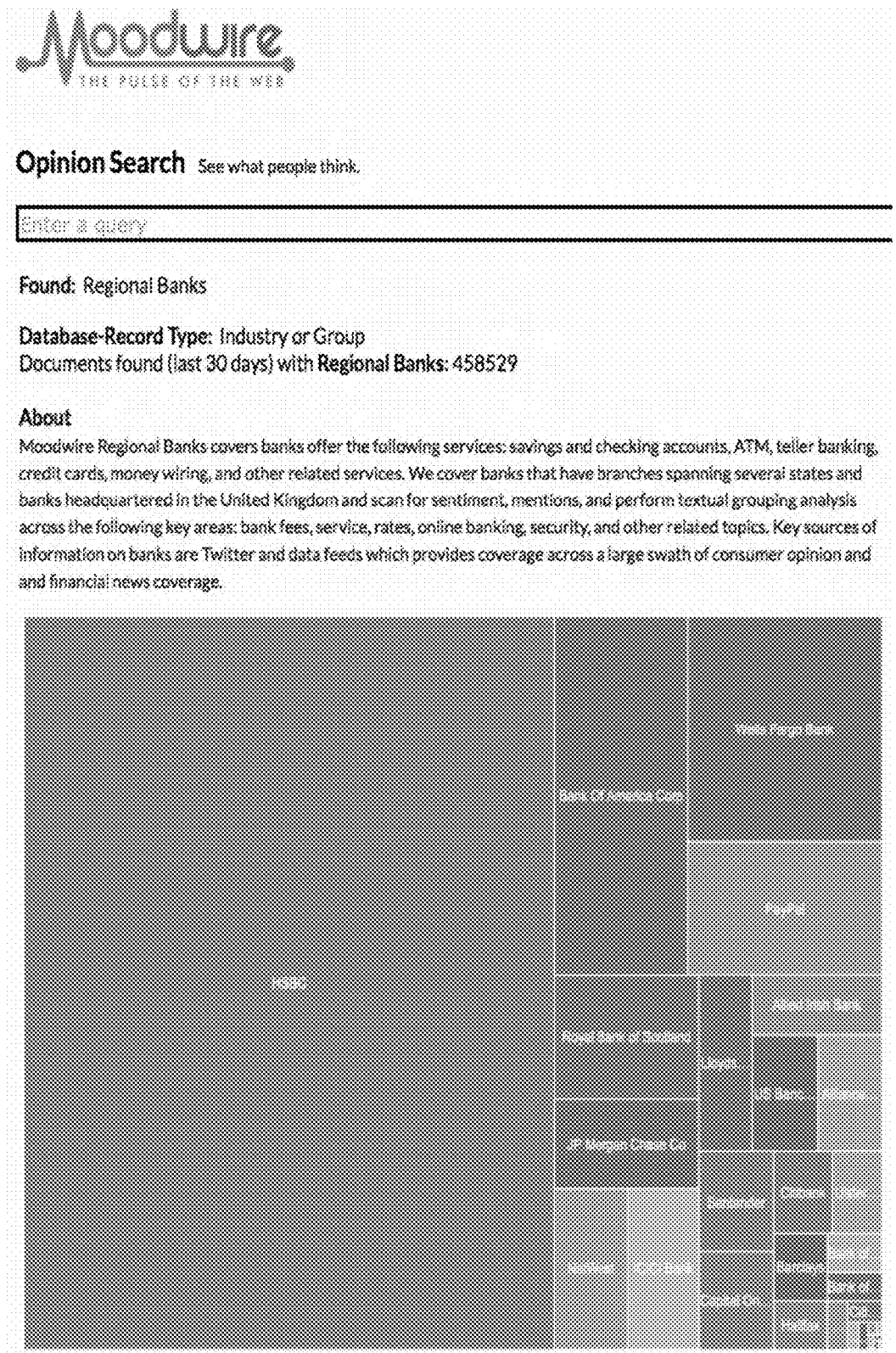

Moodwire
THE PULSE OF THE WEB

Opinion Search See what people think.

Enter a query

Found: Regional Banks

Database-Record Type: Industry or Group
Documents found (last 30 days) with Regional Banks: 458529

About
Moodwire Regional Banks covers banks offer the following services: savings and checking accounts, ATM, teller banking, credit cards, money wiring, and other related services. We cover banks that have branches spanning several states and banks headquartered in the United Kingdom and scan for sentiment, mentions, and perform textual grouping analysis across the following key areas: bank fees, service, rates, online banking, security, and other related topics. Key sources of information on banks are Twitter and data feeds which provides coverage across a large swath of consumer opinion and and financial news coverage.

FIG. 39C

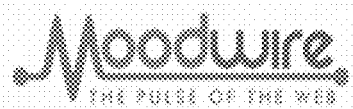

Opinion Search  See what people think.

`Enter a query`

Found: US State Capitals

Database-Record Type: Industry or Group
Documents found (last 30 days) with US State Capitals: 39750

About
US State Capitals tracks the buzz and sentiment relevant to each of the US State Capitals. Topics that affect US State Capitals are often related to state capital's political climate, the local economy, and quality and cost of living.

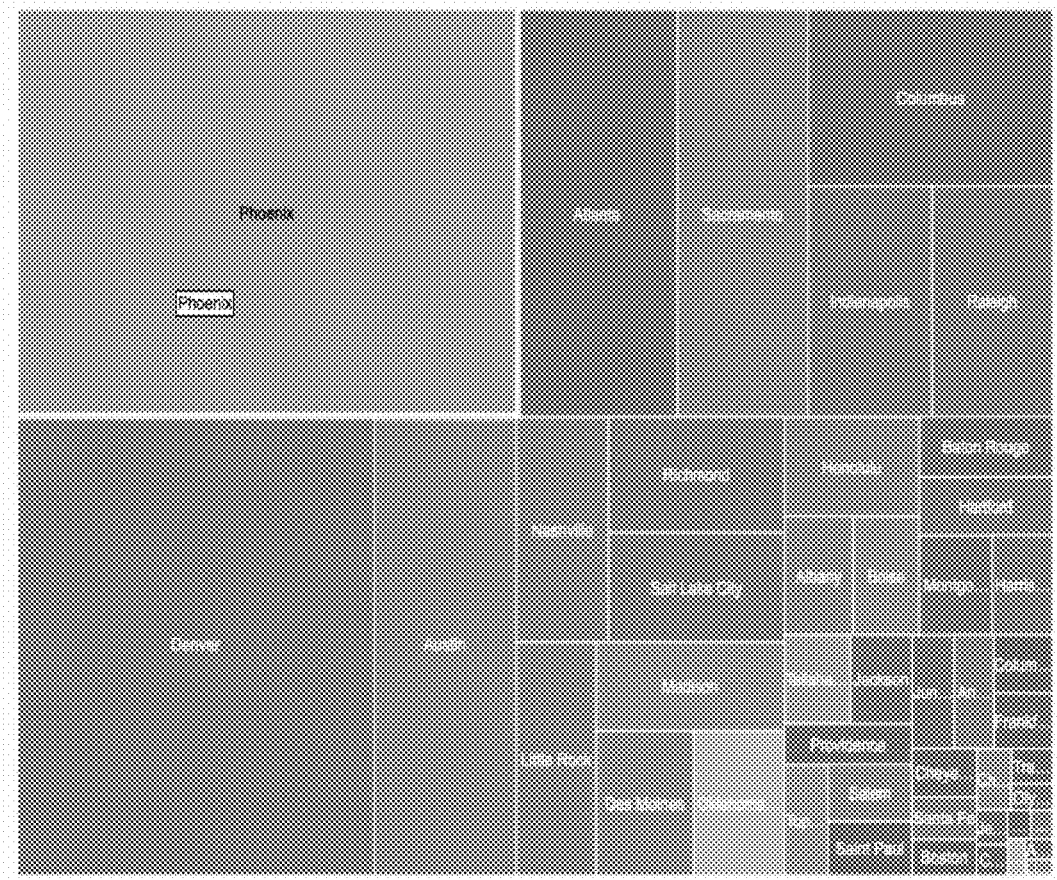

FIG. 39D

THE PULSE OF THE WEB

Opinion Search  See what people think.

[Enter a query]

Found: S&P 500 Index

Database-Record Type: Industry or Group
Documents found (last 30 days) with S&P 500 Index: 8815043

About
The Moodwire Standard & Poor (S&P) 500 Index covers social media and data feeds pertaining to all companies in the S&P 500 Index. The Index is comprised of five hundred (500) major "blue chip" companies across numerous industry groups. Moodwire monitors the entire Standard & Poor S&P500 set of companies for overall BuzzRank™, as well as MoodRank™ social sentiment and other analytics.

FIG. 39E

Opinion Search See what people think.

Enter a query

Found: NBA Teams

Database-Record Type: Industry or Group
Documents found (last 30 days) with NBA Teams: 24793

About
The National Basketball Association (NBA) is the pre-eminent men's professional basketball league in North America, and is widely considered to be the premier men's professional basketball league in the world. It has 30 franchised member clubs (29 in the United States and 1 in Canada), and is an active member of USA Basketball (USAB), which is recognized by FIBA (also known as the International Basketball Federation) as the national governing body for basketball in the United States. The NBA is one of the four major North American professional sports leagues. NBA players are the world's best paid sportsmen, by average annual salary per player.

FIG. 39F

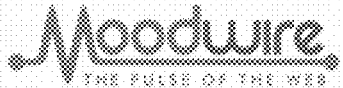

Opinion Search  See what people think.

`Enter a query`

Found: NFL Teams

Database-Record Type: Industry or Group
Documents found (last 30 days) with NFL Teams: 25974

About
The National Football League (NFL) is a professional American football league that constitutes one of the four major professional sports leagues in North America. It is composed of 32 teams divided equally between the National Football Conference (NFC) and the American Football Conference (AFC). The highest professional level of the sport in the world, the NFL runs a 17-week regular season from the week after Labor Day to the week after Christmas, with each team playing sixteen games and having one bye week each season. Out of the league's 32 teams, six (four division winners and two wild-card teams) from each conference compete in the NFL playoffs, a single-elimination tournament culminating in the Super Bowl, played between the champions of the NFC and AFC. The champions of the Super Bowl are awarded the Vince Lombardi Trophy. Various other awards exist to recognize individual players and coaches. Most games are played on Sunday afternoons; some games are also played on Mondays and Thursdays during the reg

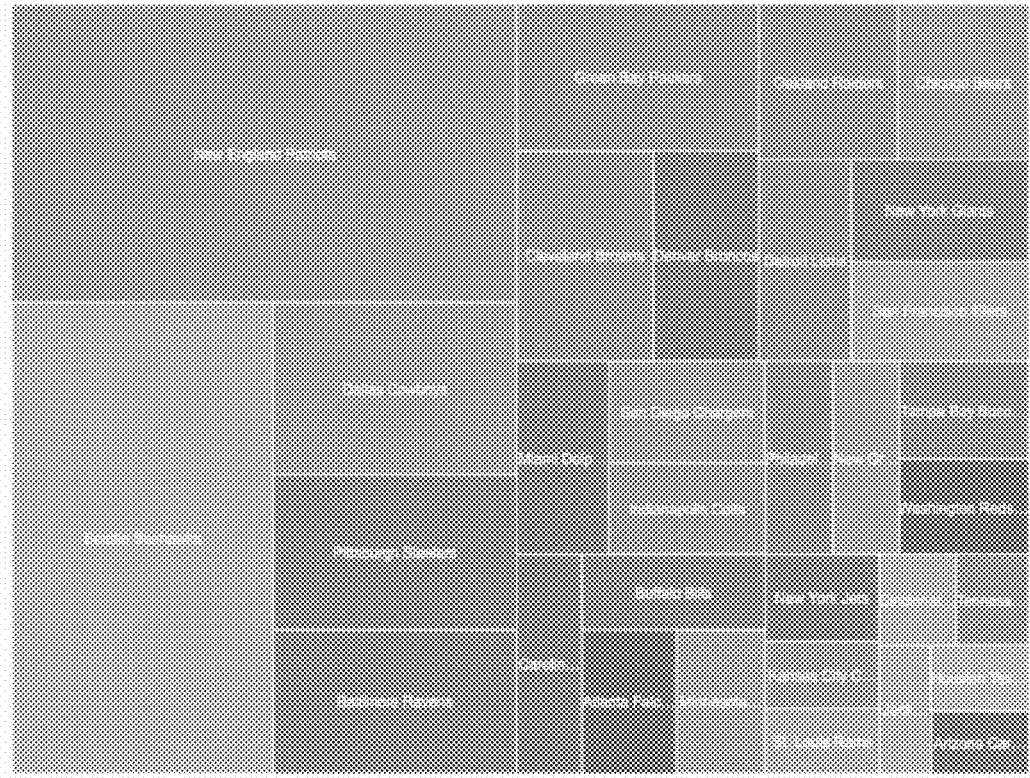

FIG. 39G

Opinion Search  See what people think.

[Enter a query]

Found: NHL Teams

Database-Record Type: Industry or Group
Documents found (last 30 days) with NHL Teams: 16322

About
The National Hockey League is a professional ice hockey league composed of 30 member clubs: 23 in the United States and 7 in Canada. Headquartered in New York City, the NHL is widely considered to be the premier professional ice hockey league in the world, and one of the major professional sports leagues in the United States and Canada. The Stanley Cup, the oldest professional sports trophy in North America, is awarded annually to the league playoff champion at the end of each season. The National Hockey League was organized on November 26, 1917, in Montreal, Quebec, Canada, after the suspension of operations of its predecessor organization, the National Hockey Association (NHA), which had been founded in 1909. It started with four teams (all based in Canada) and, through a series of expansions, contractions, and relocations, is now composed of thirty active franchises. The "nation" referred to by the league's name was Canada, although the league has now been binational since 1924 when its first team in the

FIG. 39H

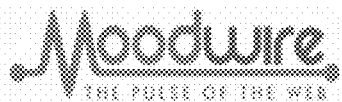

Opinion Search  See what people think.

[Enter a query]

Found: MLB Teams

Database-Record Type: Industry or Group
Documents found (last 30 days) with MLB Teams: 16189

About
Major League Baseball (MLB) is a professional baseball organization that constitutes one of the four major professional sports leagues in North America. It is the oldest league of the four. Teams play in the American League (AL) and National League (NL), which operated as separate legal entities from 1901 and 1876 respectively. In 2000, the leagues merged into a single organization led by the Commissioner of Baseball. The organization oversees minor league baseball leagues, which operate about 240 teams affiliated with the major-league clubs. With the International Baseball Federation, the league also manages the International World Baseball Classic tournament.

FIG. 39I

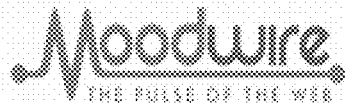
THE PULSE OF THE WEB

Opinion Search  See what people think.

[ Enter a query ]

Found: Actors

Database-Record Type: Industry or Group
Documents found (last 30 days) with Actors: 10360130

About
The Moodwire Actors category lists a selection of people, (both male and female), portraying a character in a dramatic or comic production in film, television, theatre, radio and live performance. Buzz and sentiment are typically expressed by viewers, fans, and critics.

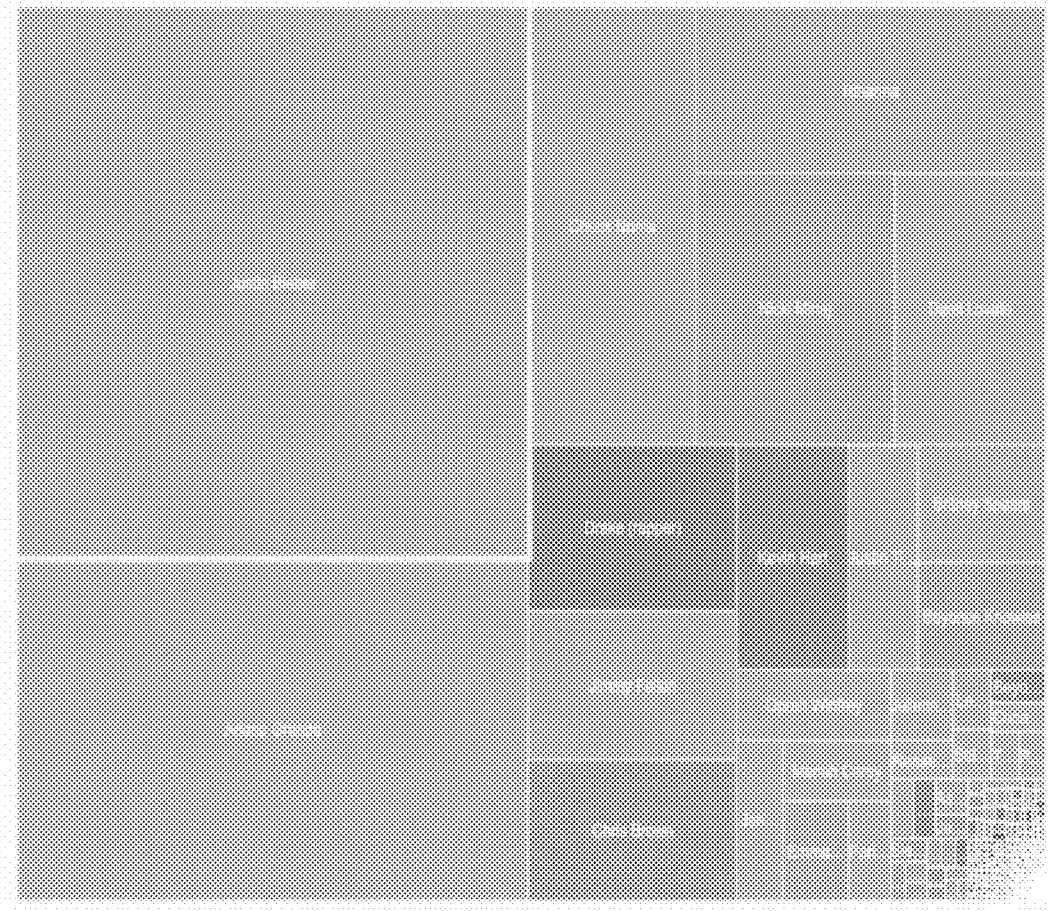

FIG. 39J

Opinion Search See what people think.

Enter a query

Found: Singers

Database-Record Type: Industry or Group
Documents found (last 30 days) with Singers: 22842132

About
Singers covers solo music artists as well as the singers of a band. Singers also includes singers from all genres from rock, heavy-metal, pop, country, jazz, religious, alternative, coffee-house, folk, classical, and other styles.

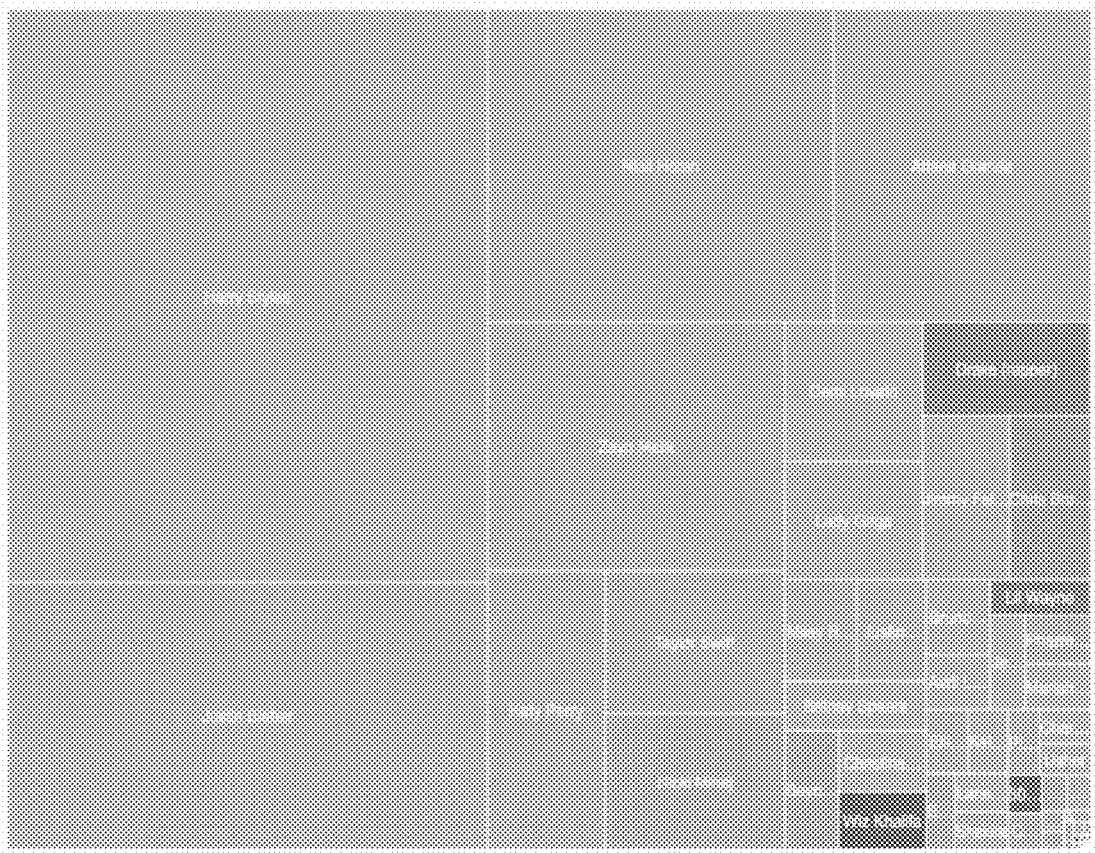

FIG. 39L

THE PULSE OF THE WEB

Opinion Search  See what people think.

`Enter a query`

Found: Pro Bull Riders

Database-Record Type: Industry or Group
Documents found (last 30 days) with Pro Bull Riders: 36166

About
Headquartered in Colo., the Professional Bull Riders, Inc. was created in 1992 when a group of 20 visionary bull riders broke away from the traditional rodeo scene seeking mainstream attention for the sport of professional bull riding. They felt that, as the most popular event at a rodeo, bull riding deserved to be in the limelight and could easily stand alone. Each rider invested a hard-earned $1,000, a few of them borrowing from family and friends, to start the PBR. In early 2007, Spire Capital Partners finalized a deal with the PBR Board of Directors to acquire the interests of many of the retired founding riders and invest in the growth of the organization. Those first 20 bull riders had turned their $1,000 into millions. Owned today by 44 cowboys, management and Spire Capital, the PBR continues to establish milestones in organizational revenue, bull rider earnings, record breaking performances, and media attention. It still relishes the title of being the fastest growing sport in the country.

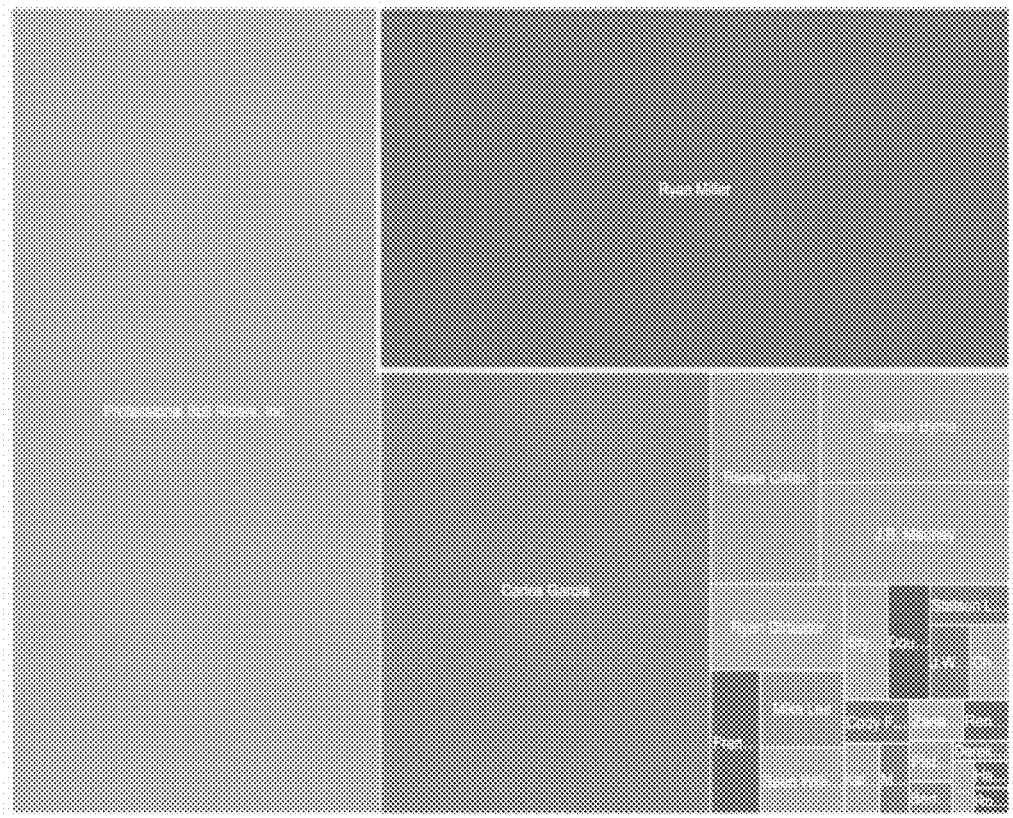

FIG. 39N

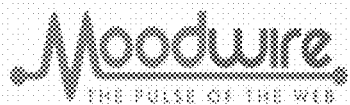

Opinion Search  See what people think.

[ Enter a query ]

Found: Hotels & Motels

Database-Record Type: Industry or Group
Documents found (last 30 days) with Hotels & Motels: 321556

About
The lodging industry includes companies that provide lodging and related services to travelers. Facilities are independently, franchised, or corporate owned and operated. The top five brands in 2013, based on numbers of beds, include IHG, Hilton Hotels, Marriott International, Wyndham Hotel Group, and Choice.

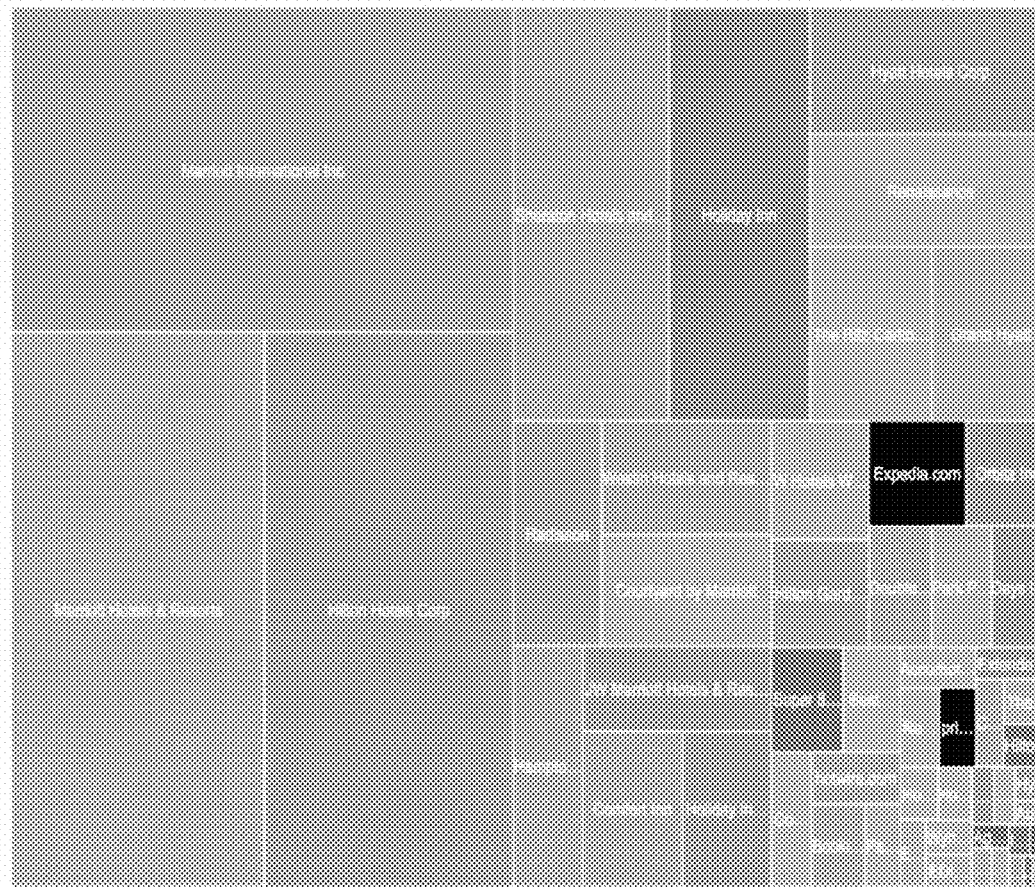

FIG. 39O

METHOD AND SYSTEM OF AN OPINION SEARCH ENGINE WITH AN APPLICATION PROGRAMMING INTERFACE FOR PROVIDING AN OPINION WEB PORTAL

CROSS REFERENCE TO RELATED PATENT APPLICATION

This application is related to concurrently filed and co-pending U.S. patent application Ser. No. 15/065,594, entitled "Method and System of an Opinion Search Engine with an Application Programming Interface for Providing an Opinion Web Portal" by Chatterjee et al., commonly owned by the assignee of this application and herein incorporated by reference in its entirety. This application claims priority to U.S. Provisional Application Ser. No. 62/130,446 entitled "Moodwire Datavana API," filed on 9 Mar. 2015, and U.S. Provisional Application Ser. No. 62/130,436 entitled "Moodwire Web Portal Specification," filed on 9 Mar. 2015, the disclosures of which are incorporated herein by reference in their entireties.

TECHNICAL FIELD

The present invention relates generally to computer searching technologies, and more particularly, providing a search platform with an application program interface (API) that processes voluminous amount of unstructured and structured social media textual data and displays aggregated public opinions in a visual transformed structural representation on a display.

BACKGROUND OF INFORMATION

Search engines have become a popular and nearly indispensable tool as a query method for quickly finding facts and data about the myriad of topics that can be retrieved on both public and private computer networks globally. These search engines serve as a central location to locate objective data in documents, such as web pages or published papers, as well as various public and private data sources. These commercially available search engines typically also return related salient pieces of information about the topic under consideration, as well as a generic description of the topic itself. For example, a computer search for the celebrity "Justin Bieber" on either search engine http://www.google.com or http://www.bing.com will return not only facts and data about Mr. Bieber, but also recent news articles about him, photographs of him, playlists containing his published recordings, lists of movies that he starred in, and other information relating to him.

Conventional search engines have been surprisingly slow in adapting to and incorporating the rapid advances in social media posts that have become the fabric of today's society and a reflection of general public sentiments on hot topics. Although search engines return useful facts and data about the topic under consideration, they suffer from drawbacks and do not return any of the following: human opinion about the topic under consideration; how much popular "buzz" exists—the total number of results returned, segregated by positive, negative, and neutral sentiment expressed about the topic under consideration; positivity, as expressed by favorable human sentiment, towards the topic under consideration; negativity, as expressed by unfavorable human sentiment, towards the topic under consideration; how public opinion, both positive and negative, about the topic under consideration has changed over time; and user feedback, including the ability for users to "vote up" or "vote down" a given search result.

In parallel with developments in search engine technology, there have been numerous conventional developments in sentiment analysis pertaining to natural language processing methods and software that can identify positive or negative human sentiment in a given sample of text. Various well-known methods exist for deriving such information, such as traditional polling, online survey tools, automated phone calls to survey recipients, etc., as well as numerous commercial and open source software packages that can be applied to measure and score the human sentiment contained in written text, speech, and other embodiments of natural language.

Prior sentiment analysis techniques possess disadvantages, which include missing several useful features. These techniques do not apply to the presentation of online advertisements. Current online advertisements do not incorporate human sentiment as a measure of ad relevance or context.

Accordingly, it is desirable to have a system and method that provide an opinion search platform that sources, analyzes, and computes large amounts of unstructured and structured social media electronic messages from various sources, featuring natural language processing with sentiment analysis and entity groupings, to produce one or more visual representations to reflect the opinion search result.

SUMMARY OF THE INVENTION

Embodiments of the present disclosure are directed to methods, computer program products, computer systems for providing a computing search platform for conducting opinion searches over the Internet concerning aggregated social media electronic messages about public opinions and public sentiments for a wide variety of matrices, such as social media posting of a particular industry over a specified time period, electronic social media posting on the public sentiments, public buzz, public mood on US senators, or electronic social media textual data of the upcoming US presidential election of Republican and Democratic candidates. Methods and systems of the present disclosure for collecting and analyzing unstructured social media messages and correlating with structured entity representations in order to discern amount of interest in (buzz) and feelings (mood) about the real world organizations, people, products, and locations described by those entity representations transforming the data into a readily understandable visual display of the aggregated results on a computer display. An opinion search engine serves as the backbone in complex data crunching of thousands or millions of electronic social media messages, which an opinion search engine detects, extracts, computes, and correlates both unstructured textual data and structured textual data. In response to a search query submitted through an opinion search bar, the opinion search engine processes the query to return an aggregated result in a transformed visual representation of the selected one or more entities, as well as public buzz, public mood, and other public sentiments on one or more related products, to the user's computer display.

One embodiment of the opinion search engine includes a storm check module, a data acquisition module, a visualization module, a data access module, an analytics module, a search/index module, and a storage module or database. In some embodiments, the opinion search is based on the user generated contents posted on various social media sites, such as Facebook, Twitter, Reddit, and others. The analytics module in the opinion search engine comprises a spam filter module, an entity identification/extraction module, a sentiment module, an attribute extraction module, an article quality scoring module, and a duplicate rejecter module. In other embodiments, each analytical engine in the opinion search engine generates an entity, topic, or sentiment score for computing an aggregated score by applying a weighted voting scheme. Each analytical engine, including entity extraction component, sentiment extraction component, or topic extraction component, associates each electronic social media post with a score value and a confidence value.

Broadly stated, a computer-implemented method for opinion processing and visualization for display on a computer screen, comprising collecting information, by a data acquisition module, on entities from structured and unstructured data sources; combining, by the data acquisition module voluminous structured data from the structure data sources into a normalized representation to be stored in an entity database, each structured data being normalized and encoded with one or more attribute for linking to the original structured data source; normalizing the unstructured data from the unstructured data source into a post database; retrieving and linking, by the analytics module, each post data from the post database to an entity in the entity database; determining by the analytics module, the sentiment type associated with each electronic post linked to a particular entity; scoring by the analytics module, the quality of each electronic post based on a predetermined criteria; comparing, by a visualization module, one or more entities over time based on different attributes including buzz ranking and mood ranking, wherein the buzz ranking and the mood ranking for a particular entity are scored relative to the confined number of entities in the entity database; and displaying the comparing result of the one or more entities by transforming the comparing data into different visualization components to form a layout on a computer screen that produces the optimal visualization based on the search query. A system for opinion processing and visualization for display on a computer screen, comprising a data acquisition module configured to collection information on entities from structured and unstructured data sources, the data acquisition module configured to combine voluminous structured data from the structure data sources into a normalized representation to be stored in an entity database, each structured data being normalized with encoded one or more attribute for linking to the original structured data source, the data acquisition module configured to normalize the unstructured data from the unstructured data source into a post database; an analytics module configured to retrieve and link each post data from the post database to an entity in the entity database, the analytics module configured to determine the sentiment type associated with each electronic post linked to a particular entity, the analytics module configured to score the quality of each electronic post based on a predetermined criteria; and a visualization module configured to compare one or more entities over time based on different attributes, including buzz ranking and mood ranking, wherein the buzz ranking and the mood ranking for a particular entity are scored relative to the confined number of entities in the entity database.

The structure and methods of the present invention are disclosed in the detail description below. This summary does not purport to define the invention. The present invention contains different embodiments, which may be applied to various different environments. Variations upon and modifications to these embodiments are provided for by the present invention, which is limited only by the claims. These and other embodiments, features, aspects, and advantages of the invention are better understood with regard to the following description, appended claims, and accompanying drawings.

BRIEF DESCRIPTION OF THE DRAWINGS

The disclosure is described with respect to specific embodiment thereof, and reference will be made to the drawing, in which:

FIG. 25 is a graphical diagram illustrating another sample webpage of the syndicated content with threaded comments in the opinion search engine showing US senators in accordance with the present disclosure.

FIG. 36 is a graphical diagram illustrating an embodiment of the opinion search result displayed with both the sentiment summary and the computed advertisements related to the search query in accordance with the present disclosure.

FIG. 37 is a graphical diagram illustrating an embodiment of the opinion search engine result with the sentiment summary and a related advertisement in accordance with the present disclosure.

FIG. 39A is an embodiment of the search result for air transportation; FIG. 19G is an embodiment of the search result for NFL teams; FIG. 30K is an embodiment of the search result for celebrities; FIG. 39O is an embodiment of the search result for hotels and motels.

DETAILED DESCRIPTION

Figure 1:
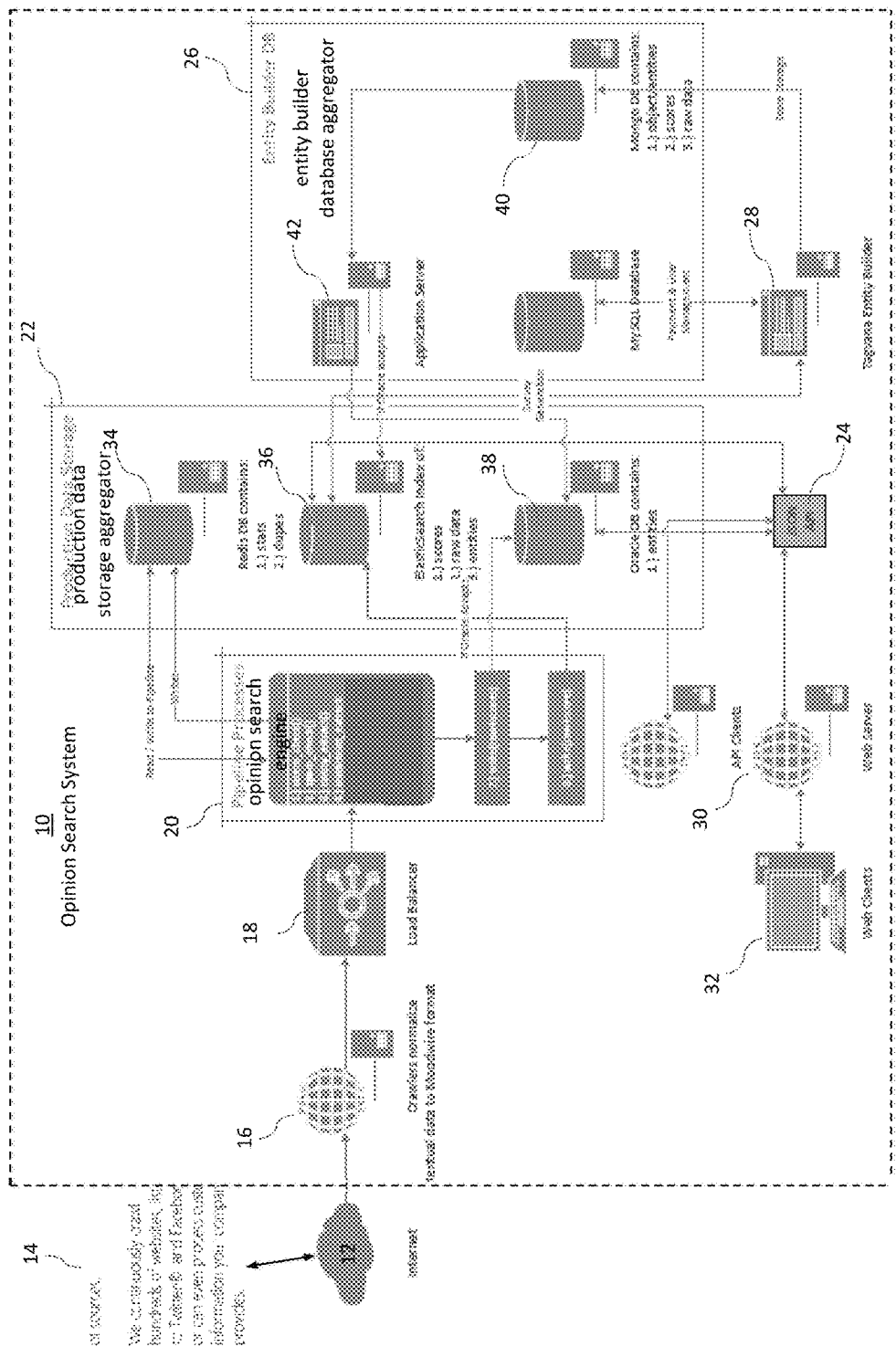
FIG. 1 is a system diagram illustrating one embodiment of an opinion search system coupled to a communication network for sourcing and computing social media electronic messages in accordance with the present disclosure.

A description of structural embodiments and methods of the present invention is provided with reference to FIGS. 1-41. It is to be understood that there is no intention to limit the invention to the specifically disclosed embodiments but that the invention may be practiced using other features, elements, methods, and embodiments. Like elements in various embodiments are commonly referred to with like reference numerals. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The following definitions apply to the elements and steps described herein. These terms may likewise be expanded upon.

Application Programming Interface (API)—refers to a programmatic interface for reading sentiment data from the Moodwire cloud service.

Article—any electronic message collected from news web sites, Twitter tweets, Social Media sites such as Facebook, product review sites, blog sites, internal corporate communications, call center logs, etc.

Article Buzz Score—computed by the cumulative buzz scores of all the entities identified in the article over an adjustable period of time (default is last 30 days).

Article Mood Score—computed by the cumulative mood or sentiment measurement of all the entities mentioned in the article together with the mood or sentiment expressed in the article text.

Article Quality Score—refers to combining ranks of articles by length, number of images, quality of the source (i.e. New York Times vs. Gawker, Tweet by heavily followed author vs. lightly followed author), total buzz on all discovered entities, number of related entities, and buzz score of related entities.

Article Source Type—refers to general classification of an article by its source. Examples are news, social media, review, blog, email, and online discussion forum.

Author Quality Score—refers to, depending on source type, giving more weight to higher reputation authors. For example, for social media tweets, it prefers articles from posters with larger followings. For review sites, it prefers posters listed as verified purchasers and/or with higher numbers of useful reviews.

Article Timeliness Score—refers to weighted score by source type of how recent the article is. For example, news articles may be considered timely if posted in the last day or so, tweets are considered timely if posted in the last hour or two.

Article Trendiness—refers to scoring based on how often and how recently this specific article has been referred to in other articles. For example, how often the article has been linked to in another article, tweeted, or shared.

Buzz—refers to the number of tallied mentions about a given topic during a discrete time interval. (Example Usage—During the past month in February 2015, Justin Bieber had a buzz of 1,543,654 mentions on the World Wide Web.).

Datavana—refers to a cloud based database service run by Moodwire, which stores both Sentiment and raw source data.

Entity—refers to an entity that is a meta-concept of noun/person/etc. The fragment of text is just a representation (or clue) of that entity being used in a certain context but that piece of text is not the entity, just a reference to it. This is semantically relevant because "I flew on United" contains the word "United" but the reference to Entity: United_Airlines is only true because of the verb "flew" && (object==word("United")) so "United" is simply a word that, in another context, could refer to "United States" or something entirely different. Alternatively, the term "entity" refers to the basic entity object that contains the entity recognition model, which is a combination of exact match terms that uniquely identify the entity in an article and a statistical model, providing the probability that a word or word sequence refers specifically to the entity. The entity object also contains a UUID or universally unique identifier, which is used to track the entity across the system. The entity object also contains details of object, which are required to identify to users of the system, such as name, description, and images. Additionally, the entity object contains data, which may be of interest to end users such as attribution of sources where the entity data was extracted, links to external sites related to the entity, the origin date, which depending on entity type is a birth date, company founding date, or product release date, etc. Furthermore, the entity object contains a type, such as organization, person, product, or location that defines a subclass, which may contain additional information related to the entity type.

Entity-Based Opinion Search—refers to an end user or consumer of the API that is looking for details about how people feel about a certain real world entity, such as Apple Computer or Donald Trump or Valentines Day. Specifically, looking for how often people discuss the entity in question on social media and how often people speak positively or negatively about the entity, and how the entity compares to related entities.

Entity-Based Search—refers to a specific entity; an entity-based search finds articles that specifically mention that entity as identified by our entity detection algorithms. For example, finding articles that mention Trump, which are referring to Donald Trump, but ignoring articles about the card game contract bridge, which mention trump. In addition, it includes mentions of entities that are closely related to the given entity or entities as specified by our relationship association or relationship.

Entity Relationship—refers to computation that correctly assigns buzz relationship and sentiment relationship to entities via comments about related entities. The entity extraction determines relationships, which allow establishments of links between, for example, a company, product lines, and products made by that company, such as Apple Computer maker of the iPhone product line, which contains the product iPhone 5c. Entities also relate to logical groupings, such as iPhone is a member of the smartphones group, and Apple is a member of the electronic manufactures group, as well as the S&P 500 group. A key part of tracking relationships over time is determining and maintaining the relationship beginning and end date. For example, this allows us to determine that negative comments about the current Governor of California in 2010 refer to Arnold Schwarzenegger and in 2012 refer to Jerry Brown. Tracking relationships by date also allows us to develop timelines between related entities and accurately determine buzz and sentiment over time as relationships change. For example, companies come and go from the Dow Jones Industrial Index, and by tracking these relationships over time, we can accurately judge buzz and mood for the changing group.

Entry (syn. Post, Mention)—refers to a single fragment of text, which may come from a review, a tweet, etc.

Event Entity—refers to event specific information. Some examples of events include wars, plane crashes, storms, and election campaigns.

Horizontal Entities—refers to a horizontal collection of entities with a broad range of offerings to a large group of customers with a wide range of needs, such as businesses as a whole, men, women, households, or in the broadest sense of a horizontal market, everyone.

Human Opinion—refers to a view or judgment formed by people (as opposed to machines) about a given topic, not necessarily based on fact or knowledge. Opinions are generally expressed on a varying scale of positive to negative, with a neutral indicating the absence of opinion.

Location Entity—refers to location specific information such as latitude, longitude, and address.

Micro-blog—refers to a social media site to which a user makes short, frequent electronic social media posts.

Natural Language Processing—refers to a field of computer science, artificial intelligence, and linguistics concerned with the interactions between computers and human languages.

Ontological relationship—in one embodiment, this term refers to naming and defining the types, properties, and interrelationships of the entities that exist for a particular domain of discourse. Ontology compartmentalizes the variables for some set of computations and establishes the relationships between them (e.g. taxonomy).

Organization Entity—contains the organization sub-type (for profit corporation, non-profit, government, musical group, etc.), stock symbols, and associate exchange information (where applicable) and headquarters or capital in the case of national or state level governments.

Overall Polarity—refers to a combined score of all the Piece Scores. Many different types of item scores are possible depending on how the Piece Scores are weighted.

Person Entity—refers to person specific information, such as title and gender.

Product Entity—refers to product specific information, such as type (product, product-line, book, movie, song), UPC code, ISBN, etc.

Quote Sentiment—refers to a subpart of an item that can be an atomic unit of measurable sentiment. Score entries are by made by humans or computers.

Semi-structured Data—refers to a form of structured data that does not conform with the formal structure of data models associated with relational databases or other forms of data tables, but nonetheless contains tags or other markers to separate semantic elements and enforce hierarchies of records and fields within the data.

Sentiment—refers to a view of or attitude toward a situation or event: an opinion.

Sentiment Score—refers to sentiment scoring where each Item is scored based on the sum of the Piece Scores. Pieces that are not scored or scored as "Mixed" or "Unknown" are treated as 0.

Source Quality Score—refers to assigning score based on the relative quality of the source dependent on the source type. For example, if the source type is news, it gives more weight to the New York Times than the Weekly World News.

Spam—refers to unsolicited electronic messages, especially advertising, as well as messages sent repeatedly on the same site.

Spam Score—refers to identifying the article as more or less likely to be spam depending on its length, presence of specific words or phrases, use of capitalization, spelling, and punctuation.

Stream—refers to a string of items (e.g. a days' worth of reviews at Yelp, or 10,000 Twitter tweets).

Tagvana—refers to Moodwire's crowd sourced human scoring and quality assurance (QA) tool. Tagvana is used for sentiment engine tooling and accuracy assessments.

Text Quality Score—refers to assigning score based on the article length, whether or not the article contains images, the number and size of the images, the amount of content bearing text in proportion to the html code or programming script contained in the article posting. All thresholds and scores are dependent on the article source type (e.g. threshold for text length lower for tweets than news articles).

Return—refers to an aggregated list of articles sorted and filtered by closeness of match, article quality score, buzz, and mood rank of the article.

Source Quality Score—refers to assigning score based on the relative quality of the source dependent on the source type. For example, if source type is news, it gives more weight to the New York Times than the Weekly World News.

Storm—refers to bursts of social media communications that recursively grow according to a power law.

Structured Data—refers to data that resides in a fixed field or record, such as data commonly found in a relational database.

Text based search—refers to a standard lexicographical search for articles which include and/or exclude given text.

Text Quality Score—refers to assigning score based on the article length, whether or not the article contains images, the number and size of the images, the amount of content bearing text in proportion to the html code or programming script contained in the article posting. All thresholds and scores are dependent on the article source type (e.g. threshold for text length lower for tweets than news articles).

Unstructured Data—refers to information that either does not have a pre-defined data model or is not organized in a pre-defined manner.

Vertical collection entities—refers a collection of entities related to a specific industry, trade, profession, or other group of customers with specialized needs. It is distinguished from a horizontal collection of entities, which implies a broad range of offerings to a large group of customers with a wide range of needs, such as businesses as a whole, men, women, households, or, in the broadest horizontal market, everyone.

Web Crawler—refers to a web crawler that is an Internet bot that systematically browses the World Wide Web, typically for Web indexing. A Web crawler may also be called a Web spider, an ant, an automatic indexer, or a Web scutter.

Weight and Aggregate Scores—refers to combining all scores to a single number, which can be used to rank articles by relative importance and quality. Aggregation can be weighted for particular usages. For example, a news-oriented web site would weight timeliness and trendiness over other qualities, while a social site might prefer higher buzz and stronger polarity mood scores.

Window (or Epoch)—refers to a set period of time during which a Stream is examined. This can be a minute or an hour, or a week etc. For example when we publish a graph of a given score vs. time we can choose different time scales such as 1-minute resolution, 1-hour resolution, 2.5-day resolution, 1-week resolution, etc.

Windowing Effect—as the time scale (Epoch) gets longer, fast changing events in a Stream are more difficult to see because they get smooth out by the length of the time window examined. This effect of smoothing vs. window length is called the "windowing" effect in signal processing and informatics theory. Many different valid approaches for dealing with windowing are possible depending on the type of information preservation desired.

FIG. 1 is a system diagram illustrating one embodiment of an opinion search system 10, which is coupled to a communication network 12 (e.g., a wide area network, such as the Internet, a wireless network, a wired network, a local network, an intranet, etc.) for sourcing social media electronic messages (also referred to as "textual data," "tweets," or "text messages") 14. The opinion search system comprises focused crawlers 16, a load balancer 18, an opinion search engine (also referred to as "pipeline processes") 20, a production data storage aggregator 22, which is coupled to an application program interface (API) 24, and an entity builder database aggregator 26 that is coupled to an entity builder 28. The entity builder 28 is also coupled to the production data storage aggregator 22. The application program interface 24 is further coupled to API clients 30, which is further coupled to web clients 32. The focused crawlers 16 are software modules on a computer that are designed to collect text directly from various websites built using hypertext markup language (HTML) and related technologies. The focused crawlers 16 are configured to collect textual data from the Internet 12 and normalize the social media electronic messages into a particular format suitable for the present disclosure.

The normalized textual data is sent to the logical load balancer 18, which may be composed of numerous computers, servers, etc. to start to configure software pipeline process and balance the data loading into the opinion search engine 20. The opinion search engine 20 computes and generates scores for the social media electronic messages and records the resulting scores at the production data storage aggregator 22. The production data storage aggregator 22 includes different types of databases, such as a cache database 34, an index database 36, and a relational database (e.g., Oracle) 38. A suitable commercial application of the cache database 34 is produced by Redis, a suitable commercial application of the index database 36 is produced by ElasticSearch, and a suitable commercial application of the relational database 38 is produced by Oracle Corporation of Redwood Shores, Calif. It is understood that one or more of these databases may be physically or structurally combined or more databases may be used. The database may be cloud based, network system, remote, or local. The databases may be flat files or relational databases.

The relational database 38 stores the information, such as the social media electronic messages and the computed scores, in tables that have relationship with one another. Index database 36 is configured to enable the opinion searches to be conducted more rapidly. Cache database 34 is configured to identify entities that exist in databases and associate the entities with a unique identifier, which enables quick query and query response actions. Entities are predefined search categories that can be real, such as singers and actors, or virtual, such as S&P 500 Index and Air Transportation. The databases are exposed to the clients via the API 24. In one embodiment, the entity builder (also referred to as an "entity administrative server") 28 enables human intervention to manipulate and test the scores by storing the revisions (or changes) in the document database 40. The revisions are pushed into production by the application server 42. Once the application server 42 verifies and confirms the data, then the application server 42 automatically forwards the revisions for incorporation into the production data storage aggregator 22.

Figure 2A:
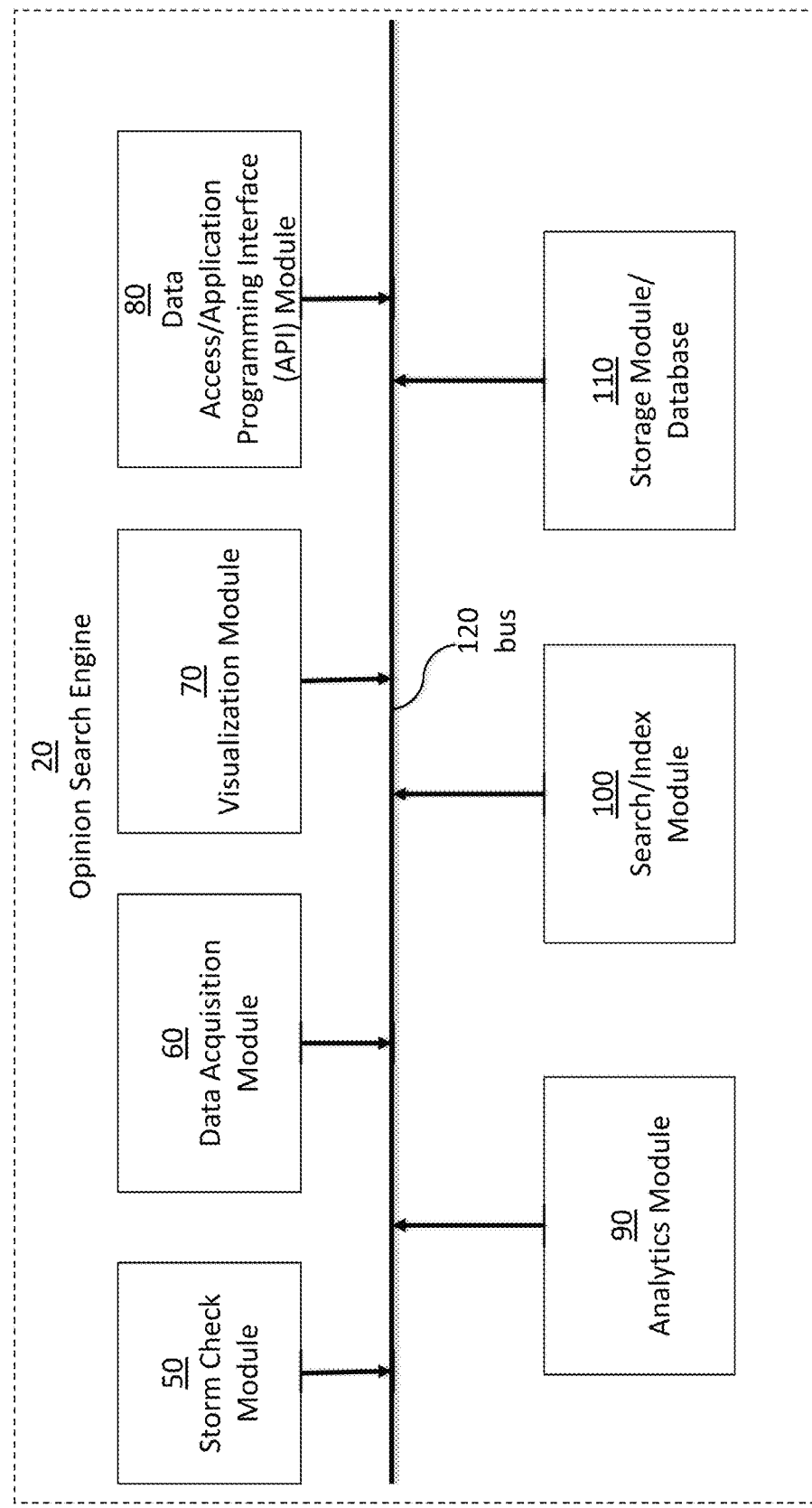
FIG. 2A is a diagram of a software system illustrating a first embodiment of an opinion search engine with a storm check module, a data acquisition module, a visualization module, a data access module, an analytic module, a search/index module, and a database storage module in accordance with the present disclosure.

FIG. 2A is a software system diagram illustrating one embodiment of the opinion search engine 20, which includes a storm check module 50, a data acquisition module 60, a visualization module (also referred to as "an opinion visual representation module) 70, a data access/application programming interface (API) module 80, an analytics module 90, a search/index module 100, a storage module/database 110, and a bus 120 coupling the various modules. When normalized textual data is received by the opinion search engine 20, the storm check module 50 is configured to check the textual data that enters the opinion search engine and determines if the textual data matches the patterns of a Twitter storm, such as a sudden spike in activity surrounding a certain topic on the Twitter social media site. For additional details on storm detection, see U.S. nonprovisional application entitled "Method and System for Social Media Burst Classifications," Ser. No. 14/062,746, owned by the common assignee and herein incorporated by reference in its entirety. The data acquisition module 60 is configured to obtain or acquire structured entity data and unstructured textual data from electronic social media posts and messages, among others. The data access module 70 is used to interface with the social media data via the API. The analytics module 90 is configured to analyze the structured and unstructured data and to retrieve and link each social media post from the database to an entity in the entity database. The analytics module 90 is configured to determine the sentiment type associated with each post related to an entity and to score the quality of each post on predetermined criteria. The search index module 100 is configured to provide fast searching capability by indexing the posts and associated scores for conducting opinion searches. The storage module/database 100 is configured to provide a storage location or database for storing electronic social media posts, entity data, scores associated with posts and entities, and other software files associated with the opinion search engine. The visualization module 70 is configured to compute the data from the search/index module 100 and the data access module 80 for transforming the associated data suitable in response to the query for a transformed graphical output at a computer display of the user.

Figure 2B:
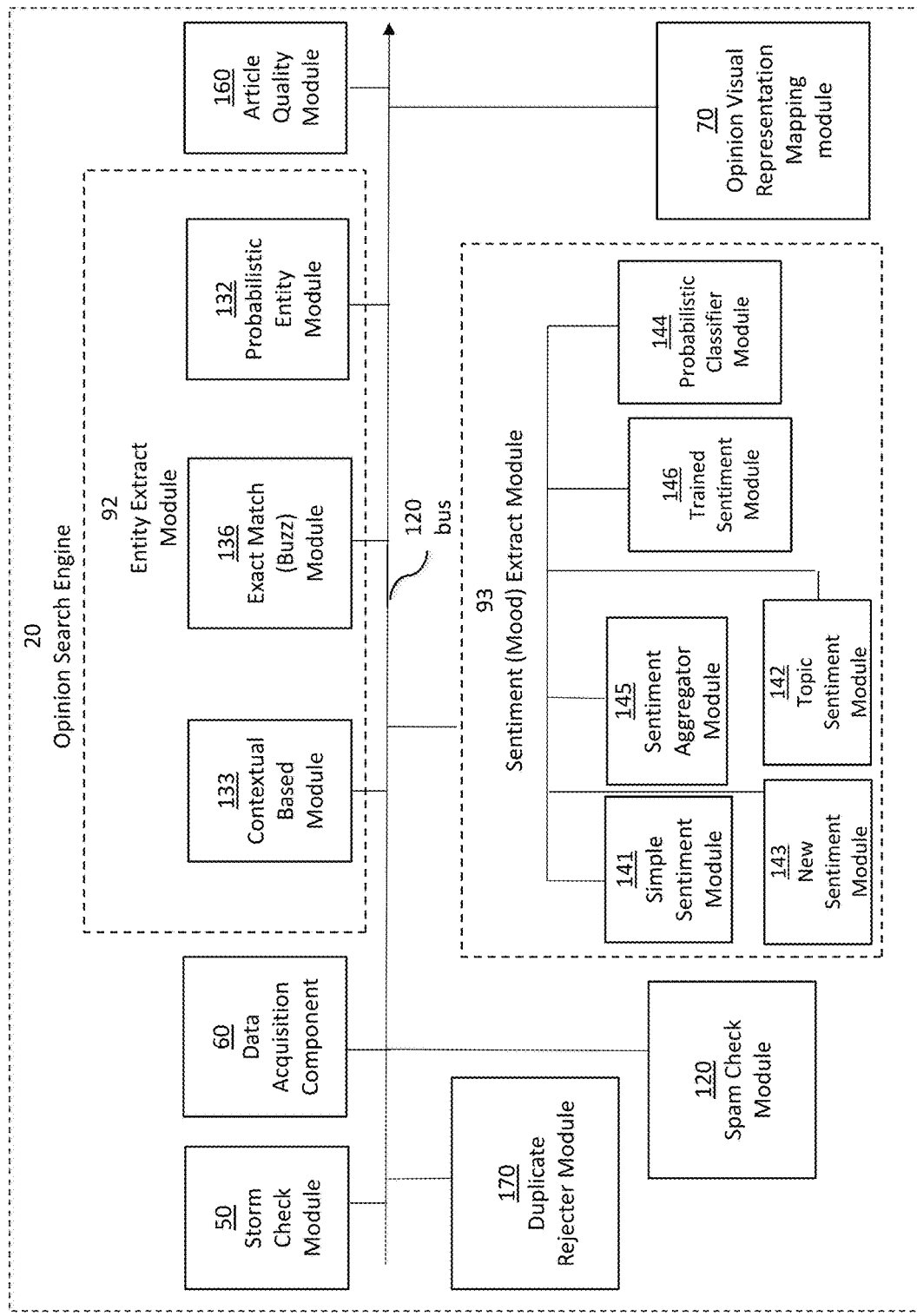
FIG. 2B is a diagram of a software system illustrating a second embodiment of an opinion search engine with a storm check module, a data acquisition module, an entity extract module, an article quality module, a duplicate rejecter module a spam check module, a sentiment (mood) extract module, and an opinion visual representation mapping module in accordance with the present disclosure.

FIG. 2B is a software system diagram illustrating one embodiment of the opinion search engine 20 that includes the storm check module 50, the data acquisition module 60, a duplicate-rejecter module 170, a spam check module 120, an entity extract module 92, a sentiment (mood) extract module, and the opinion visual representation mapping module 70, an article quality module 160, and a bus 120 coupling to the various modules. The entity extract module 92 may include a contextual based module 133, an exact match module 136, and a probabilistic entity module 132. The sentiment extract module 93 may include a simple sentiment module 141, topic sentiment module 142, a new sentiment module 143, a probabilistic classifier module 144, a sentiment aggregator module 145, and a trained sentiment module 146.

When the normalized textual data is received by the opinion search engine 20, the storm check module 50 is configured to check the textual data that enters the opinion search engine and determines if the textual data matches the patterns of a Twitter storm, such as a sudden spike in activity surrounding a certain topic on the Twitter social media site. For additional details on storm detection, see U.S. nonprovisional application entitled "Method and System for Social Media Burst Classifications," Ser. No. 14/062,746, owned by the common assignee and herein incorporated by reference in its entirety. The duplicate-rejecter module 170 is configured to seek and determine if the incoming data already exists in the system. As input social medial data crawled from different data sources are normalized, a unique signature representing the input social media data is created. The unique signature is used to identify if the same input data was seen earlier by the system 10. If the input social media data was in fact seen earlier, the duplicate-rejecter module 170 is configured to reject the input social media data. Otherwise, the input social media data is sent along to the next step in the data processing pipeline to classify input text.

The spam check module 120 is configured to analyze the textual data to see if a social media electronic message is a spam or contains spam, which refers to a commonly-used euphemism to describe irrelevant or inappropriate messages sent on the Internet to a large number of recipients. Spam often takes the form of indiscriminate advertisements, and other unwelcome, often automated communications. As will be understood, the spam check module may be represented as:

[{'conf': '800',
      'engine': 'st: Spamvana',
      'entity': 'NP',
      'feature': 'st: SPAM',
      'fields_used':
        [{'field': 'Body',
          'field_range_end': 239,
          'field_range_start': 0}],
      'model': 'v.1.0.0.1',
      'mood_score': 'x',
      'rule_hits': 'bayesian rules'}]

The entity extract module 92 is configured to identify and tag with metadata the words that are known to exist in the system's relational database 38. To phrase it another way, the entity extract module 92 is configured to identify one or more nouns in a text streams, such as a person, place, or thing to be tagged as an entity (while the sentiment extract module 60 is configured to assess other words in the text streams and how they relate to those entitles). For example, if "Apple Computer" exists in the relational database, when a textual data that contains the term "Apple Computer" or "Apple" enters the pipeline process, it will be tagged as containing a reference to "Apple Computer."

The contextual based module 133 is configured to identify and link the entity mention to the entities in the database by using the context of the social media post. For instance, the reference "Apple" in a post by itself cannot be linked to "Apple Computers" or "Fruit Apple," it will only be possible to link entity mention to the right entity by utilizing the context of the post. If the post is talking about computing, technology, smartphones, etc. then it can be assumed to be talking about "Apple Computers." On the other hand, if the context is mostly about fall, pies, etc. algorithm my decide linking this reference to the "Fruit Apple."

The exact match module 136 is configured to unambiguously identifying an entity that occurs in the text. An example of the exact match engine's input is shown here:

ExactMatchEngine
      token[ ]→{entityID, feature, mood}←some fields can be missing "Apple Computer Inc"→scoreObj: {EMEVer, ent:IDof(Apple), { }, { }} #AppleComputerRocks→scoreObj: {EMEVer, ent:IDof(Apple), "general", +2} @Apple Computer→scoreObj: {EMEVer, entIDof(Apple), "sourceID", { }}
    EME versioning is based on data model loaded.
    So scoreObj: {EMEVer1.1, ScoreDateTimestamp,
    EMEModel_ver2.2, EMERule_that_triggered:'Apple Computer Inc', entID, featureID, moodScore}
    moodscore {floating pointnumber OR 'x' OR 'm' OR 'u'}
      number=moodscore to max 2 decimal prec (e.g. 1.23)e
      x=not scored
      m=mixed
      u=unknown After processing by the exact match module, the output is provided as follows: Exact Match Engine output Example:

[{'conf': 1000,
      'engine': 'st:EME',
      'entity': u'52fc335499c603f475c6a1a0', 'feature': 'NP',
'fields_used': [{'field': 'Body',
  'field_range_end': 186,
  'field_range_start': 181}],
'model': 'v.1.0.0.1',
'mood_score': 'x',
'rule_hits': 'cisco'}, ... ] The probabilistic entity module 132 is configured to use statistical learning techniques to compute the probability that an entity mention is related to a specific entity or attributes associated with that entity. It is related to context based entity extraction technique, where the probabilistic distribution of terms, topics, and other features is used to uniquely identify the mentioned entity.

The sentiment (mood) extract module 140 (or 93) is configured to differentiate and isolate the sentiment from the textual data, also referred to as an ensemble methodology, where the sentiment extract module 140 is configured to run multiple types of analysis simultaneously on the same target data, generating a score for each of these functions. The sentiment extract module 140 processes a piece of textual data through each of the submodules; the simple sentiment module 144 and the topic sentiment module 142 provide in part the first pass of the textual data and access to the sentiment. Next, the textual data passes through the mathematical probability classifier module 144 where the textual data is configured to classify the textual data into different sentiment classes using statistical learning algorithms based on mathematical probability theory. After that, the data passes through the trained sentiment module 146, which is configured to make a more accurate assessment of the textual data's sentiment. For example, the phrase "That album was super bad" can be assessed as a positive sentiment by the trained sentiment module 146. Finally, the sentiment aggregator module 145 assembles all the scores generated by the components 141, 142, 144, and 146 and generates a new set of scores expected to have higher accuracy. Each of the four modules 141, 142, 144, and 146 that the textual data passes through generates a separate score. All the scores for each textual data are combined and synthesized into a super score by the sentiment aggregator module and stored on the relational database 38. The sentiment extract module 140 is intended as an illustration, which can be modified, subtracted, added, modified, or integrated by one of skilled in the art.

The topic sentiment module 142 contains multiple extraction modules that are tuned for use in different vertical domains. The topic sentiment module 142 enables the system 10 to synthesize results from a broad number of taxonomic domains (collections of things), and then present those results in a coherent and easily understandable fashion. The topic sentiment module 142 is configured to learn the sentiment of a phrase within a context. For instance, "cheap" might have a negative meaning if the topic of the post is quality, whereas it might have a positive sentiment when the post topic is price. The topic sentiment module 142 identifies the topic and the taxonomic domain of posts before identifying the sentiment direction of such ambiguous phrases.

The article quality module 160 ranks and scores articles based on a set of criteria including source, author, topic, and text, etc. The visual representation module 70 is configured to gather all the information and textual data relevant to the client's query and transform the information into a visual graphical representation for display on a computer display.

Figure 3A:
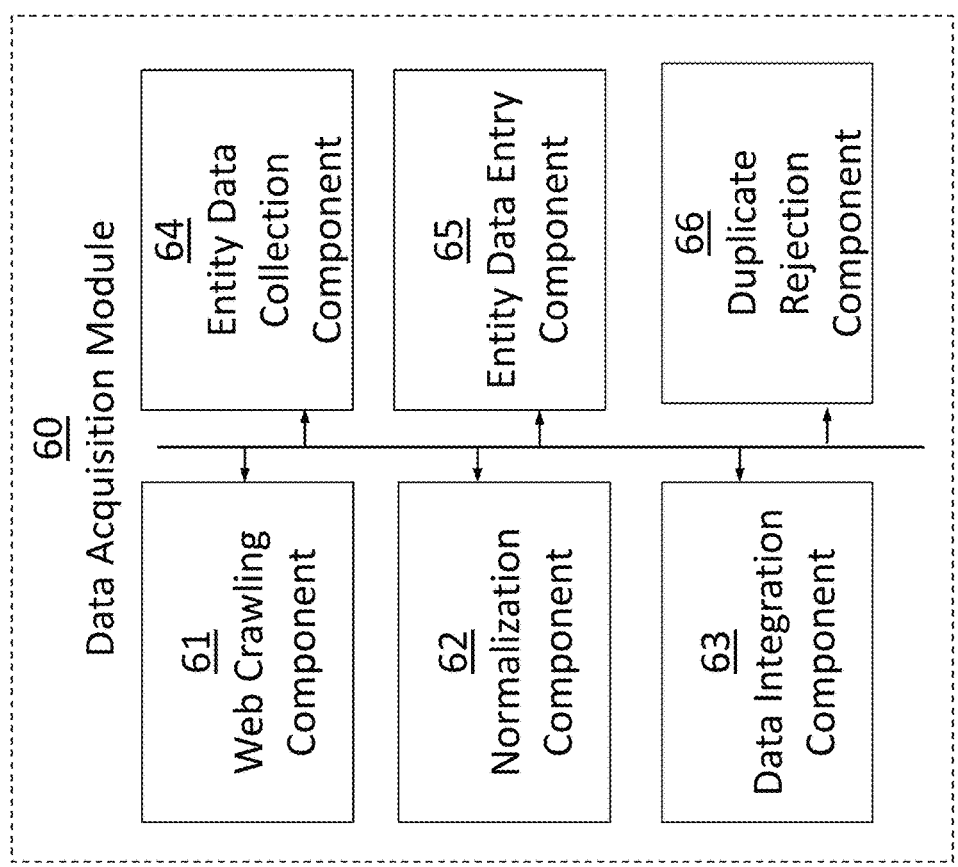
FIG. 3A is a diagram of a software system illustrating a data acquisition module in the first embodiment of the opinion search engine in accordance with the present disclosure.
Figure 3B:
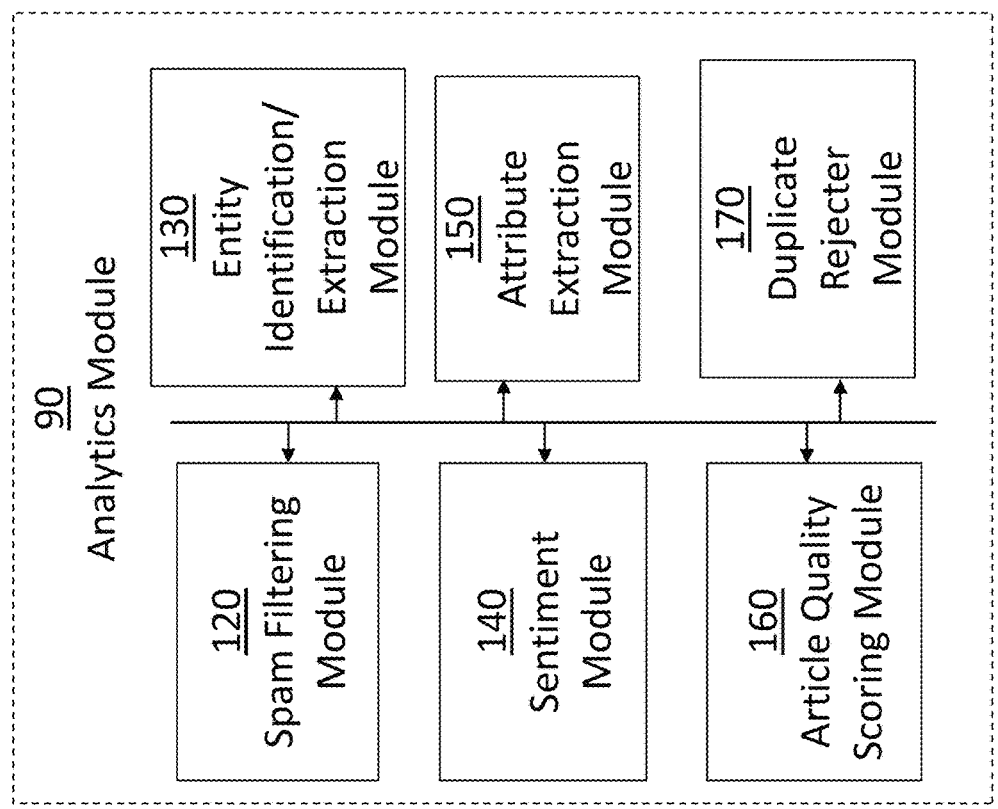
FIG. 3B is a diagram of a software system illustrating an analytics module in the first embodiment of the opinion search engine in accordance with the present disclosure.

FIG. 3A shows data acquisition module 60. The data acquisition module 60 includes a web crawling component 61, a normalization component 62, a data integration component 63, an entity data collection component 64, and entity data entry component 65, and a duplicate rejection component 66. The web crawler component 61 may be an Internet bot that systematically browses the World Wide Web, typically for Web indexing. A Web crawler may also be called a Web spider, an ant, an automatic indexer, or a Web scutter. Web crawler 301 may be a software module designed to collect text directly from various websites built using hypertext markup language (HTML) and related technologies.

The normalization component 62 may be a software module designed to normalize the collected data, such as the social media electronic messages into a particular format suitable for use, analysis and display in the present disclosure. The normalization component 62 is configured to normalize (or transform) unstructured data from one unstructured format to structured data with a standard format. In an embodiment, normalized data may contain specific information for use by the system, including input_body, created_date, unique_id, unique link to a web page, source site, etc. In addition, the system may collect the author_name, location, type, and gender if this information is contained or can be successfully inferred from the raw text input. These attributes are desirable, but not required for use by the system. Location is normalized to a most granular description available and if possible reduced to precise latitude and longitude coordinates.

The data integration component 63 is configured to integrate and merge entity data gathered from different knowledge-bases and extracted with entity crawlers. The entity data collection component 64 is configured to collect data associated with each entity or related entities. As opposed to entity data collection component 64, the entity data entry component 65 is configured to enter data from an external file, a graphical input interface, or a user that is associated with a particular entity. The duplicate rejection component 66 may be a software module and is intended to reject and remove any duplication among the received social media electronic messages. Textual data that is considered be a duplicate to another textual data will be discarded.

In the analytics module 90, the spam filtering module (or component) 120 may be a software module that is configured to analyze the textual data to see if an electronic message is spam or contains spam. The spam filter module 120 may use a spam tagger module configured to detect and identify spam messages and all spam textual data as spam type. The detected spam may then be filtered and discarded from further processing. The sentiment module (or component) 140 is configured to determine the types, degrees, positive, negative, or other attributes about the sentiment of electronic social media posts. The article quality scoring module (or component) 160 is configured, depending on source type, giving more weight to higher reputation authors. For example, for social media tweets, it prefers articles from posters with larger followings. For review sites, it prefers posters listed as verified purchasers and/or with higher numbers of useful reviews. The entity identification/extraction module (or component) 130 is configured to identify or extract entity information from social media posts and search queries. The attribute extraction module (or component) 150 is configured to extract attributes associated with entities. Machine learning entity attribute extraction component is configured to extract different attributes of entities from unstructured sources, such as Wikipedia, to fill in the entity attributes such as birth dates and birthplaces, etc. The duplicate rejecter module (or component) 170 is configured to reject or exclude electronic social media posts that are duplicates.

Figure 3C:
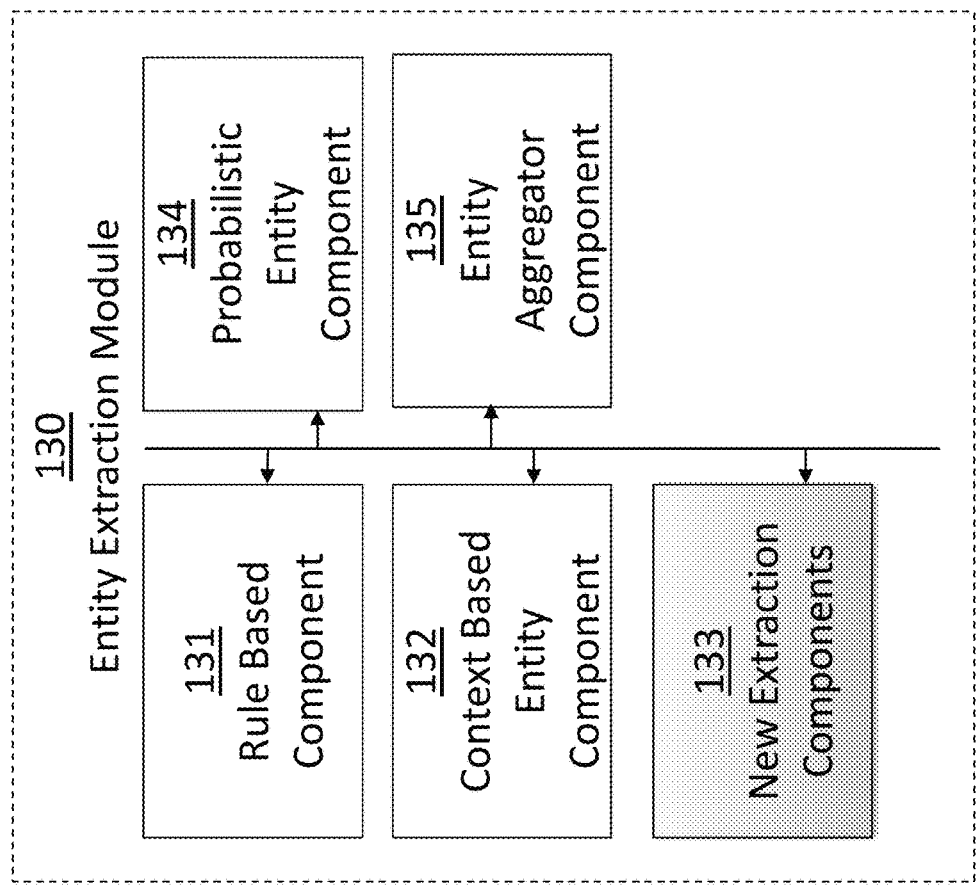
FIG. 3C is a diagram of a software system illustrating an entity extraction module in the first embodiment of the opinion search engine in accordance with the present disclosure.

FIG. 3C is a block diagram illustrating the data entity extraction module 130. The entity extraction module 130 includes a rule based component 131, a context based entity component 132, a new extraction component 133, a probabilistic entity component 134, and an entity aggregator component 135. The rules based component 131 is configured to set a set of rules governing the treatment of electronica social media posts and the entities. The context based entity component 132 is configured to analyze and determine the context of entity and associated attributes. The new extraction component 133 is configured to extract other types of algorithms included in the pipeline, such as any new type of entity extraction component. The probabilistic entity component 134 is configured to determine the probabilistic of the relevant entity, the associated attributes, and any related entities. The entity aggregator component 135 is configured to aggregate the information of various entities. For example, consider a term that is difficult to disambiguate, such as "apple." The term "apple" could refer to a fruit, a computer manufacturer, or a recording artist publisher. Three phrases that contain a different embodiment of the term "apple" are: "I ate a red delicious apple," "I love my apple MacBook," and "The Beatles published their music via apple." In this example, the system would employ three different vertical-specific engines. The term "vertical" indicates a logical grouping of related items. One such grouping would be fruit, such as "apples, oranges, and pears." A second grouping would be computer manufacturers, such as "Apple, Lenovo, and Dell." A third grouping would be recording artist publishers, such as "Arista, Universal Music, and Apple Records." The system would then take each input phrase and seek out clues that indicate which phrase belongs to which vertical. In this example, the verb "ate" implies that the "apple" in the first phrase belongs to the fruit vertical, while the noun "MacBook" implies that "apple" in the second phrase belongs to the computer manufacturers vertical. Finally, the word "Beatles" implies the "apple" in the third phrase refers to the recording artist publisher vertical. By having each vertical-specific engine tuned to a particular vertical, (fruit, computer manufacturers, recording artist publishers), the system can more easily and effectively identify the appropriate context for each entity and classify it correctly.

Figure 3D:
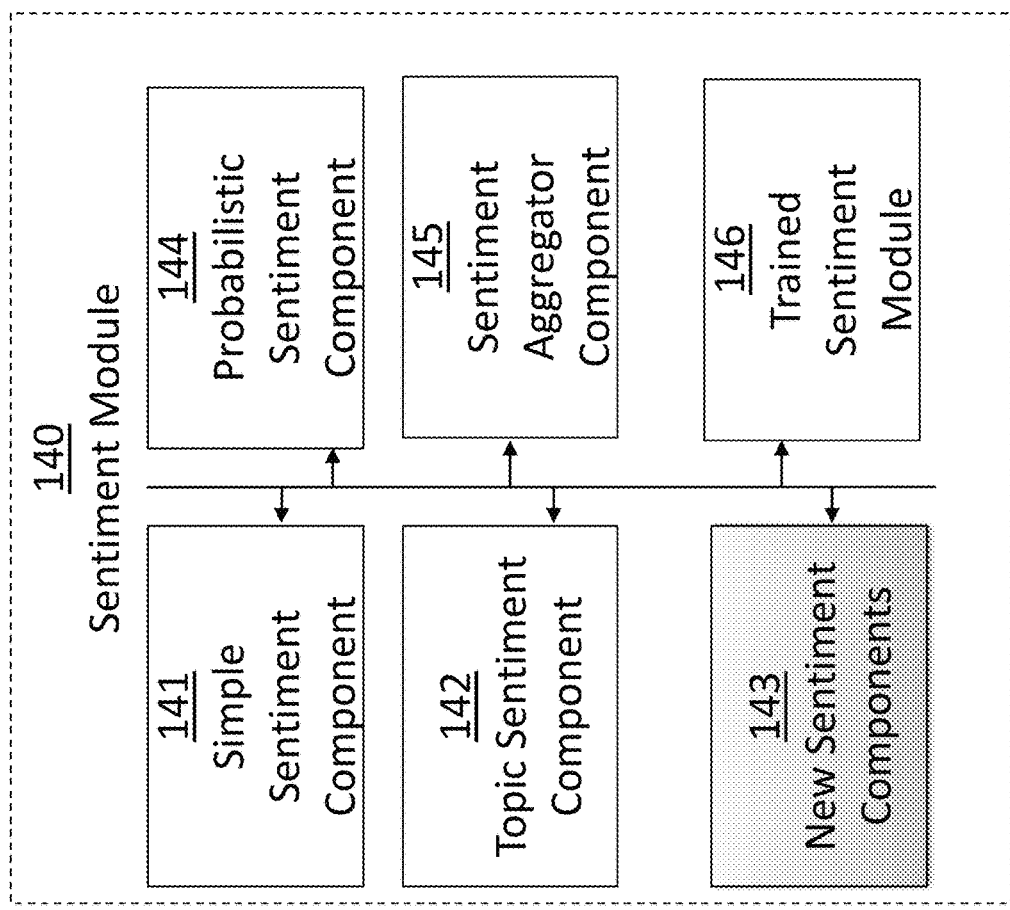
FIG. 3D is a diagram of a software system illustrating a sentiment module in the first embodiment of the opinion search engine in accordance with the present disclosure.

FIG. 3D is a block diagram illustrating the components in the sentiment module 140. The sentiment module 140 includes a simple sentiment component 141, a topic sentiment component 142, a new sentiment component 143, a probabilistic classifier component 144, a sentiment aggregator component 145, and a trained sentiment module 146. The simple sentiment component 141 is configured to determine the sentiment of electronic social media posts. The topic sentiment component 142 is configured to determine the sentiment of a particular topic or related topics. The new sentiment component 143 is configured to determine the new sentiment pertaining to an entity or entities. The probabilistic classifier component 144 is configured to determine the probability that a specific sentiment is associated with an entity. The sentiment aggregator component 145 is configured to aggregate the various sentiments associated with electronic social media posts and entities. The trained sentiment module 146 is configured to make a more accurate assessment of the textual data's sentiment. For example, the phrase "That album was super bad" can be assessed as a positive sentiment by the trained sentiment module 146.

Figure 3E:
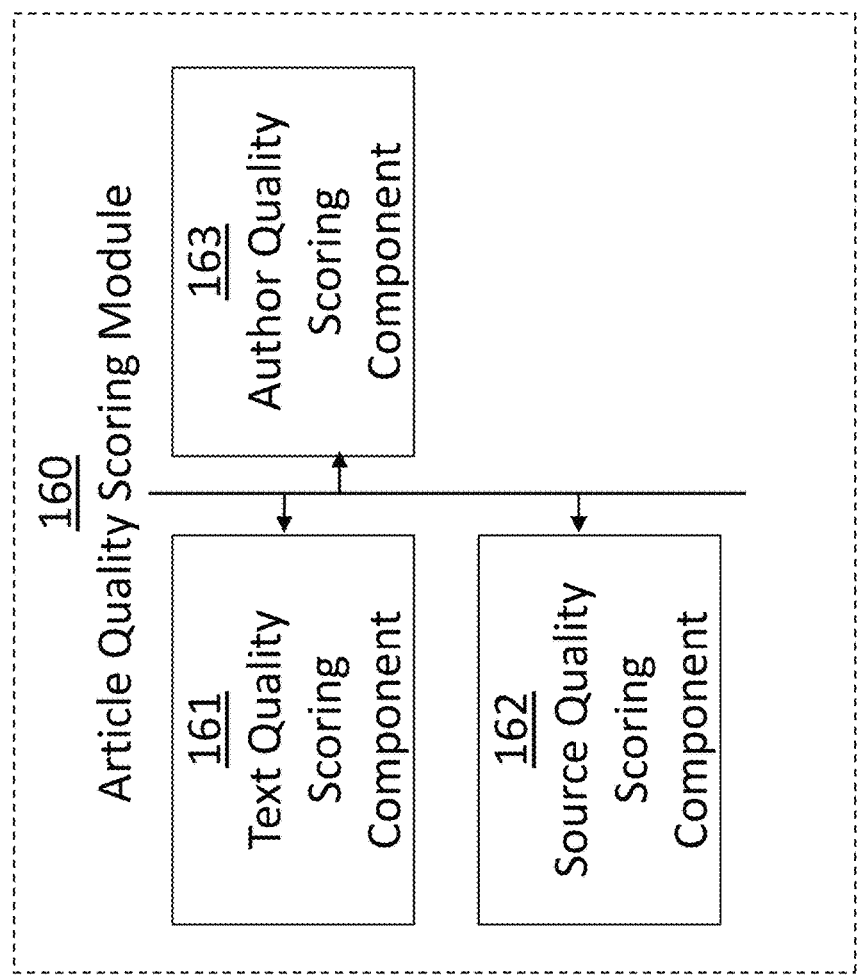
FIG. 3E is a diagram of a software system illustrating an article quality scoring module in the first embodiment of the opinion search engine in accordance with the present disclosure.

FIG. 3E is a block diagram illustrating the article quality scoring module 160. The article quality scoring module 160 includes a text quality scoring component 161, a source quality scoring component 162 and an author quality scoring component 163. The text quality scoring component 161 is configured to assign a score based on the article's length, whether or not the article contains images, the number and size of the images, the amount of content bearing text in proportion to the html code, or programming script contained in the article posting. All thresholds and scores are dependent on the article source type (e.g. threshold for text length lower for tweets than news articles). The source quality scoring component 162 is configured to assign a score based on the relative quality of the source dependent on the source type. For example, if the source type is news, it gives more weight to the New York Times than the Weekly World News. The author quality scoring component 163 is configured to, depending on source type, give more weight to higher reputation authors. For example, for social media tweets, it prefers articles from posters with larger followings. For review sites, it prefers posters listed as verified purchasers and/or with higher numbers of useful reviews.

Figure 3F:
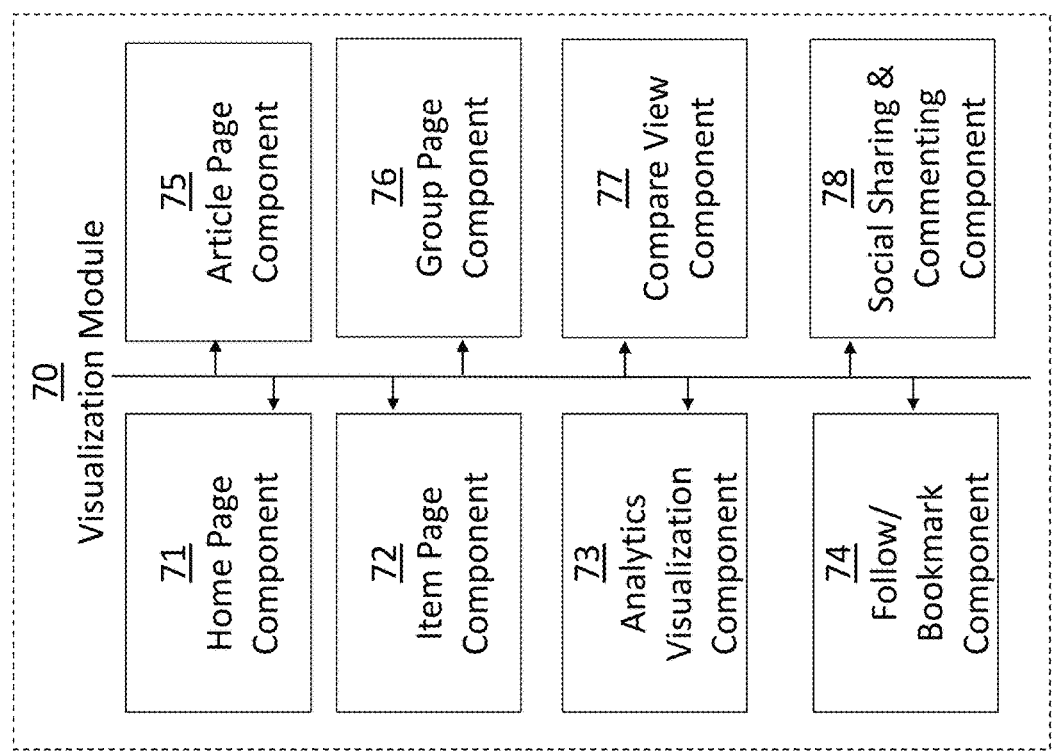
FIG. 3F is a diagram of a software system illustrating a visualization module in the first embodiment of the opinion search engine in accordance with the present disclosure.

FIG. 3F is a block diagram illustrating the visualization module 70. The visualization module 70 includes a home page component 71, an item page component 72, an analytics visualization component 73, a follow/bookmark component 74, an article page component 75, a group page component 76, a compare view component 77, and a social sharing and commenting component 78. The home page component 71 is configured to display a home page associated with a particular search query and results, or associated with a particular user query. The item page component 72 is configured to determine the layout and contents of one or more items on a web home page. The analytics visualization component 73 is configured to provide analytics pertaining to the visual representation on a web page. The follow/bookmark component 74 is configured to follow an entity or bookmark a web page. The article page component 75 is configured to compute and display the article page on a web page. The group page component 76 is configured to compute and display group page content on a web page. The compare view component 77 is configured to compare the different entities for displaying comparison results on a web page. The social sharing and commenting component 78 is configure to share a web page or posting electronic comments on a web page.

Figure 4A:
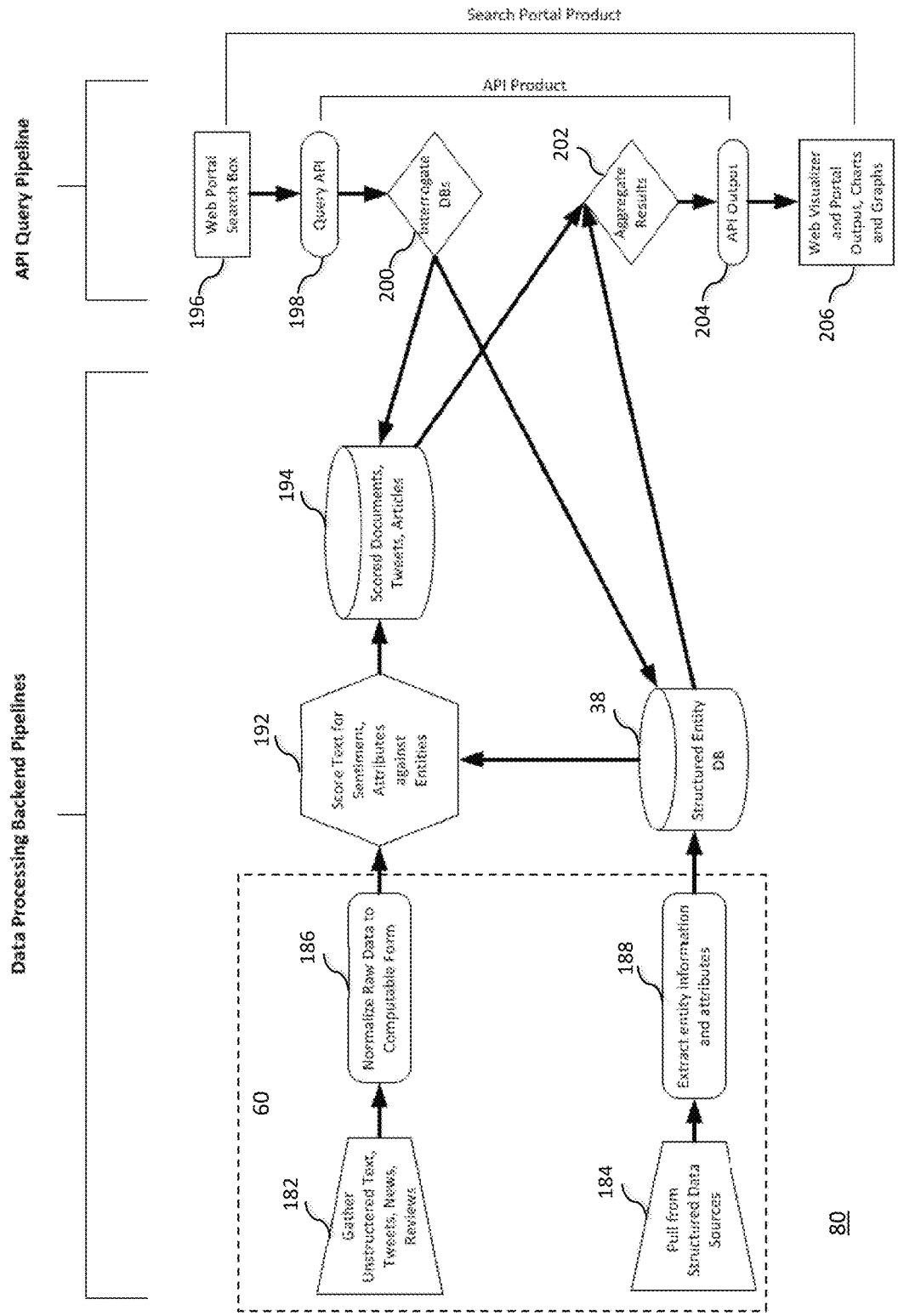
FIG. 4A is a diagram illustrating the process flow of data processing of structured and unstructured social media messaging through an opinion search engine and query processing through the API, in accordance with the present disclosure.

FIG. 4A is a block diagram illustrating the process flow 80 of data processing of structured and unstructured social media electronic messages through the opinion search engine and query processing through the API. At step 182, the system 10 is configured to gather and receive texts, tweets, news, reviews, and other sources from various social media websites and other sources, and detect that these electronic messages or information are unstructured. At step 184, the system 10 is configured to gather or pull structured data from various social media websites and other sources. Unstructured data collection is the collection of raw, unstructured texts from voluminous online public and private data sources. The raw text contains unidentified topics (or entities), such as people, places, and things, etc., as well as contextual clues about human opinion towards those entities. An example of such text would be a micro-blogging post from a Twitter® user exclaiming, "I love Justin Bieber's new album." The system 10 also collects data from simple syndication (RSS) feeds and streaming application programming interfaces (API's). Each data source generally contains textual data in many different formats. For example, RSS Feeds are typically implemented as extensible markup language (XML) pages, while the custom crawlers are designed to parse HTML, which is a different formatting standard. In order for the system to process this varied, inconsistent, unstructured and semi-structured data, at step 186, one objective is to make all the data consistent or have the same format, by have the system 10 normalize (or transform) unstructured data from one unstructured format to structured data with a standard format. After normalizing the data into a consistent format for use by the system 10, a copy of the raw (un-normalized) data is also retained for future reference.

In an embodiment, normalized data may contain specific information for use by the system, including input_body, created_date, unique_id, unique link to a web page, and source site, etc. In addition, the system 10 collects the author_name, location, type, and gender if this information is contained or can be successfully inferred from the raw text input. These attributes are desirable, but not required for use by the system 10. Location is normalized to a most granular description available and if possible reduced to precise latitude and longitude coordinates.

In an embodiment, the unstructured data in system 10 when received may be represented by the code in Table A. Each new piece of text is classified as an item_object.

TABLE A

```
item_object
{
#input as captured
input_raw: {
#raw fields from source (may be empty if norm-ing
  process is "perfect")
}
```
After this raw input is gathered by the system, it is automatically normalized into the following format:
```
  #engines only operate on normalized data here:
  input_normed: {
  input_id: <ID>#assigned ID from moodwire database
  input_title: string,
  input_body: string, #raw review text, tweet, crawled
article, supplied data etc
  source_url: string,
  source_id: <ID>, #mw assigned source ID
  date_source: date_code_int #seconds since 1970, date as
spec'd by source
  date received: date_code_int, #seconds since 1970?, date
processed by dB
  author_source_id: string or <ID># source's ID (eg twitter
handle)
  author_mw_id: string or <ID>#moodwire assigned ID if
available
  storm_prefix_sig: <string>
  storm_prefix_sig_crc64: <64 bit_int>#crc64 of storm_
prefix_sig
    location_txt: string (profile city, etc) #if available
    location_lat_long: (GPS coords) #if available
  } #end of input_normed
```
At step 188, system 10 extracts the entity information and attributes from the structured data. The structured entity information is stored in the database at step 38. At step 192, the system 10 receives a first stream of social media electronic messages that have been normalized, and a second stream of social medial electronic messages where the entity information has been extracted and stored. The system 10 assigns a score to each textual data for sentiment and attributes against different entities. For identifying one or more entities social media electronic messages that are sourced as unstructured data, the raw unstructured text input is elucidated by comparison with known, structured text, thereby identifying the entities contained within the normalized unstructured data. At step 194, the system 10 stores the scored documents, tweets, and articles. Using a search for Justin Bieber for example, by comparing what is known about Justin Bieber the celebrity in the structured database, (i.e.—the fact that he just released a new album), with the incoming unstructured data being collected by one of his fans' tweets, the system can infer that the fan's Twitter® post is referring to Justin Bieber the celebrity singer, and not some other, lesser known person who is also named Justin Bieber. System 10 adds data to associate the formerly unstructured data with the structured data because the system 10 determines that this particular tweet refers to Justin Bieber, the celebrity. By tagging the incoming tweet as such, the system 10 now establishes that these two data elements are related to one another. This synthesis enables further enrichment, including the scoring of human opinion pertaining to the entities as they occur in the unstructured text—by examining the tweet further, the system 10 infers that this fan has a favorable opinion of Mr. Bieber's new album, and then gives it a numerical score. Because the word "love" was used, instead of some less emphatic term, such as "like," the system might assign this tweet a score of +2 in favor of Mr. Bieber's new album, instead of +1. Finally, the system can also use human sampling and oversight of the automated process to assure the quality and relevance of the data. A human operator, who reviews this tweet example would likely affirm that it is in fact referencing Justin Bieber the singer/celebrity. When multiple humans agree with the software program's assessment, a baseline can be established for training the software system in a manner that reinforces greater accuracy and precision in subsequent analyses, thus improving the system over time using a variety of statistical machine learning and natural language processing techniques.

In addition to the unstructured data, system 10 also collects structured data from voluminous online public and private sources regarding known, well-defined entities. An example of such structured data would be collecting information about Justin Bieber's age and height from http://www.wikipedia.org, the public online encyclopedia, automatically via their application programming interface (API). Structured data sources are gathered in the structured entity database before undergoing similar scoring procedure as the unstructured textual data. The structured data store is extended and enhanced through the gained new knowledge, from the raw unstructured text by labeling all newly discovered topics (entities) with metadata from the structured database, as well as scoring each mention of these known entities for human sentiment. In this example, this tweet now contributes a +2 towards collected public opinion about Mr. Bieber's new album, thus enhancing the favorability of human opinion regarding the album.

After the social media opinions and associated entity relationships have been determined and added to the system 10, the results of this processing and enrichment are then presented to the end-users of the system using two different methods, via an API, as well as via a unique user interface. The API enables other automated software programs to consume this enriched information and add it as an input to their processing and calculations. Through the web portal search box 196, a query term processes through the Query API 198, which is configured to interrogate the databases

200 for information that may be associated with the query term. The Query API search result will be aggregated at step 202 and exported via the Query API Output 204 and then deliver the various web visualizer, portal output, charts, and graphs to the computer display at step 206, where the web portal search box originated from.

Figure 4B:
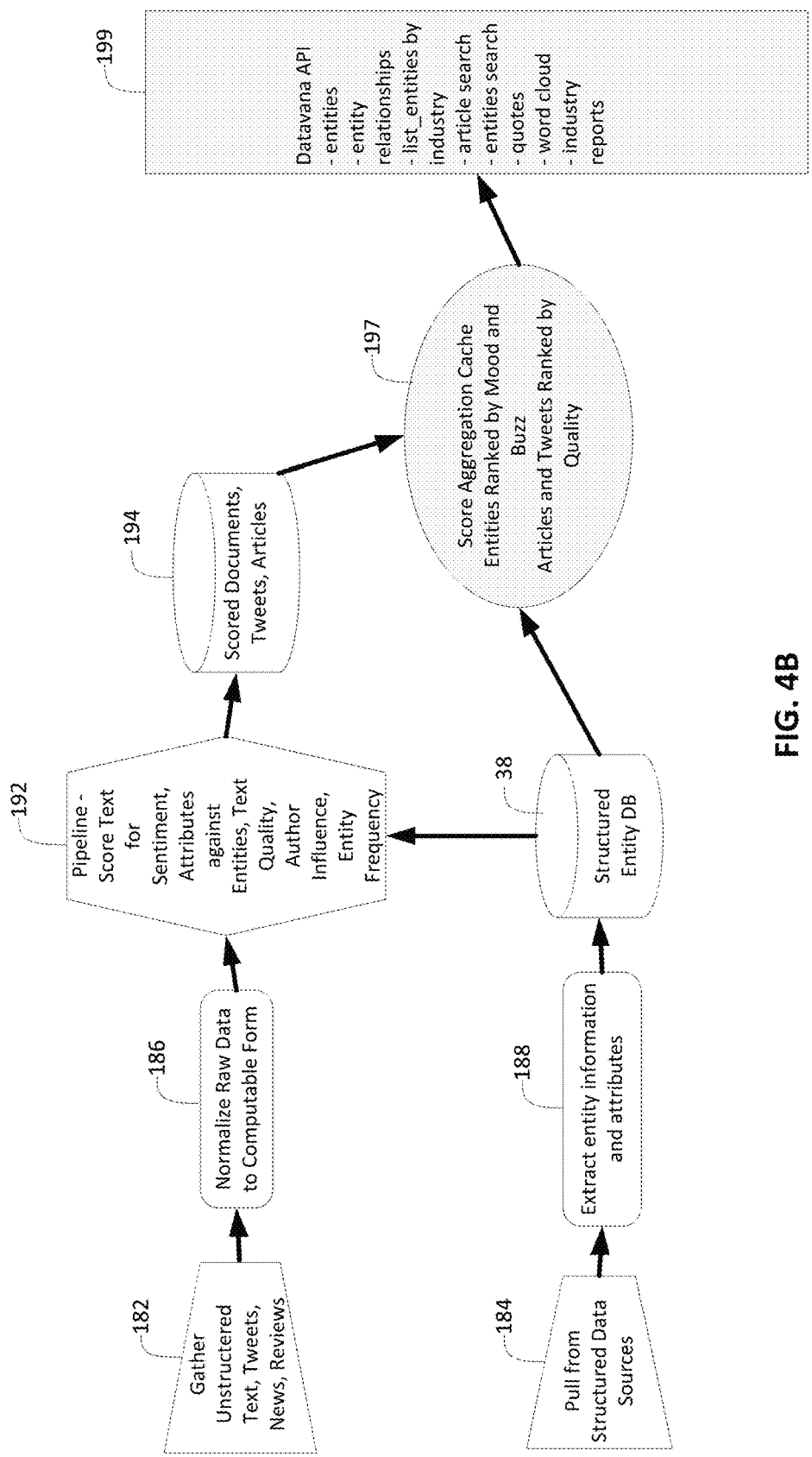
FIG. 4B is a diagram illustrating the process flow and scoring of structured and unstructured social media messaging through an opinion search engine in accordance with the present disclosure.

FIG. 4B is another block diagram illustrating the process flow 80 of data processing of structured and unstructured social media electronic messages through the opinion search engine and query processing through the API in an embodiment of the present disclosure. As can be seen, rather than communicating with the interrogate database 200, structured entity database 38 communicates with a score aggregation cache 197. Similarly, scored documents 194 communicates with score aggregation cache 197. Score aggregation cache 197 comprises the entities rank based on mood, buzz, articles, tweets, and other social media feeds ranked by quality. The score aggregation cache 197 is then in communication with Datavana API 199, which may include information regarding entities, entity relationships, industry, article searches entity searches quotes, word clouds, and industry reports. This information may be available by the API.

Figure 4C:
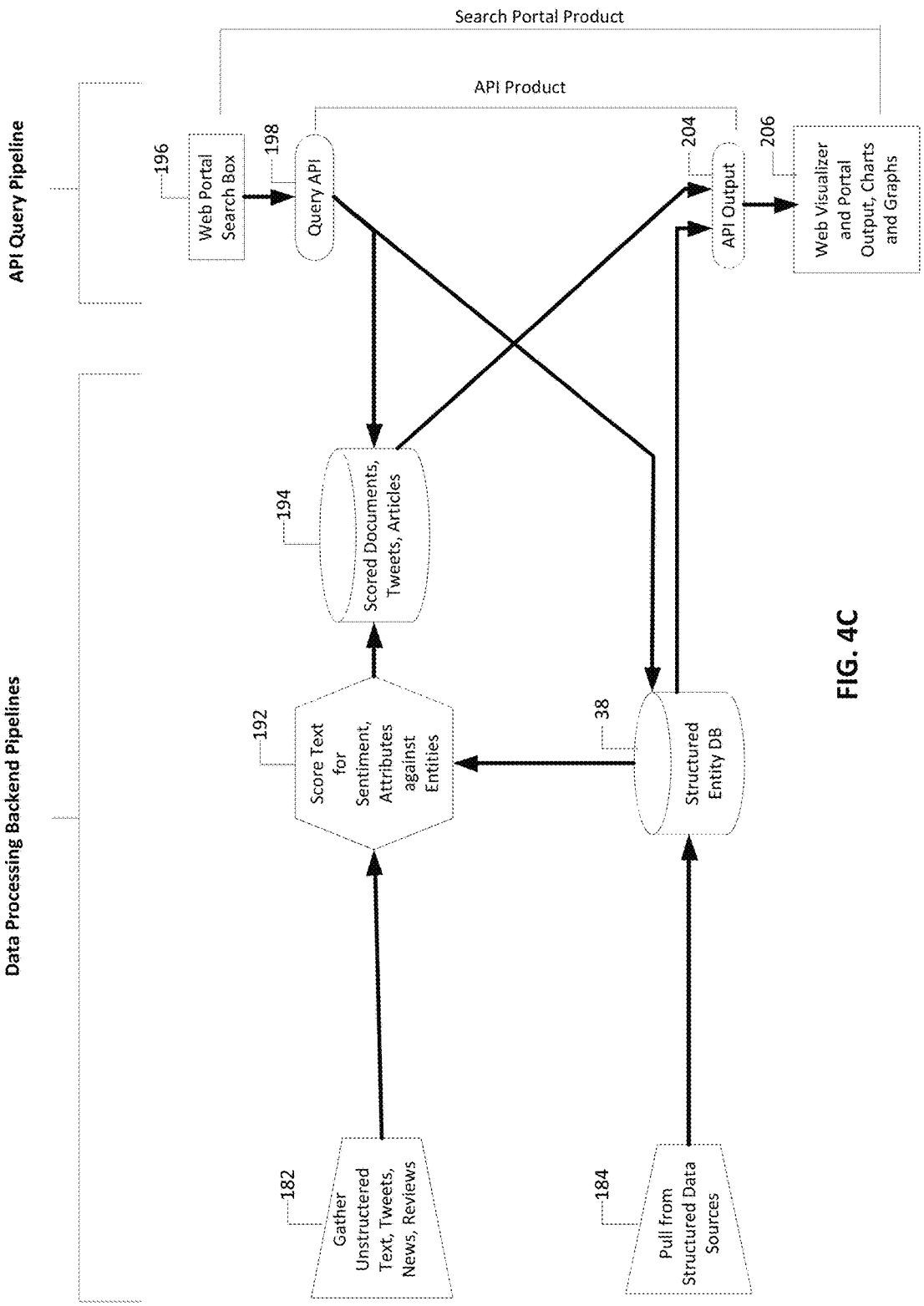
FIG. 4C is a diagram illustrating the process flow of backend data processing of structured and unstructured social media messaging through an opinion search engine and the query processing through an API, in accordance with the present disclosure.

FIG. 4C in an embodiment is a block diagram illustrating, in another embodiment, the process flow 80 of data processing of structured and unstructured social media electronic messages through the opinion search engine and query processing through the API. At step 182, the system 10 is configured to gather and receive text, tweets, news, reviews, and other sources from various social media websites and other sources and detect that these electronic messages or information are unstructured. At step 184, the system 10 is configured to gather or pull structured data from various social media websites and other sources. Unstructured data collection is the collecting of raw, unstructured text from voluminous online public and private data sources. The raw text contains unidentified topics (or entities), such as people, places, things, etc., as well as contextual clues about human opinion towards those entities. An example of such text would be a micro-blogging post from a Twitter® user exclaiming, "I love Justin Bieber's new album." The system 10 also collects data from simple syndication (RSS) feeds, and streaming application programming interfaces (API's). Each data source generally contains textual data in many different formats. For example, RSS Feeds are typically implemented as extensible markup language (XML) pages, while the custom crawlers are designed to parse HTML, which is a different formatting standard.

At step 184, system 10 extracts the entity information and attributes from the structured data. The structured entity information is stored in the database at step 38. At step 192, the system 10 receives a first stream of social media electronic messages and a second stream of social medial electronic messages. The system 10 assigns a score to each textual data for sentiment and attributes against different entities. For identifying one or more entities social media electronic messages that are sourced as unstructured data, the raw unstructured text input is elucidated by comparison with known, structured text, thereby identifying the entities contained within the normalized unstructured data. At step 194, the system 10 stores the scored documents, tweets, and articles. Using a search for Justin Bieber for example, by comparing what is known about Justin Bieber the celebrity in the structured database, (i.e.—the fact that he just released a new album), with the incoming unstructured data being collected by one of his fan's tweet, the system can infer that the fan's Twitter® post is referring to Justin Bieber the celebrity singer, and not some other, lesser known person who is also named Justin Bieber. System 10 adds data to associate the formerly unstructured data with the structured data because the system 10 determines that this particular tweet refers to Justin Bieber, the celebrity. By tagging the incoming tweet as such, the system 10 now establishes that these two data elements are related to one another. This synthesis enables further enrichment, including the scoring of human opinion pertaining to the entities as they occur in the unstructured text—by examining the tweet further, the system 10 infers that this fan has a favorable opinion of Mr. Bieber's new album, and then gives that a numerical score. Because the word "love" was used, instead of some less emphatic term, such as "like," the system might assign this tweet a score of +2 in favor of Mr. Bieber's new album, instead of +1. Finally, the system can also use human sampling and oversight of the automated process to assure the quality and relevance of the data. A human operator, who reviews this example tweet, would likely affirm that it is in fact referencing Justin Bieber, the singer/celebrity. When multiple humans agree with the software program's assessment, a baseline can be established for training the software system in a manner that reinforces greater accuracy and precision in subsequent analyses, thus improving the system over time using a variety of statistical machine learning and natural language processing techniques.

In addition to the unstructured data, system 10 also collects structured data from voluminous online public and private sources regarding known, well-defined entities. An example of such structured data would be collecting information about Justin Bieber's age and height from http://www.wikipedia.org, the public online encyclopedia, automatically via their application programming interface (API). Structured data sources are gathered in the structured entity database before undergoing a similar scoring procedure as the unstructured textual data. The structured data store is extended and enhanced through the gained new knowledge, from the raw unstructured text by labeling all newly discovered topics (entities) with metadata from the structured database, as well as scoring each mention of these known entities for human sentiment. In this example, this tweet now contributes a +2 towards collected public opinion about Mr. Bieber's new album, thus enhancing the favorability of human opinion regarding the album.

After the social media opinions and associated entity relationships have been determined and added to the system 10, the results of this processing and enrichment are then presented to the end-users of the system using two different methods, via an API, as well as via a unique user interface. The API enables other automated software programs to consume this enriched information and adds it as an input to their processing and calculations. Through the web portal search box 196, a query term is processed through the Query API 198, which is configured to interrogate the structured entity database 38 for information that may be associated with the query term. The Query API 198 search result will be exported via the Query API Output 204 and then will deliver the various web visualizers, portal outputs, charts, and graphs to the computer display at step 206, where the web portal search box originated.

Figure 5:
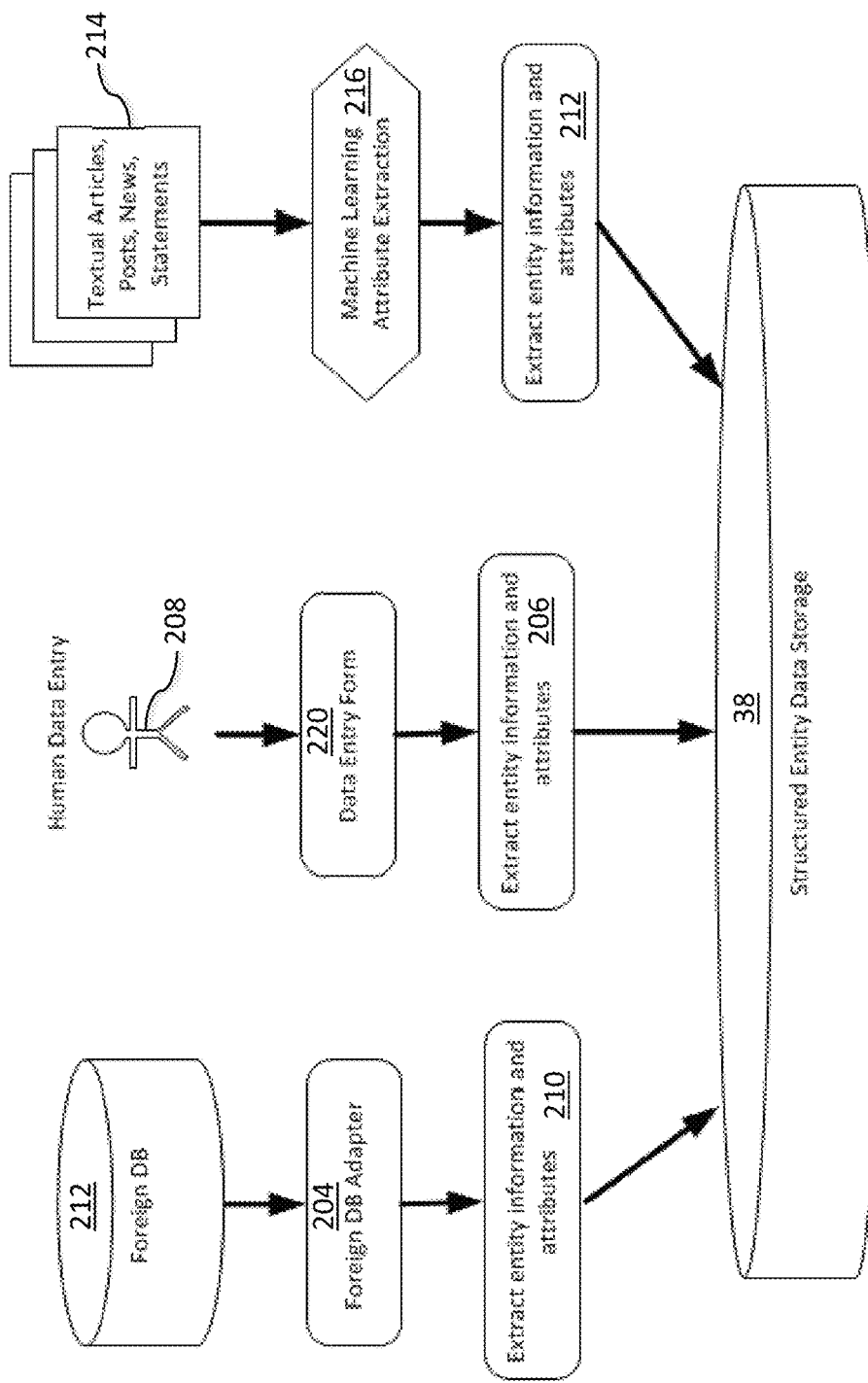
FIG. 5 is a flow diagram illustrating structured entity data storage that receives multiple entity information and attributes from numerous sources in accordance with the present disclosure.

FIG. 5 is a flow diagram illustrating the structured entity data storage 38, which receives multiple entity information and attributes from various sources. In this embodiment, the structured entity data storage 38 receives a first source from the extracted entity information 210 through a foreign database 212 and a foreign database adaptor 204, a second source from the extracted entity information 206 through a human data entry 208 and a data entry form 220, and a third source from the extracted entity information 212 through textual articles, posts, news and/or statements 214 and a machine learning attribute extraction 216. In the first source, the foreign database adapter 204 extracts the entity information and attributes 210 from the foreign databases 212. The second source comes from the human data entry 208 when a user records the information on the data entry form 220 from which the system 10 extracts the entity information and attributes 206. In the third source, the entity information and attributes 212 can also be extracted from textual articles, posts, news, statements, and others 214 through the machine learning attribute extraction 216. The extracted entity information and attributes 210, 206, and 212 are stored on the structured entity data storage 38.

Figure 6:
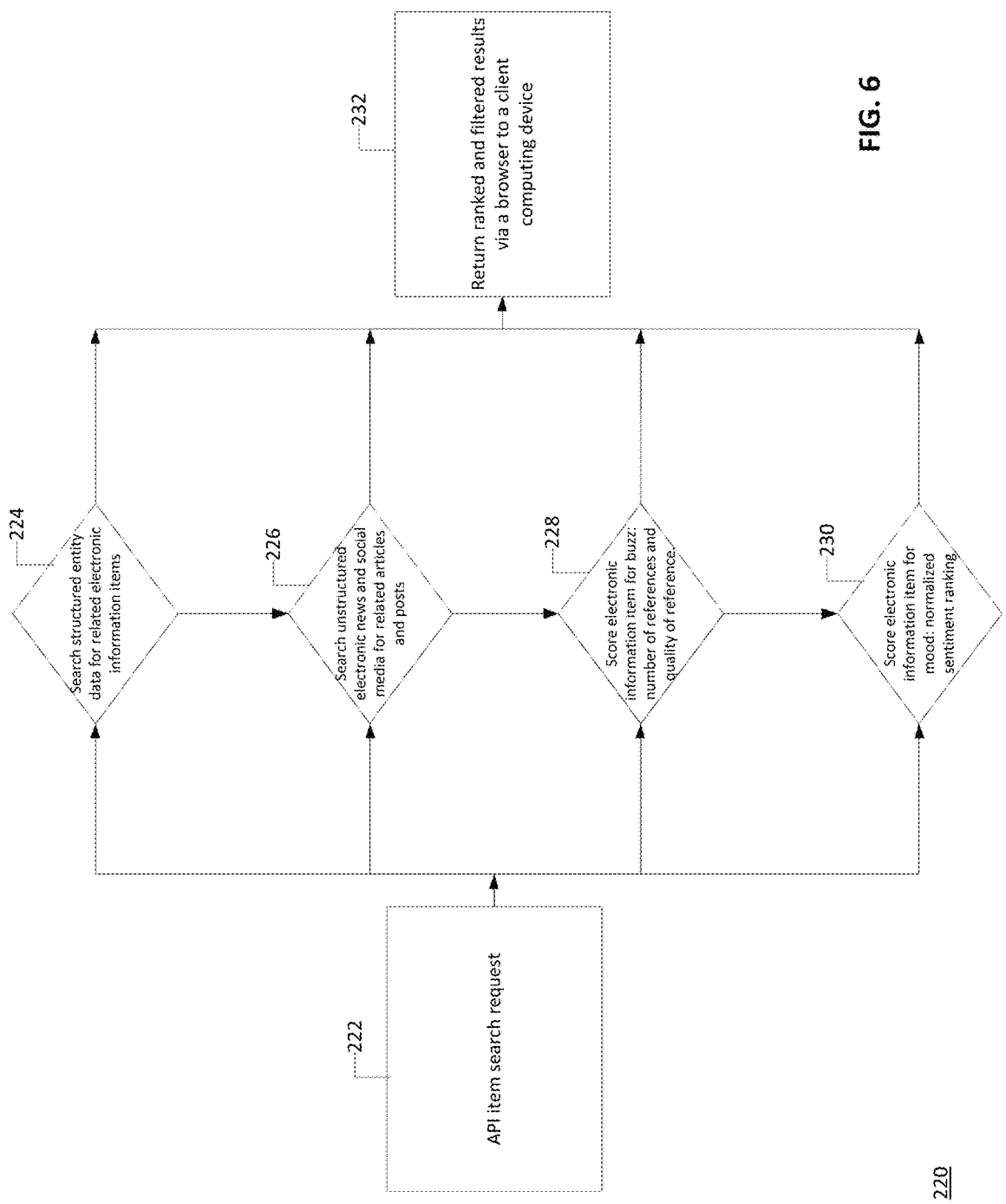
FIG. 6 is a flow diagram illustrating the process flow of the opinion search engine for horizontal opinion processing to generate a structural visual map in accordance with the present disclosure.

FIG. 6 is a flow diagram of entity based opinion search 220. The end user or consumer of the API may be looking for details about how people feel about a certain real world entity, such as Apple Computer or Donald Trump or Valentines Day. That is, they may specifically be interested in how often people discuss the entity in question on social media or how often they speak positively or negatively about the entity, and how the entity compares to related entities. As part of search 222, the system may engage in multiple searching and scoring. When the opinion search engine 20 receives an entity search 222, the opinion search engine 20 (or system 10) is configured to search for and locate related entities. This may be done by first instituting a standard lexicographic search for entities or items matching the given search string. Next, for each match or near match, they system may search through a database of related entities. The entity relationships are identified and maintained via the structured data crawlers that pull in data from crowd sourced information sites, such as Wikipedia and themoviedb.org, and third-party sites like Edgar online and MLB.com. The relationship model allows for a beginning and end date, so we can track relationship changes over time, such as a companies membership in the S&P 500 or a person's term of office in an elected office or membership in a professional sports team.

Additionally, at step 226, the opinion search engine 20 (or the system 10) may be configured to search related news articles and social media related to the entity. This may involve combining a standard lexicographic search through the corpus of collected tweets, news articles, social media posts and blogs, and data collected from product review sites, etc. with entity detection algorithms that identify articles as referring to a specific entity (i.e., the word apple referring to Apple Computer and not the fruit).

At step 228, the opinion search engine 20 is configured to compute a score for the item buzz. For each result, the system generates a buzz score, which is the total number of articles or social media posts that mention that item over a specific period (defaults to 30 days if no specified by the caller). Similarly, a score item for mood is generated for each result at step 230. The generated mood score is an aggregate of the number of positive and negative mentions of an item within the corpus of collected news and social media posts over a specific period of time. Finally, at 232, the system returns an aggregated list sorted by closeness of match and entity buzz to the initial search requested.

Figure 7:
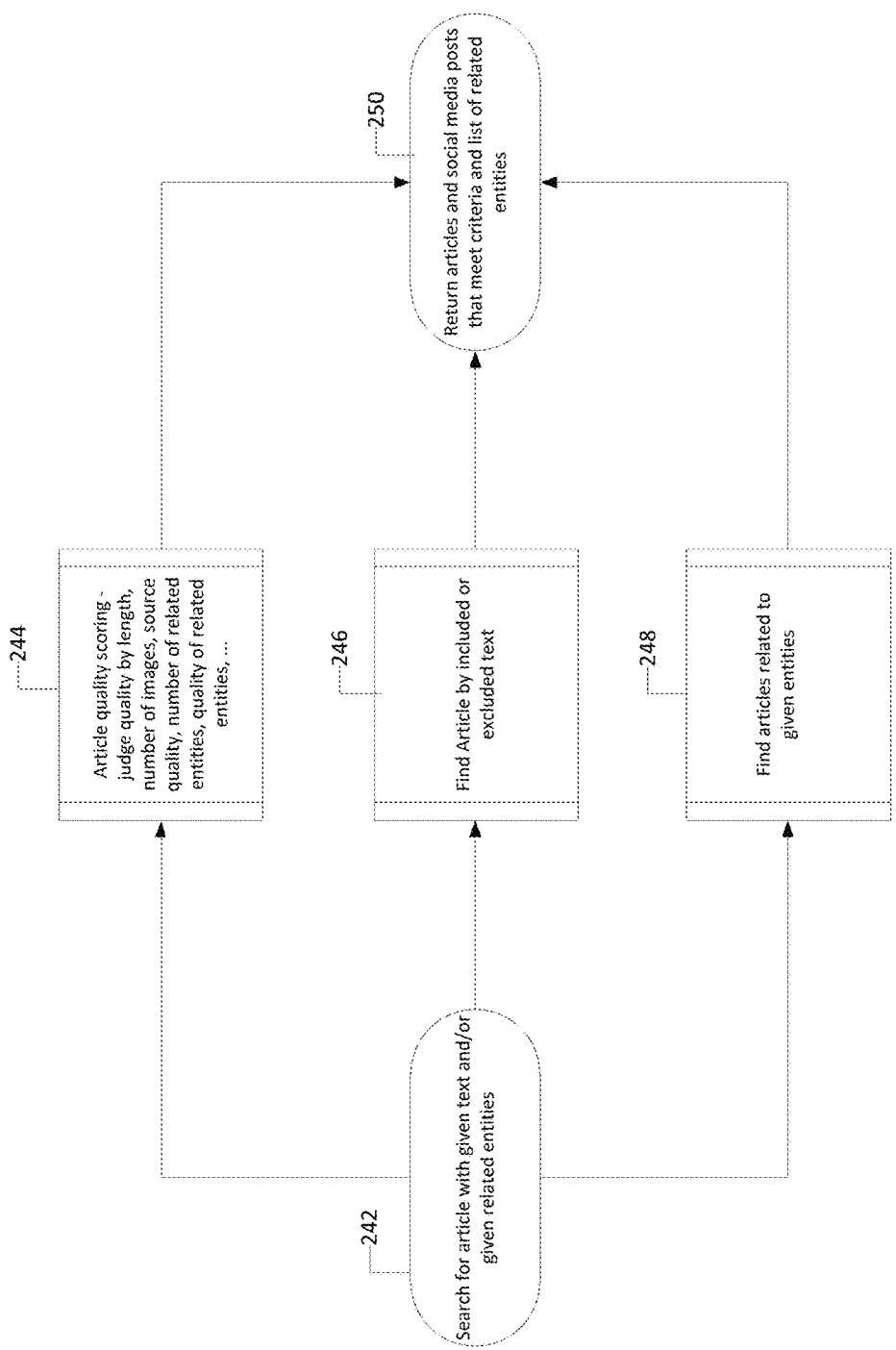
FIG. 7 is a flow diagram illustrating the process flow of the opinion search engine for processing text or entity information and generating a structural representation in accordance with the present disclosure.

FIG. 7 describes an article search request 240. When an end user or API consumer is looking for articles tagged with opinion scores, the search returns lists of identified entities mentioned in the article, and articles or entities similar to or related to the article content or the entities mentioned in the article. For example, searching for "New Hampshire Primary" will return a list of articles about the New Hampshire primary, articles about candidates involved in the New Hampshire primary, and scores about how much online buzz is being generated by the candidates, and how negatively or positively online posters are discussing those candidates. When a query is entered at 242, several searches will occur. The opinion search engine 20 (or the system 10) is configured to compute an article quality scoring at step 244. Article quality score 244 combines rank of the relevant articles by length, number of images, quality of the source (i.e., New York Times vs. Gawker, Tweet by heavily followed author vs. lightly followed author), total buzz on all discovered entities, number of related entities, and buzz score of related entities. The opinion search engine 20 is configured to identify one or more articles at step 246 by text based analysis. Text based search 246 may use standard lexicographical search for articles or structured searches for articles that that include and/or exclude given text. An entity based search 248 is also conducted for a given specific entity. At step 248 as part of the article search request process 240, the opinion search engine 20 is configured to find articles that specifically mention that entity as identified by the systems entity detection algorithms. For example, articles that mention Trump that are referring to Donald Trump but ignore articles about the card game contract bridge that mention trump. The system in an embodiment may also include mentions of entities that are closely related to the given entity or entities as specified by our relationship network. At step 250 as part of the article search request 240, the opinion search engine is configured to return an aggregated list of articles sorted and filtered by closeness of match, article quality score, buzz, and mood rank of the article.

Figure 8:
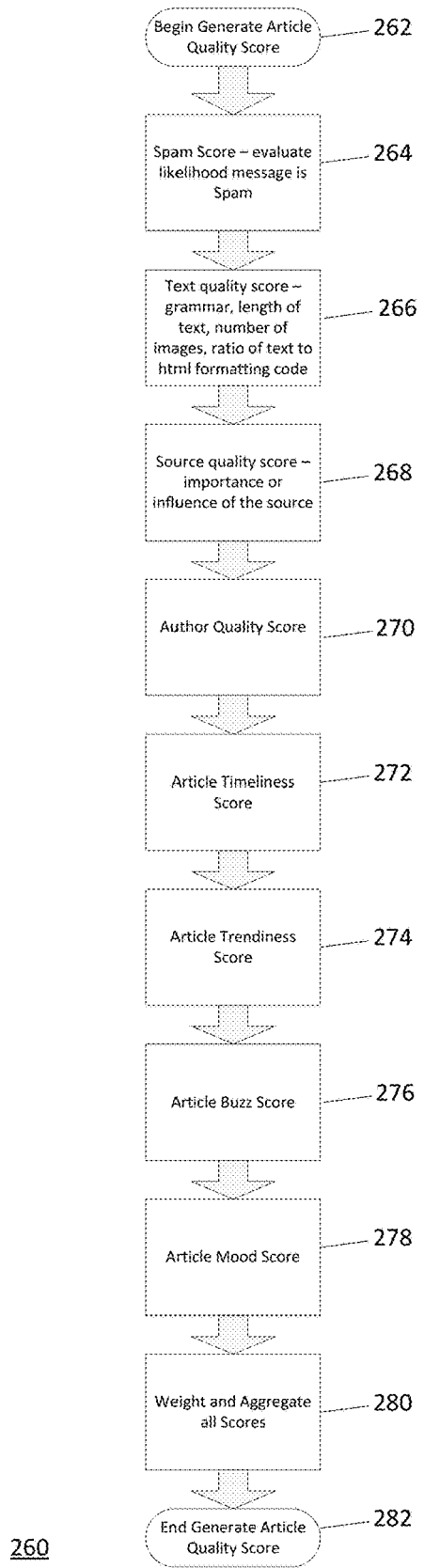
FIG. 8 is flow diagram illustrating the steps for generating an article quality score to be used by the opinion search engine in accordance with the present disclosure.

FIG. 8 describes the process 260 for generating an article quality score. At step 262, the process to generate an article quality score begins. The quality of an article is computed with a weighted sum of features $F=\{f_1, f_2, \ldots, f_n\}$ as shown in the below equation. The weight for each feature is computed using regression techniques, such as linear regression, and ridge regression, etc.

$$\sum_i a_i f_i$$

At step 264, the opinion search engine 20 is configured to determine spam score by identifying the article as more or less likely to be spam depending on its length, presence of specific words or phrases, use of capitalization, spelling, and punctuation. At step 266, the opinion search engine 20 is configured to compute text quality score by assigning a score based the article length, whether or not the article contains images, the number and size of the images, the amount of content bearing text in proportion to the html code or programming script contained in the article posting. All thresholds and scores are dependent on the article source type (e.g. threshold for text length is lower for tweets than news articles). At step 268, the opinion search engine 20 is configured to compute source quality score by assigning scores based on the relative quality of the source dependent on the source type. For example, if the source type is news, the opinion search engine 20 gives more weight to the New York Times than the Weekly World News.

At step 270, the opinion search engine 20 is configured to compute the author quality score, which may vary depending on the source type and may assign more weight to higher reputation authors. For example, for social media tweets, it may prefer articles from posters with larger followings. For review sites, it may prefer posters listed as verified purchasers and/or with higher numbers of useful reviews. The article timeliness score 272 is the weighted score by source type of how current is the article. For example, news articles may be considered timely if posted in the last day or so, tweets are considered timely if posted in the last hour or two. At step 274, the opinion search engine 20 is configured to compute an article trendiness score based on how often and how recently a specific article has been referred to in other articles. For example, how often has the article been linked to in another article, tweeted, or shared. Article buzz score 276 is calculated by the cumulative buzz scores of all the entities identified in the article over an adjustable period of time (default is last 30 days). At step 278, the opinion search engine 20 is configured to compute an article mood score, which is similarly computed by the cumulative mood or sentiment measurement of all the entities mentioned in the article, together with the mood or sentiment expressed in the article text.

At step 280, the opinion search engine 20 is configured to compute weight and aggregate scores 280, which is a combination of all scores to a single number that can be used to rank articles by relative importance and quality. The aggregate score may be output at 282 to generate the article quality score. Aggregation can be weighted for particular usages. For example, a news oriented web site would weight timeliness and trendiness over other qualities, while a social site might prefer higher buzz and strong polarity mood scores.

Figure 9:
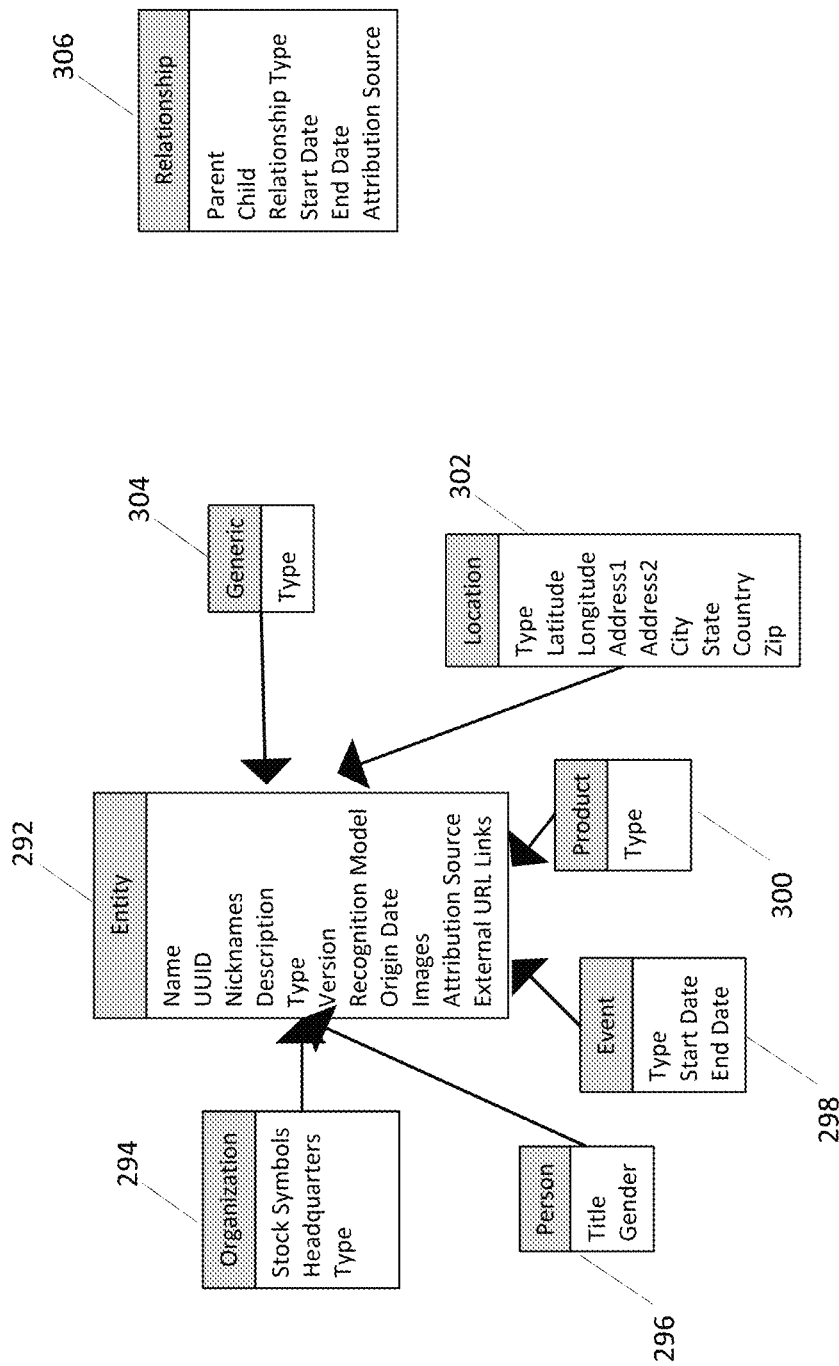
FIG. 9 is a diagram illustrating the criteria that is involved in entity identification in the opinion search system in accordance with the present disclosure.

FIG. 9 is an entity object diagram 290. Entity 292 may be the basic entity object entry and contains the entity recognition model that is a combination of exact match terms, which uniquely identify the entity in an article and a statistical model that provide the probability that a word or word sequence refers specifically to the entity. The entity object also contains a UUID or universally unique identifier, which is used to track the entity across the system.

The entity object also contains details of object, which are required to identify to users of the system such as name, description, and images. Additionally, the entity object contains data, which may be of interest to end users such as attribution of sources where the entity data was extracted, links to external sites related to the entity, the origin date, which depending on entity type is a birth date, company founding date, and product release date, etc. The entity object may also contain a type such as organization 294, person 296, event 298, product 300, location 302, and generic 304, which defines a subclass that may contain additional information related to the entity type.

The organization entity information 294 comprises the organization sub-type (for profit corporation, non-profit, government, and musical group, etc.) stock symbols and associate exchange information (where applicable) and headquarters or capital in the case of national or state level governments. Person entity information 296 may identify person specific information, such as title and gender. Product entity information 300 may be product specific information, such as type (product, product-line, book, movie, and song), UPC code, and ISBN, etc. Location entity information 302 may comprise location specific information, such as latitude, longitude, and address. Generic entity information 304 may comprise additional information related to the entity. Event entity information 298 may relate to event specific information, for example, events like wars, plane crashes, storms, and election campaigns.

Relationship information 306 considers relationship concepts, which are significant to the systems ability to correctly assign buzz and sentiment to entities via comments about related entities. The entity extraction determines relationships, which allow the system to establish relationships between, for example, a company, product lines, and products made by that company, such as Apple Computer maker of the iPhone product line containing the product iPhone 5c. The system also relates entities to logical groupings, such as iPhone as a member of the smartphones group, and Apple as a member of the electronic manufactures group, as well as the S&P 500 group.

A key factor in tracking relationships over time is determining and maintaining the relationship beginning and end date. This allows the system to determine that negative comments about the current Governor of California in 2010 refer to Arnold Schwarzenegger and in 2012 refer to Jerry Brown. Tracking relationships by date also allows the system to develop timelines between related entities and accurately determine buzz and sentiment over time as relationships change. For example, companies come and go from the Dow Jones Industrial Index, and by tracking these relationships over time, we can accurately judge buzz and mood for the changing group.

Below is an example Entity JSON Representation:

```
{
  "terms": [
    "@realDonaldTrump",
    "Donald Trump",
    "#TeamTrump",
    "#Trump2016"
  ],
  "batch_id": "567a77a59b72471f896162f9",
  "insert_date": "2015-03-31T00:59:01",
  "origin_date": "1946-06-14T00: 00:00",
  "update_date": "2016-01-04T20: 16:46",
  "model": "",
  "images": [{
      "etag": "b'87deddf122a755bbd7640a174a320e80'",
      "mime_type": "image/png",
      "attribution": "Bing Search API, ID: 9b629cf3-8f3f-43ef-8417-29ece6184757",
      "url": "/images/5516321c9b724739f3649835/2ba159d5-6577-479a-8495-50ccf6504bf5.png",
      "license": "",
      "image_rank": 1,
      "name": "trump25_sq-bb0cf63927d079b281a304935ca65c16b443cf50-s6-c30.jpg",
      "referrer": "http://www.npr.org/blogs/thetwo-
```

-continued

```
way/2012/10/25/163644146/barbara-walters-to-donald-trump-youre-making-a-fool-of-yourself",
    "image_type": "square",
    "image_id": "2ba159d5-6577-479a-8495-50ccf6504bf5",
    "actual_name": "2ba159d5-6577-479a-8495-50ccf6504bf5.png",
    "width": 200,
    "tag": "Barbara Walters To Donald Trump: You're Making A Fool Of Yourself",
    "height": 200,
    "size": 52713
}, {
    "etag": "b'3600cfc33e3d2eab7512fdc8a583815c'",
    "mime_type": "image/jpeg",
    "attribution": "Bing Search API, ID: c63f88a1-6b1f-426a-b377-c768632bc83b",
    "url": "/images/5516321c9b724739f3649835/3c9c719f-ab23-416e-bfa5-977cb75b5b05.jpeg",
    "license": "",
    "image_rank": 5,
    "name": "donaldtrump3.jpg",
    "referrer": "http://celebcenter.us/donald-j-trump/",
    "image_type": "standard",
    "image_id": "3c9c719f-ab23-416e-bfa5-977cb75b5b05",
    "actual_name": "3c9c719f-ab23-416e-bfa5-977cb75b5b05.jpeg",
    "width": 183,
    "tag": "donaldtrump3",
    "height": 275,
    "size": 6258
}, {
    "etag": "b'26745821308de3498defd2dc8cc7cf90'",
    "mime_type": "image/jpeg",
    "attribution": "Bing Search API, ID: ef65c3bc-ae34-493f-96d6-eebefcf3da12",
    "url": "/images/5516321c9b724739f3649835/bf8f36c1-17a3-425c-a43f-5447acc5244e.jpeg",
    "license": "",
    "image_rank": 4,
    "name": "326_donald_trump.jpg",
    "referrer": "http://www.locatetv.com/person/donald-trump/3227",
    "image_type": "standard",
    "image_id": "bf8f36c1-17a3-425c-a43f-5447acc5244e",
    "actual_name": "bf8f36c1-17a3-425c-a43f-5447acc5244e.jpeg",
    "width": 129,
    "tag": "Donald Trump",
    "height": 200,
    "size": 23064
}, {
    "etag": "b'd503e4d9ecdbff8e742de473c185ef1b'",
    "mime_type": "image/jpeg",
    "attribution": "Bing Search API, ID: 177eec73-10a4-4f02-b77f-717e987924f6",
    "url": "/images/5516321c9b724739f3649835/036054a1-d99e-48e2-9e5c-5e3a8bf13444.jpeg",
    "license": "",
    "image_rank": 3,
    "name": "donald-trump1.jpg",
    "referrer": "http://theperiscopegroup.com/2011/now/what-donald-trump-could-teach-government-about-pr/",
    "image_type": "standard",
    "image_id": "036054a1-d99e-48e2-9e5c-5e3a8bf13444",
    "actual_name": "036054a1-d99e-48e2-9e5c-5e3a8bf13444.jpeg",
    "width": 375,
    "tag": "Donald Trump Announces Scottish Golf course Plans",
    "height": 375,
    "size": 63667
}, {
    "etag": "b'6a02edf1f1d232264326a4c5c900dd4c'",
    "mime_type": "image/jpeg",
    "attribution": "Bing Search API, ID: e5ee7980-8dd6-4871-ac37-0009ccf07c9b",
    "url": "/images/5516321c9b724739f3649835/48f9e73c-aad2-4b7d-8869-d239c8c60634.jpeg",
    "license": "",
    "image_rank": 2,
    "name": "MV5BOTY3NjU3OTY1NV5BM15BanBnXkFtZTcwNjI3Mjc4MQ%40%40._V1_SY317_CR4,0,214,317_AL_.jpg",
    "referrer": "http://www.imdb.com/name/nm0874339/",
    "image_type": "standard",
    "image_id": "48f9e73c-aad2-4b7d-8869-d239c8c60634",
    "actual_name": "48f9e73c-aad2-4b7d-8869-d239c8c60634.jpeg",
    "width": 214,
    "tag": "... rank on imdbpro donald trump producer actor donald trump was born on",
    "height": 317,
```

```
    "size": 13093
 }],
 "gender": "male",
 "hr_description_array": {
    "en": "Donald John Trump (born June 14, 1946) is an American business
magnate, investor, author, television personality, and candidate for President of the United States
in the 2016 presidential election. He is chairman and president of The Trump Organization and the
founder of Trump Entertainment Resorts. Trump's career, branding efforts, lifestyle, and
outspoken manner helped make him a celebrity for years, a status amplified by the success of his
NBC reality show, The Apprentice. Trump is a son of Fred Trump, a New York City real estate
developer. He was strongly influenced by his father in choosing a career in real estate
development. Trump worked for his father's firm, Elizabeth Trump & Son, while attending the
Wharton School of the University of Pennsylvania, and officially joined the company in 1968
upon graduation. In 1971, he was given control of the company, renaming it The Trump
Organization. He remains a major figure in United States real estate and a media celebrity."
 },
 "entity_sub_type": "",
 "title": "",
 "nicknames": [ ],
 "sources": [{
    "rank": 0,
    "description": "The Movie DB",
    "display_text": "The Movie DB",
    "url": "https://www.themoviedb.org/person/33663",
    "source_type": "misc",
    "tags": [ ]
 }, {
    "rank": 0,
    "description": "IMDB",
    "display_text": "IMDB",
    "url": "http://www.imdb.com/name/nm0874339",
    "source_type": "imdb",
    "tags": [ ]
 }, {
    "rank": 0,
    "description": "",
    "display_text": "http://www.donaldjtrump.com",
    "url": "http://www.donaldjtrump.com",
    "source_type": "homepage",
    "tags": [ ]
 }, {
    "rank": 0,
    "description": "",
    "display_text": "https://en.wikipedia.org/wiki/Donald_Trump",
    "url": "https://en.wikipedia.orgiwiki/Donald_Trump",
    "source_type": "wikipedia",
    "tags": [ ]
 }],
 "type": "person",
 "_id": "5516321c9b724739f3649835",
 "keywords": [
    "politician"
 ],
 "tags": [
    "classification_mn:Entertainment.Actors",
    "status:prod"
 ],
 "hr_name_array": {
    "en": "Donald Trump"
 }
}
```

Figure 10:
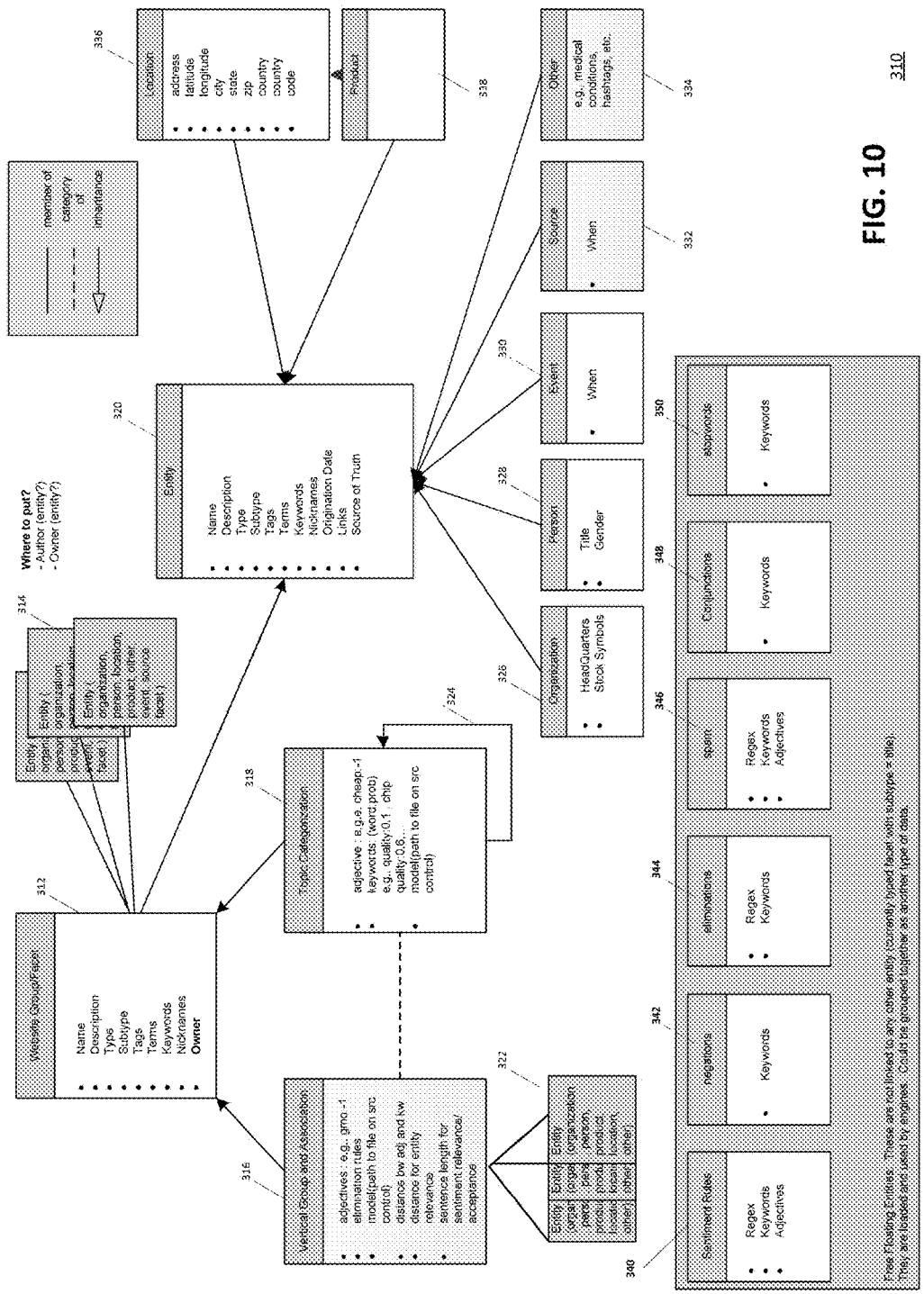
FIG. 10 is a diagram illustrating entity identification and classification in the opinion search system in accordance with the present disclosure.

FIG. 10 illustrates an entity model and database layout 310. At the center of the system is the entity database 320. Data about organizations, people, products, and events are programmatically extracted from crowd sourced, open content media such as Wikipedia, themoviedb.org, as well as curated third-party information sources such as Edgar Online and MLB.com. Entity database 320 is used by the entity recognition engine to precisely identify entities being discussed in articles and social media posts. The system also mines the extracted entity data for relationships between entities to build a network of related items, which we use to measure buzz or popularity of a related group of items, as well as sentiment toward that item.

A website group/facet 312 may receive information about various entities 314 themselves, as well as other sources. The information that feeds website group/facets 312 may be derived from vertical group associations 316 or topic categorizations 318. The website group/facets 312 feeds into the entity database 320 once it has obtained information from other sources. Additionally, the location information 366 and the product information 338 may further identify the entity or characteristics about the entity. Specific characteristics, such as organization 326, person 328, event 330, source 332, and other information 334, may be used to identify and categorize an entity in the entity database 320. Additionally, there may also be free floating entities, such as sentiment rules 340, negations 342, eliminations 344, spam 346, conjunctions 348, and stopwords 350, that are not linked to any other entity. These floating entities may be loaded and used by the various engines and may be grouped together as another type of data.

Figure 11:
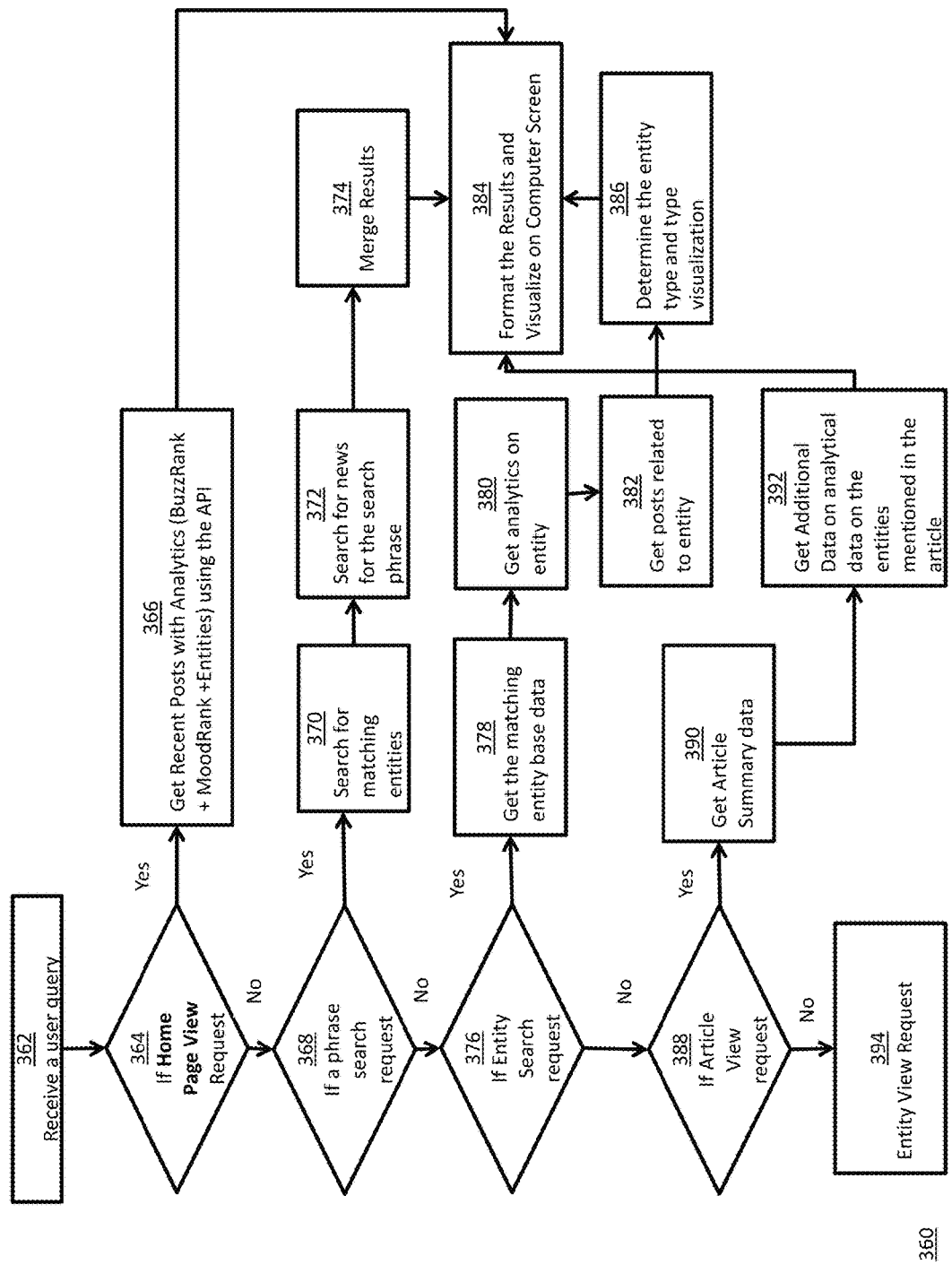
FIG. 11 is flow diagram illustrating a user query in the opinion search system in accordance with the present disclosure.

FIG. 11 is a flow chart illustrating a process 360 for a user query 362. When a user, via a browser or app, visits a website of the present system, the user may view the home page. At step 364 the opinion search engine 20 is configured to display a home page view that shows the recent posts from social media, news sites, and blogs, etc. 366, with associated entities, where the most influential entity on the page is shown in the summary. The posts are ranked with their timeliness and quality. Posts may be pulled from the entity database using the Datavana API.

If the user searches for a phrase at step 368, then at step 370 the system searches all the matching entities for that phrase. At step 370, the opinion search engine 20 is configured to search for the entities by matching lexicographic terms in the phrase to the entity names. Searching for matching entities support fuzzy match and synonyms, as well. Next at step 372, the social media posts and news containing the search phrase are also searched, and the results of both queries is merged at 374 and formatted at 384 to be viewed on the website. The search results contain a summary of posts and entities, as well as the related entities for either post or entity.

If the search was for a specific known entity 376, then the entity base data at 378 is passed to the visualization component, which then gets additional information, such as recent posts 380 relevant to that entity, and additional analytics at 382 to derive trend graph, etc. and determines the entity type and the type of visualization suitable for the query at step 386. These are pulled from database and used to create a visualization at 384 on the computer screen.

If the user is not performing a search, then the user is either looking at the article view at step 388 or the entity view request at 394. If the user action is view article (post) page, then the system first gets the article summary at 390 with the API. The article summary includes the article top image, summary of the content, title, author, and date of the article. At step 392, for each entity found in the article, the system returns their Buzz, Mood, BuzzRank (also referred to as "buzzrank" or "Buzz Rank" or "buzz rank"), MoodRank (also referred to as "moodrank" or "Mood Rank" or "mood rank"), TypeRank, their sentiment in the article, and an image to identify the entity, type of the entity, and word clouds. The system then reformats this information and visualizes it on the computer screen at step 384 on an Internet browser.

Figure 12:
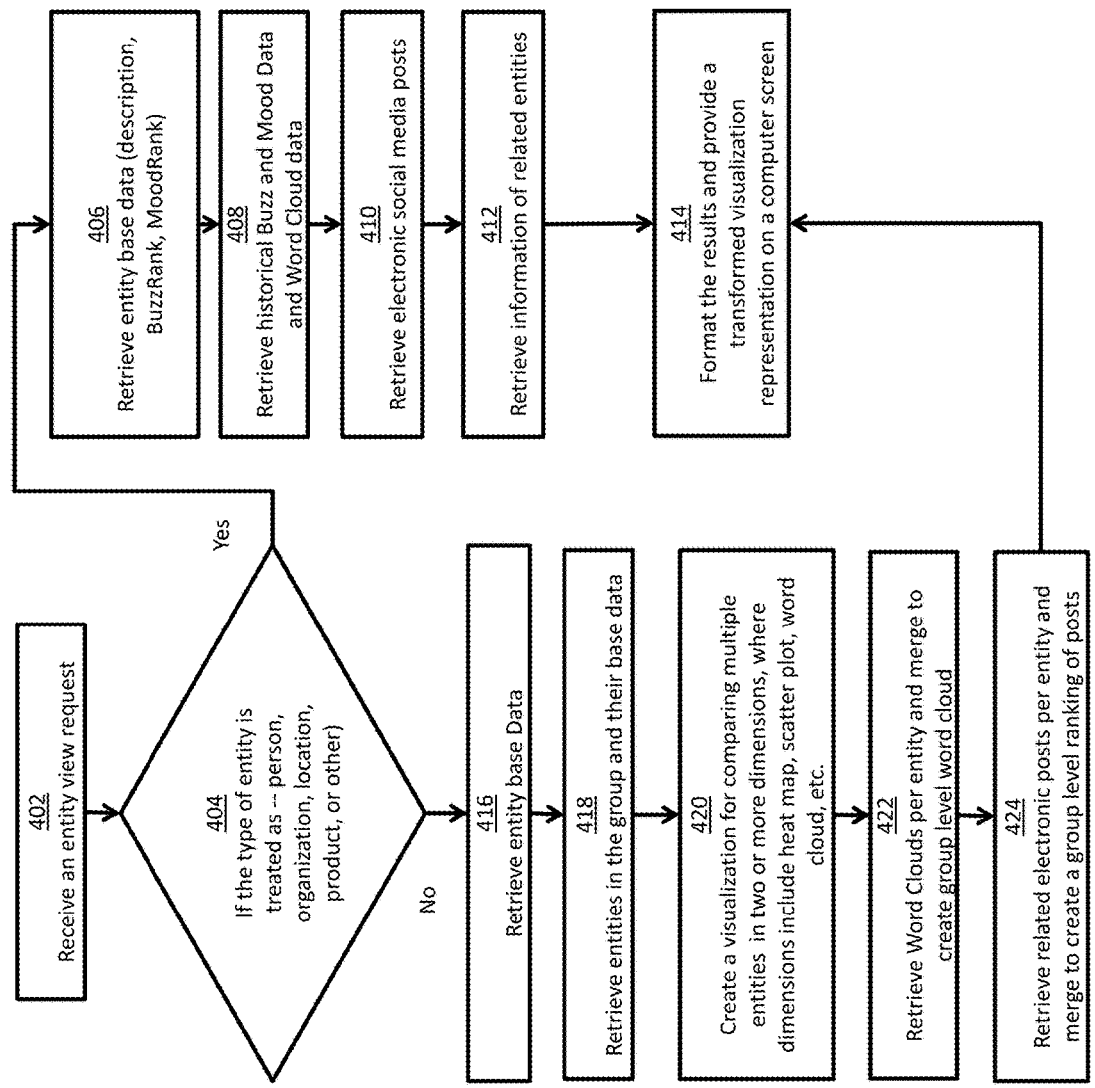
FIG. 12 is a flow diagram illustrating the process flow of an entity view request in the opinion search system in accordance with the present disclosure.

If the request was to view an item, then the entity view request step 394 is invoked. FIG. 12 shows a process flow 400 for a system where the user enters an entity view request 394. When system 10 (or the opinion search engine 20) receives an entity view request 394, the system 10 determines which view should be instantiated. If the entity is a group, then the system 10 uses the group view logic starting at step 402, with the entity basic data such as Buzz, Mood, description, TypeRank, BuzzRank, and MoodRank using API. Next at steps 404 and 406, all the entities in this group are identified via API, and their basic information is pulled from the database with the API. This basic information is used to create a visualization that will help compare multiple entities in two dimensions. For instance heat maps, where the color indicates the sentiment and area used by the cell indicates the buzz. Similarly, scatter plots, with color encoding for sentiment and diameter encoding for buzz, can be used to compare more than two entities visually in a computer screen. In addition to the basic information comparison, a ranked list of related posts to the group (entities in the list) occurs at step 408, and the combined word cloud of entities are shown to support the graphs at step 410.

At step 402, if the requested entity was not a group entity, then a view where basic information and posts, historical Buzz, and Mood data is pulled from databases at step 412. At step 414, all the related entities that are identified via real-world relationships or inferred from the historical co-occurrence data are also pulled from the database. At steps 416, 418, and 420, the related entity data is formatted and visualized on the computer display. The visualization may compare multiple entities using heat maps, scatter plots, and word clouds, etc. At step 422, word clouds may be merged per entity to create a hierarchy of word clouds.

Figure 13:
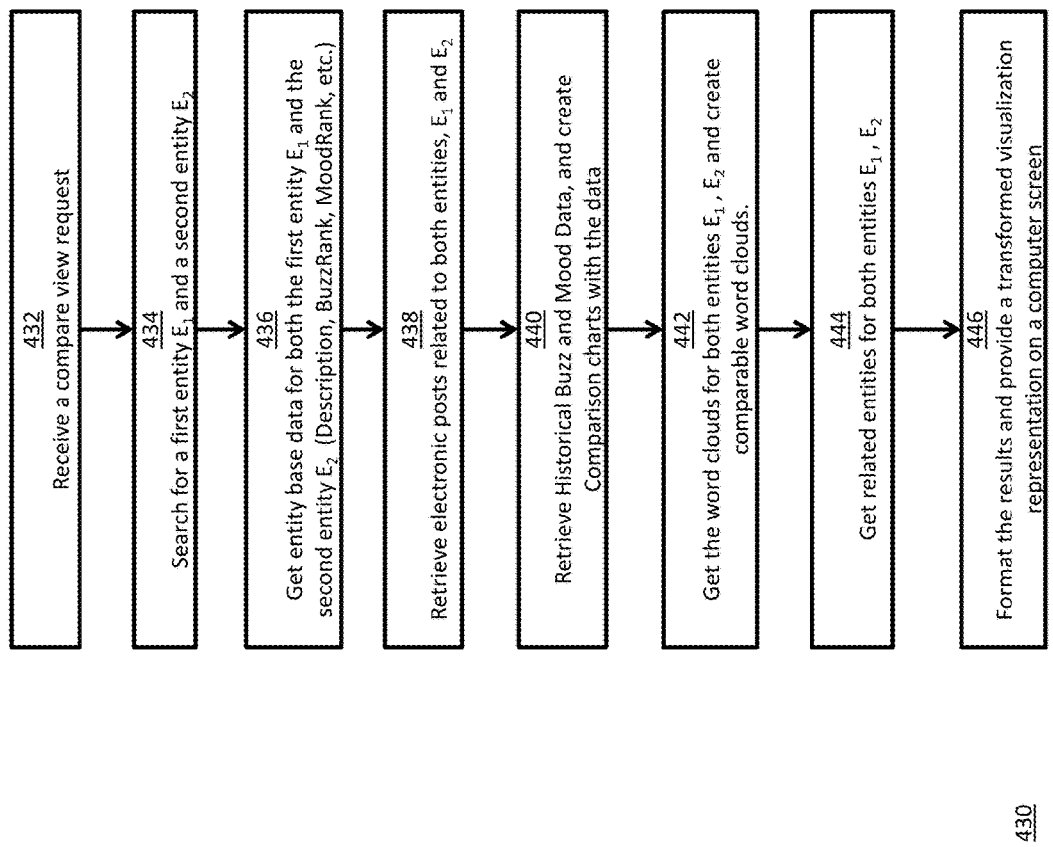
FIG. 13 is a flow diagram illustrating the process flow of a compare request in accordance with the present disclosure.

FIG. 13 shows a process flow 430 of the opinion search interface that compares views. Two or more entities may be compared based on criteria found in the opinion search. At step 432, a query for two or more entities may be requested. At step 434, the opinion search engine 20 is configured to query or search the entity database, and data for entity one and two are retrieved at step 436. The data may include descriptions, buzzranks, and moodranks, etc. The two entities are compared with their buzzrank, moodrank, historical buzz, and mood data. At step 438, the electronic posts for the entities is retrieved, and at step 440, the historical data may be retrieved. At step 442, the posts and word clouds of entities can be retrieved and compared. The system searches for the entities in the database and gets relevant information with APIs to support visualization. The entity buzzrank, moodrank, Typerank, Description, Buzz, and Mood are basic data for both entities that is pulled with API. In social media posts, news mentioning both entities are pulled at step 438, and the related entities for either of the entity in comparison are pulled, as well at step 444. The pulled data is then formatted at step 446 and presented to the user. This view empowers the user to be able to compare entities according to their Buzz, Mood, and mentioned topics.

The BuzzRank of an entity may be computed by dividing its buzz over a period of time divided by the maximum entity buzz for that time period. In one version of a BuzzRank computation, the system returns the percentile value. Hence, the ratio that was computed by dividing the buzz to maximum buzz is then multiplied by 100 in order to compute the percentile. The BuzzRank is indicated with the following equation:

$$BR_{e_i} = 100 * \left( \frac{b_{e_i}}{\underset{e}{\operatorname{argmax}} b_e} \right)$$

where $b_{e_i}$ refers to the buzz of entity i and $BR_{e_i}$ refers to BuzzRank.

The MoodRank may be computed in several ways. For instance, MoodRank can be computed as the ratio of number of positive mentions:

(num_positive_mentions−num_negative_mentions)/(num_positive_mentions+num_negative_mentions+num_neutral_mentions). A sigmoidal mapping is applied for display and ease of comparison. MoodRank may also be computed as (num_positive_mentions−num_negative_mentions)/total_mentions). The system can rank MoodRank against all other entities in the system using the percentiles as show in the below equation.

$$MR_{e_i} = 100 * \left( \frac{m_{e_i}}{\underset{e}{\operatorname{argmax}} m_e} \right)$$

where $$m_{e_i} = \frac{n_{p_{e_i}} - n_{n_{e_i}}}{b_{e_i}}$$

and $m_{e_i}$ is the MoodRank for entity $e_i$ and $n_{p_{e_i}}$ is the number of positive mentions of entity $e_i$ and $n_{n_{e_i}}$ is the number of negative mentions of entity $e_i$.

As used herein, a mention is an article in which an entity is found, and even if an entity is mentioned multiple times, the system only counts it once. A positive mention may be a cumulative mood score, for all sentiment bearing phrases in the article associated with that entity, which is >0. A negative mention occurs where the cumulative mood score for all sentiment bearing phrases in the article is <0. The number of mentions is taken over a given time range (daily, weekly, and monthly).

Figure 14:
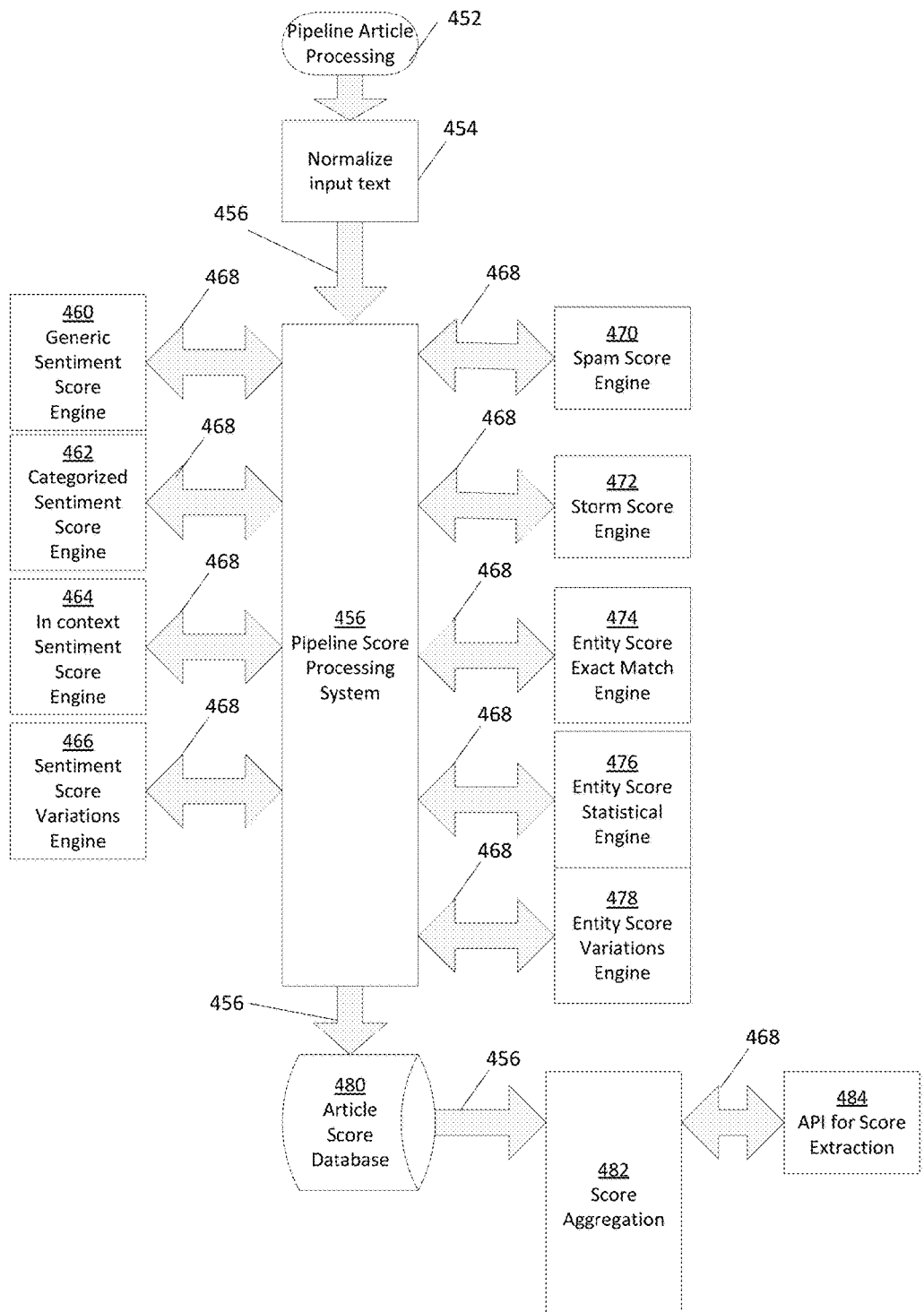
FIG. 14 is a diagram illustrating the article scoring in the opinion search engine in accordance with the present disclosure.

FIG. 14 depicts an open analysis pipeline in an embodiment. The open analysis pipeline 450 is a software architecture that allows the system to score an unstructured article by a variety of overlapping analytical engines in order to produce an increasingly accurate set of results. The pipeline 450 allows the system to slot in additional analytical scoring engines as quickly as they are developed or become available through open source implementations.

When an article is fed into the pipeline 452 of the system, the text is normalized at step 454 to eliminate extraneous data, such as images or formatting code, and is sent to an unidirectional bus 456 and a pipeline score processing system 456 via a variety of overlapping engines 460, 462, 464, 466, 470, 472, 474, 476, and 478, each of which is coupled to a bidirectional bus 488 for communication with the pipeline score processing system 456 for the detection of features, such as spam, twitter storms, entity detection, and sentiment detection. Typical engines include, but are not limited to, a generic sentiment score engine 460, a categorized sentiment score engine 462, an in-context sentiment score engine 464, a sentiment score variations engine 468, a spam score engine 470, a storm score engine 472, an entity store exact match engine 474, an entity score statistical engine 476, and an entity score variations engine 478.

The resulting scores are stored in a score database 480. Scores are aggregated at 482 to serve specific API requests at 484, which may include a confidence filter to only return sentiment and buzz scores that have a high degree of confidence from a majority of analytical engines. In one embodiment, the score aggregation with weighted voting is described below.

For any piece of text, each analytical engine generates an entity, topic or sentiment score. Several ways of computing an aggregated score are possible. In one instance, the aggregated score is computed by applying a weighted voting scheme. Each analytical component (entity extraction component, sentiment extraction component, or topic extraction component) associates each electronic social media post with a score value and a confidence value. Let $S=\{s_1, s_2, s_3, \ldots, s_n\}$ be the set of scores and $C_i = c_{i1}, c_{i2}, \ldots, c_{ik}\}$ be the confidence associated to score $s_i$, by the analytical engines $(E_1, E_2, \ldots, E_k)$.

Then, for each score $s_i$, the weighted voting scheme computes the overall voting weight as follow:

$$w_i = \frac{1}{k} \sum_{i=1}^{k} c_{ik}$$

The voting weight is computed for each score $s_i$ and scores with a voting weight greater than a predefined quota/threshold q is associated with the social media post. Quota q is an adaptive threshold, which is less than a numerical value of 1.

Example

Let symbols A, B, and C represent analytical engines and A={(a, 0.9), (b, 0.8), (c, 0.7)}, B={(a, 0.8), (b, 0.6), (d, 0.5)}, C={(b, 0.5), (c, 0.5), (d, 0.2)} the extracted scores and associated confidences for a particular post. So S={a, b, c, d} and $C_a$={0.9, 0.8, 0.0}, $C_b$={0.8, 0.6, 0.5), ={0.7, 0.0, 0.5}, and $C_d$={0.0, 0.5, 0.2}. Then the weight for each score will be computed as follows:

$$W_a = \frac{(0.9 + 0.8 + 0)}{3} = 0.57$$

$$W_b = \frac{(0.8 + 0.6 + 0.5)}{3} = 0.63$$

$$W_c = \frac{(0.7 + 0.0 + 0.5)}{3} = 0.40$$

$$W_d = \frac{(0.0 + 0.5 + 0.2)}{3} = 0.23$$

If the identified quota q=0.5 then the final list of scores associated with this particular electronic social media post is {a, b}, whereas if it was 0.25, the final list of scores is computed as {a, b, c}.

Figure 15:
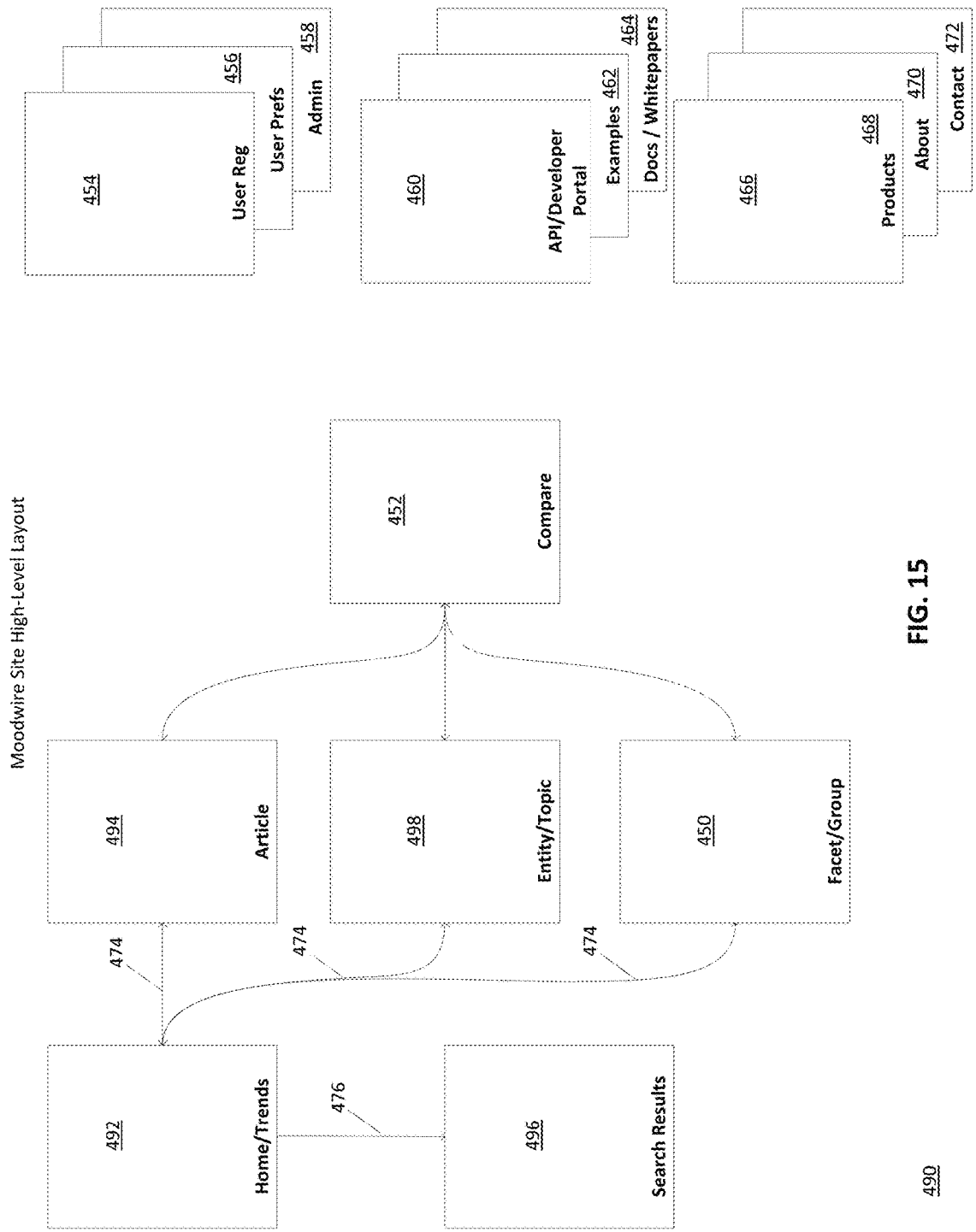
FIG. 15 is a graphical diagram illustrating a high-level layout of an interface for an opinion search engine in accordance with the present disclosure.

FIG. 15 is a graphical diagram illustrating a high-level layout of an interface 490 for an opinion search engine in accordance with the present disclosure. A Home/Trends page 492 is the front page into the site and contains articles, entities, and topics filtered by article quality, timeliness, trendiness, buzz, and mood scores. The opinion search engine 20 can perform a search query to find a particular topic of interest, which brings up the search results page 494 where the search results are a mix of articles, entities, and topics filtered by the analytic scores. From either the Home/Trends 492 or the Search Results 494, the opinion search engine 20 can navigate to the Article page 496, Entity/Topic page 498, or Facet/Group page 500. From any of these pages, 496, 498, or 500, the user can navigate to a Compare page 502 where the selected Article, Entity, or Group can be compared to another Article Entity or Group with the analytic scores visual transformation displayed side by side. A User Reg 504, User Prefs 506, and Admin 508 pages are used for user registration, user experience customization, and user access control. An API/Developer Portal 510, Examples 512, and Docs/Whitepapers 514 pages contain how-to information for users looking to connect through the application programming interface or get a better understanding of the generation of the analytic scores underlying the visual display. A Products page 516, an About page 518, and a Contact page 520 contain information about the company, company products, and company contact information.

Figure 16A:
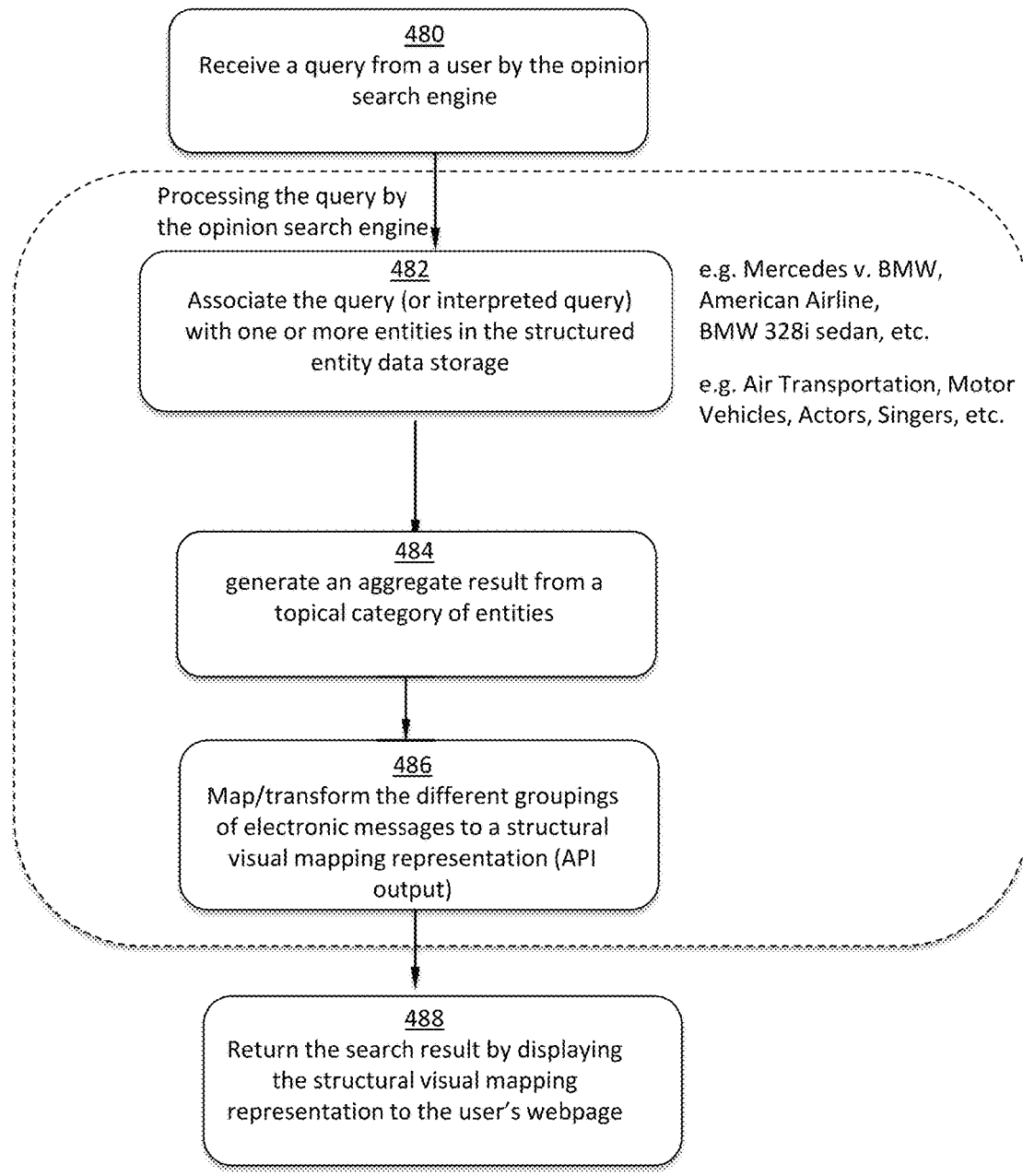
FIG. 16A is a flow diagram illustrating the process flow of a user query in accordance with the present disclosure.

FIG. 16A is a flow diagram illustrating the process flow of the opinion search engine for horizontal opinion processing to generating a structural visual mapping representation. At step 480, the opinion search engine 20 is configured to receive a query from a user on the webpage through the Internet or other wireless communication medium. In other embodiment of the invention, the query can be from other sources, such as a mobile application, and not limited to webpage. At step 482, the opinion search engine 20 is configured to associate the received query to one or more entities in the structured entity data storage, such as, for example, American Airline or BMW 328i sedan, and the normalized unstructured textual data. The query can also be a comparison query, such as between different automobile brands, Mercedes verses BMW. Optionally, the system 10 can take the query with a certain term, or a phrase or a sentence, and interpret the meaning of the query for associating with one or more entities in the structured entity data storage 38. At step 484, the opinion search engine 20 is configured to generate an aggregate result from a topical category of entities, such as Air Transportation, Motor Vehicles, Actors, etc. At step 486, the opinion search engine 20 is configured to transform or map the different groupings of electronic messages to a structural visual mapping representation to generate an API output and then return the result to the user's webpage by displaying the structural visual mapping representation at step 488.

Figure 16B:
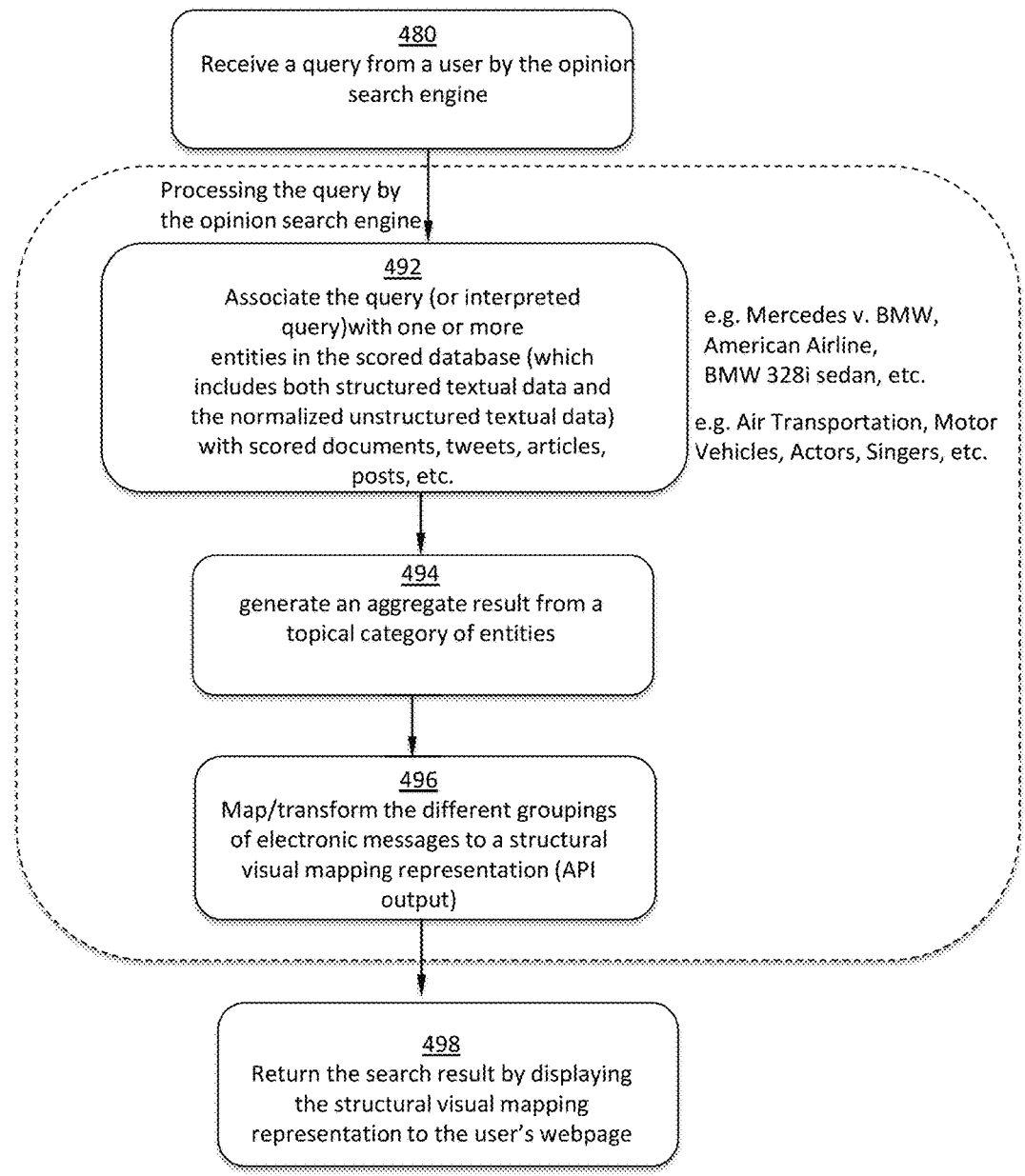
FIG. 16B is a flow diagram illustrating the process flow of a user query in accordance with the present disclosure.

FIG. 16B is a flow diagram illustrating the process flow of the opinion search engine for horizontal opinion processing to generating a structural visual mapping representation. At step 480, the opinion search engine 20 is configured to receive a query from a user on the webpage through the Internet or other wireless communication medium. In other embodiment of the invention, the query can be from other sources, such as a mobile application, and not limited to webpage. At step 492, the opinion search engine 20 is configured to associate the query (or interpreted query) with one or more entities in the scored database (which includes both structured textual data and the normalized unstructured textual data) with scored documents, tweets, articles, posts, etc. Optionally, the system 10 can take the query with a certain term, or a phrase or a sentence, and interpret the meaning of the query for associating with one or more entities in the structured entity data storage 38. At step 494, the opinion search engine 20 is configured to generate an aggregate result from a topical category of entities, such as Air Transportation, Motor Vehicles, Actors, etc. At step 496, the opinion search engine 20 is configured to transform or map the different groupings of electronic messages to a structural visual mapping representation to generate an API output and then return the result to the user's webpage by displaying the structural visual mapping representation at step 498.

Figure 17:
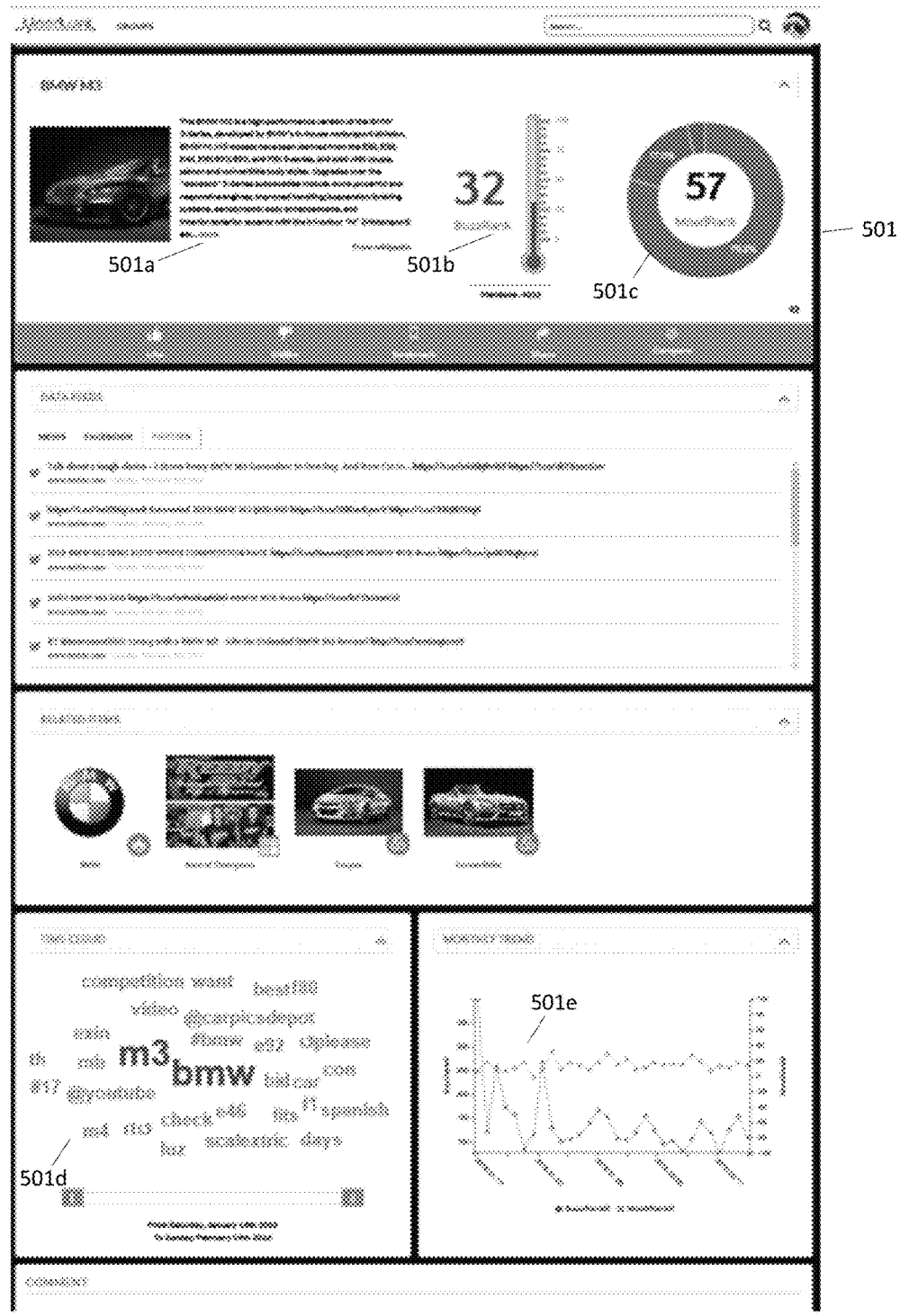
FIG. 17 is a graphical diagram illustrating an opinion search result with a single entity view graphical layout from a query searched through an opinion search engine in accordance with the present disclosure.

FIG. 17 is a is a graphical diagram illustrating an opinion search result with a single entity view graphical layout 500 via a web browser on a computer display from a query searched through an opinion search engine. The single entity view graphical layout 500 that displayed on the computer screen, on either a computer or a mobile device, has different areas that provide material social media opinions. In this illustration, a top area 501 on the single entity view graphical layout 500 provides some generation description 501a about BMW3, a BuzzRank numerical value 501b of 32 as scored by collected from various social media posts, and a MoodRank numerical value 501c of 57 as scored by collecting from various social media posts. In addition to data feeds and related news items, the single entity view graphical layout 500 has another area that displays a time cloud 501d with a time bar and a graph 501e on monthly trends of the selected entity, BMW3.

Figure 18A:
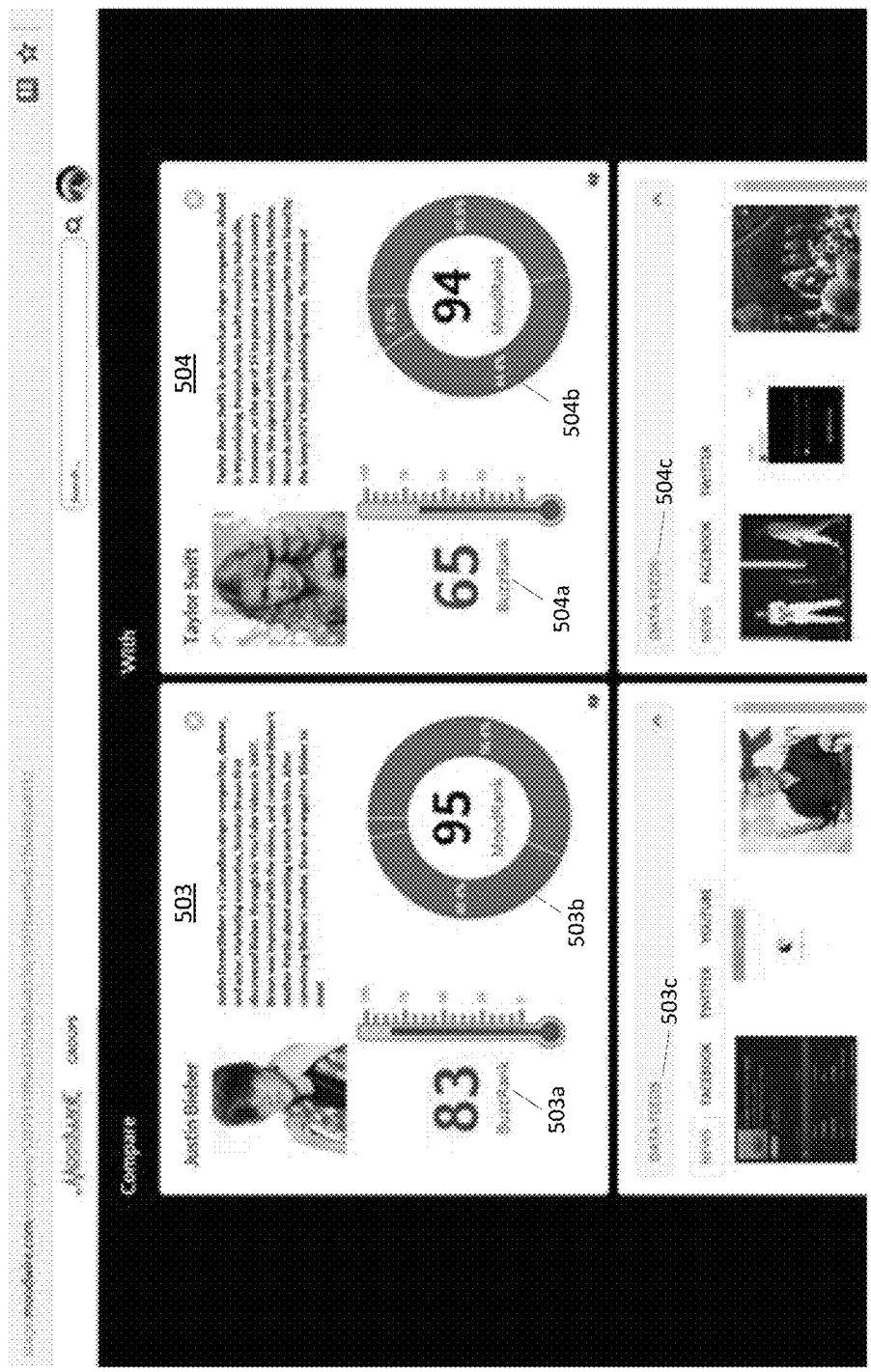
FIG. 18A is a graphical diagram illustrating an opinion search result with a similar comparison entity view graphical layout, between a first entity Justin Bieber and a second entity Taylor Swift, from a query searched through an opinion search engine in accordance with the present disclosure.
Figure 18B:
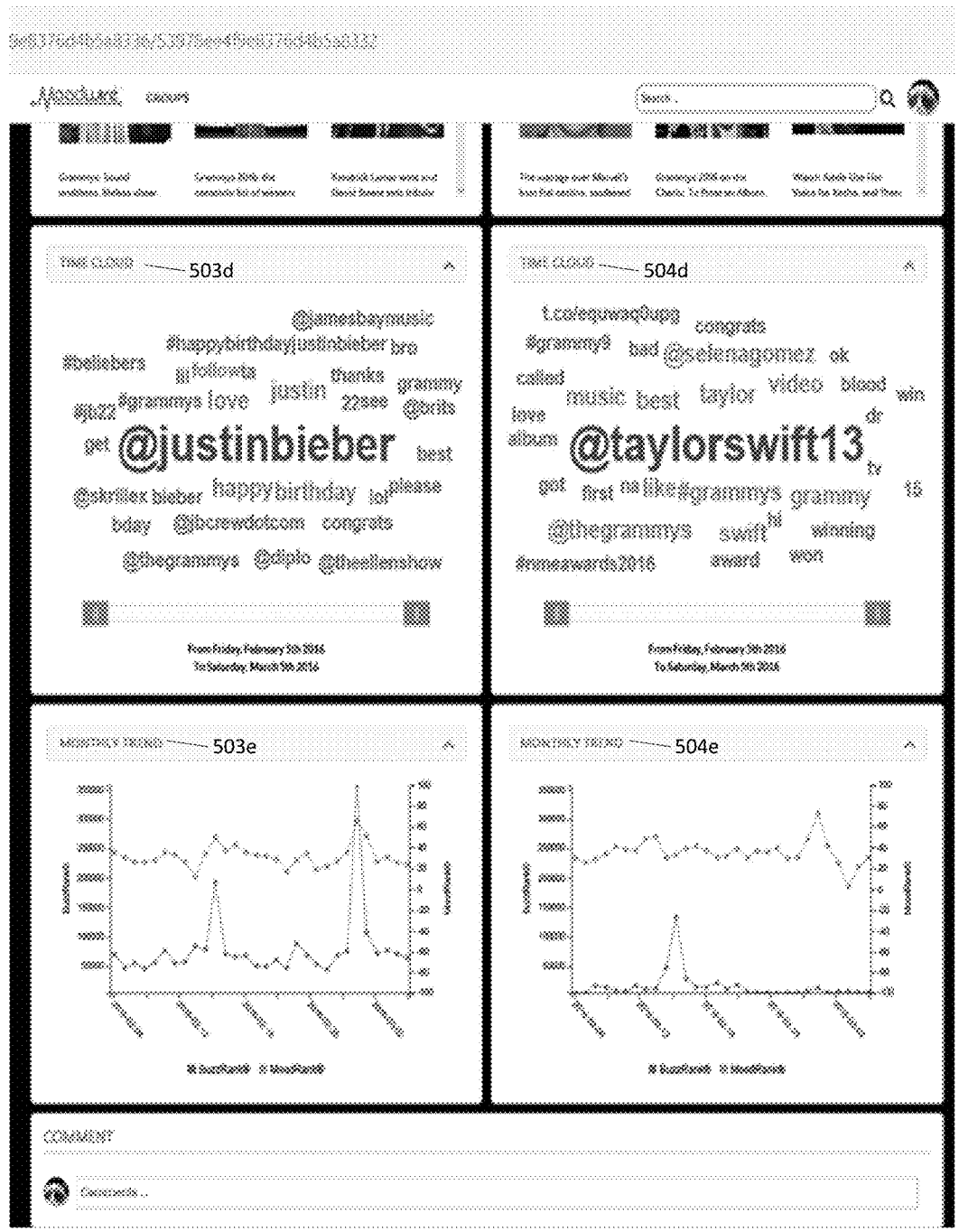
FIG. 18B is a graphical diagram illustrating an opinion search result with additional opinion data on Buzz and Mood comparison over a period of time with respect to the comparison entity view graphical layout as shown in FIG. 18A from a query searched through an opinion search engine in accordance with the present disclosure.
Figure 18C:
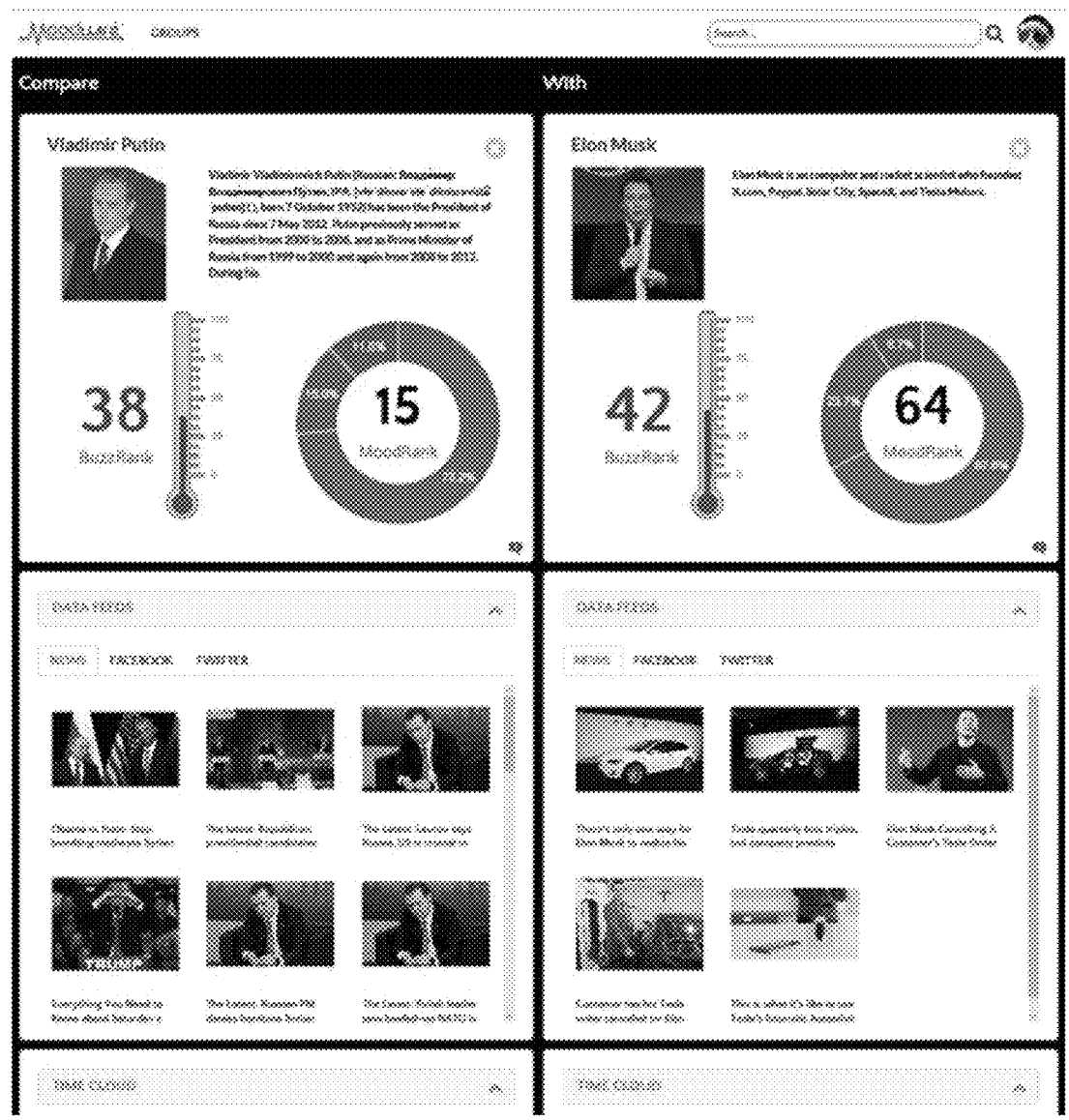
FIG. 18C is a graphical diagram illustrating an opinion search result with a comparison entity view graphical layout, between a first entity Vladimir Putin and a second entity Elon Musk, from a query searched through an opinion search engine in accordance with the present disclosure.

FIG. 18A is a graphical diagram illustrating an opinion search result 502 with a similar comparison entity view graphical layout, between a first entity Justin Bieber and a second entity Taylor Swift, from a query searched through an opinion search engine; FIG. 18B is a graphical diagram illustrating the opinion search result 502 with additional opinion data on Buzz and Mood comparison over a period of time with respect to the comparison entity view graphical layout as shown in FIG. 18A from a query searched through an opinion search engine. The opinion search engine 20 receives a query to compare the first entity Justin Bieber with the second entity Taylor Swift. The opinion search engine 20 computes and returns the opinion search result 502 on a computer display, with Justin Bieber on the left column 503 and Taylor Swift on the right column 504. The opinion search result 502 shows the user that Justin Bieber has a higher BuzzRank score 503a of 83 than Taylor Swift's BuzzRank score 504a of 65, and Justine Bieber has a higher MoodRank score 503b of 95 than Taylor Swift's MoodRank score 504b of 94. The public sentiments on social media posts from the opinion search result 502 reveals that Justin Bieber is more popular than Taylor Swift based on the BuzzRank and MoodRank. The opinion search result 502 further displays Justin Bieber's data feeds 503c, a time cloud 503d, and a monthly trend 503e on the left column 503. The opinion search result 502 also displays Taylor Swift's data feeds 504c, a time cloud 504d, and a monthly trend 504e on the left column 504. Another graphical diagram in FIG. 18C illustrates an opinion search result 505 with a comparison entity view graphical layout, between a first entity Vladimir Putin and a second entity Elon Musk, from a query searched through an opinion search engine.

Figure 19:
FIG. 19 is a graphical diagram illustrating an opinion search result with a comparison entity view graphical layout between seemingly incomparable entities, between a first entity Justin Bieber and a second entity United Airlines, from a query searched through an opinion search engine in accordance with the present disclosure.

FIG. 19 is a graphical diagram illustrating an opinion search result 506 with a comparison entity view graphical layout between seemingly incomparable entities, between a first entity Justin Bieber 506a and a second entity United Airlines 506b, from a query searched through an opinion search engine.

Figure 20A:
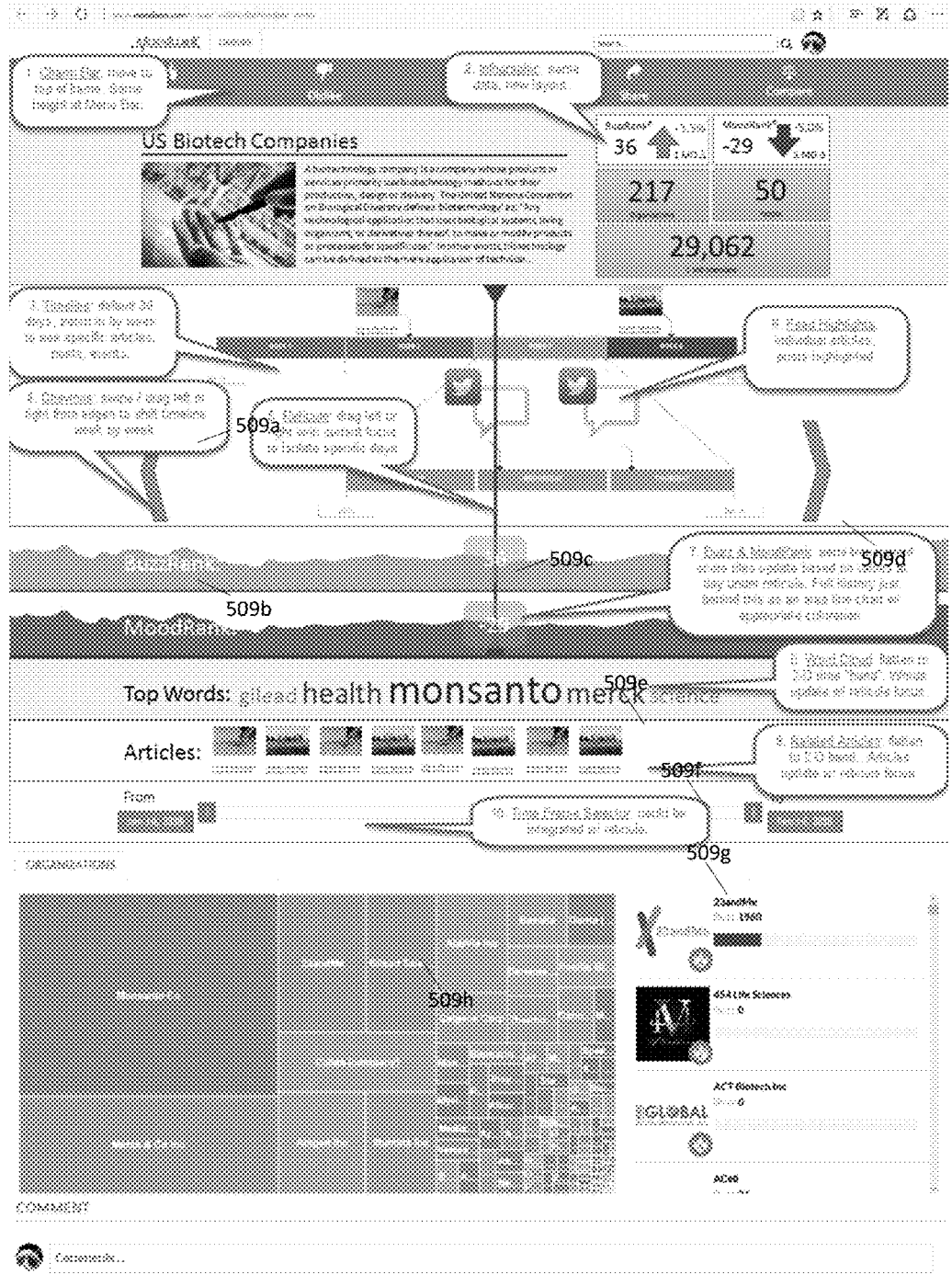
FIG. 20A is a graphical diagram illustrating an opinion search result showing social media inflections and annotations on various points on a timeline, along with a heat map with a Group View, from a query searched through an opinion search engine in accordance with the present disclosure.
Figure 20B:
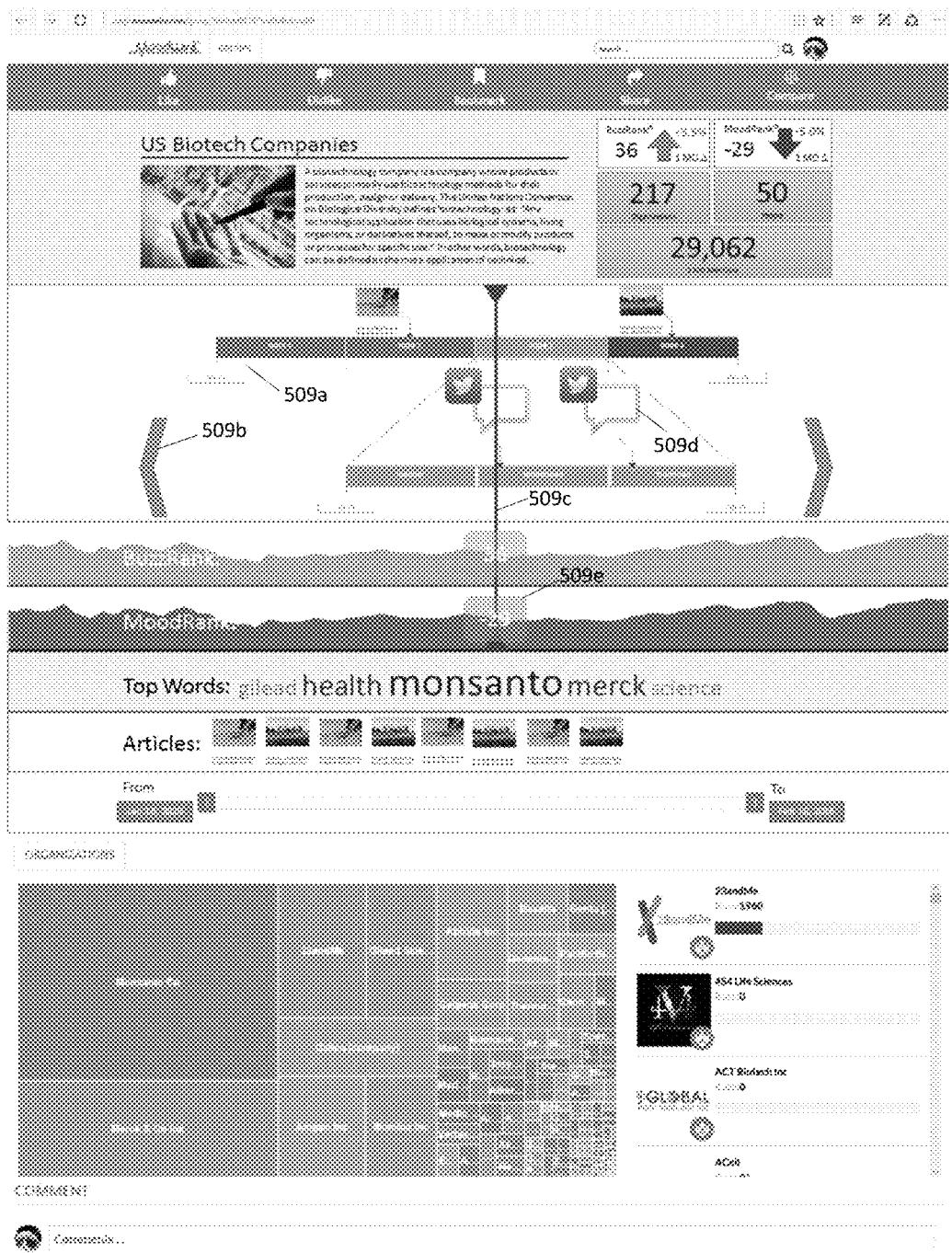
FIG. 20B is a graphical diagram illustrating an opinion search result showing social media inflections on various points on a timeline on the evolvement of Buzz and Mood changes, along with a heat map with a Group View, from a query searched through an opinion search engine in accordance with the present disclosure.

FIG. 20A is a graphical diagram illustrating an opinion search result 508 showing social media inflections and annotations on various points on a timeline, along with a heat map with a Group View, from a query searched through the opinion search engine 20. In this embodiment, the opinion search result 508 displays the graphics and text layout on a computer display in response to a search query for a single entity, Monsanto, that produces various aggregated social media information on a Timeline (or a timeline scale) 509a, which has a default time duration of 30 days that is adjustable, with the capability to zoom in on a particular week to see specific electronic articles, specific social media posts, or specific events. The opinion search result 508 on the computer display also includes a Chevrons 509b to swipe or drag left or right from edges to shift timeline by the increment of week by week. A Reticule 509c in the opinion search result 508 provides the functional capability to drag left or right within current focus to isolate specific electronic articles, specific social media posts, or specific event, to specific days. A Feed Highlights 509*d* provides the capability in which individual articles or electronic social media posts are highlighted. The opinion search result 508 includes a Buzz and Mood Rank 509*e* based on values at day under reticule, which is shown as semi-transparent score tiles updated. A full history located just behind the semi-transparent score tiles has an area line chart with suitable coloration. A Word Cloud 509*f* is flatten to a two-dimensional (2-D) time "band" in this instance to aggregate the various social media posts, graphics and description onto a web page of the computer display. Words in the Word Cloud 509*f* are updated with reticule focus. The opinion search result 508 includes a Related Articles functional feature 509*g*, which flatten the electronic articles to 2-D bands, and the articles are updated with reticule focus. A Time Frame Selector 509*h* provides the capability to integrate with reticule. A corresponding transformed graphical display of the opinion search result 508 is shown in FIG. 20B without the annotations as shown in FIG. 20A, and illustrate the opinion search result 508 with social media inflections on various points on a timeline on the evolvement of Buzz and Mood changes, along with a heat map with a Group View, from a query searched through an opinion search engine.

Figure 21A:
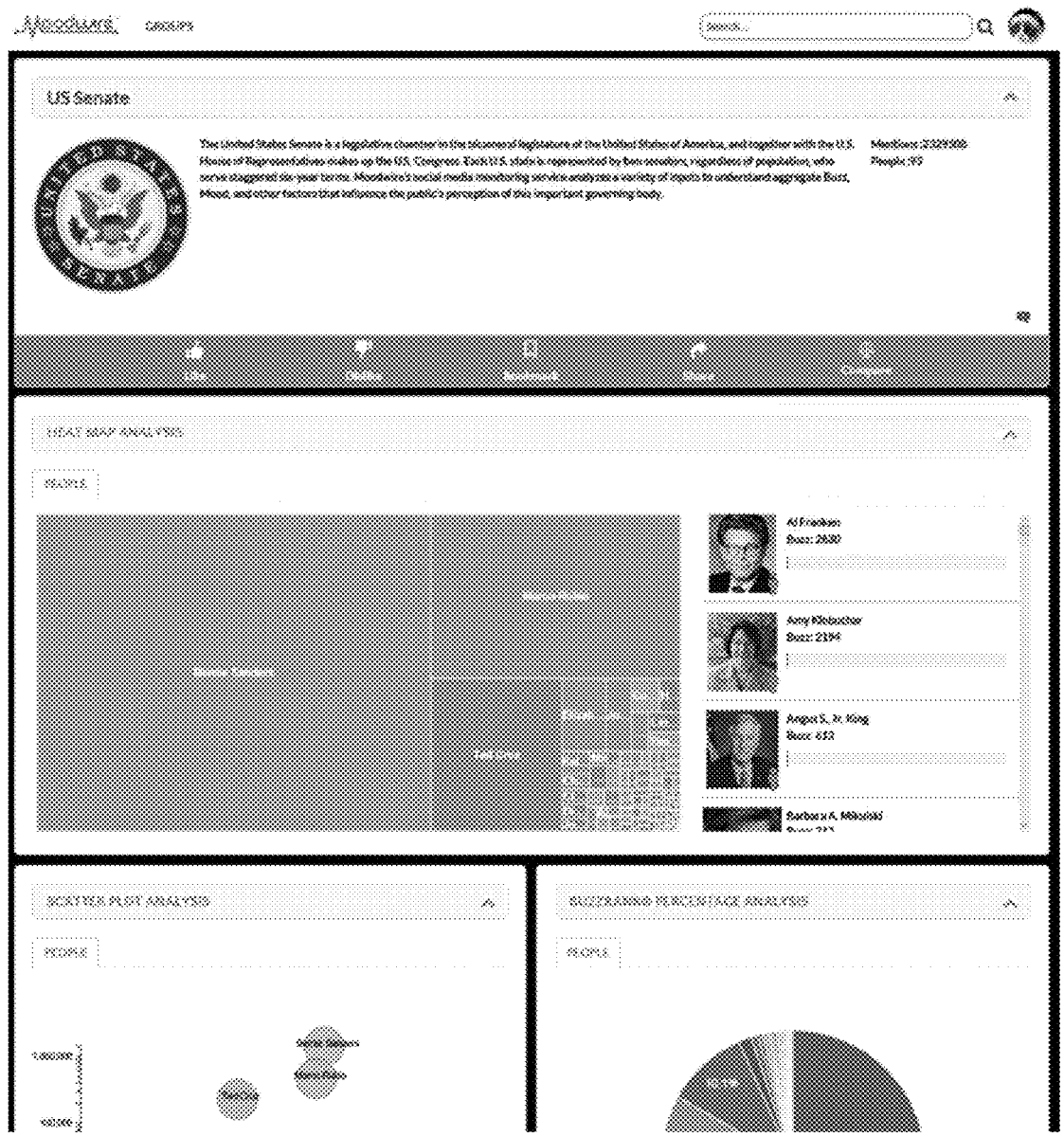
FIG. 21A is a graphical diagram illustrating an opinion search result of a sample webpage in the Group View from the opinion search engine showing US senators in accordance with the present disclosure.
Figure 21B:
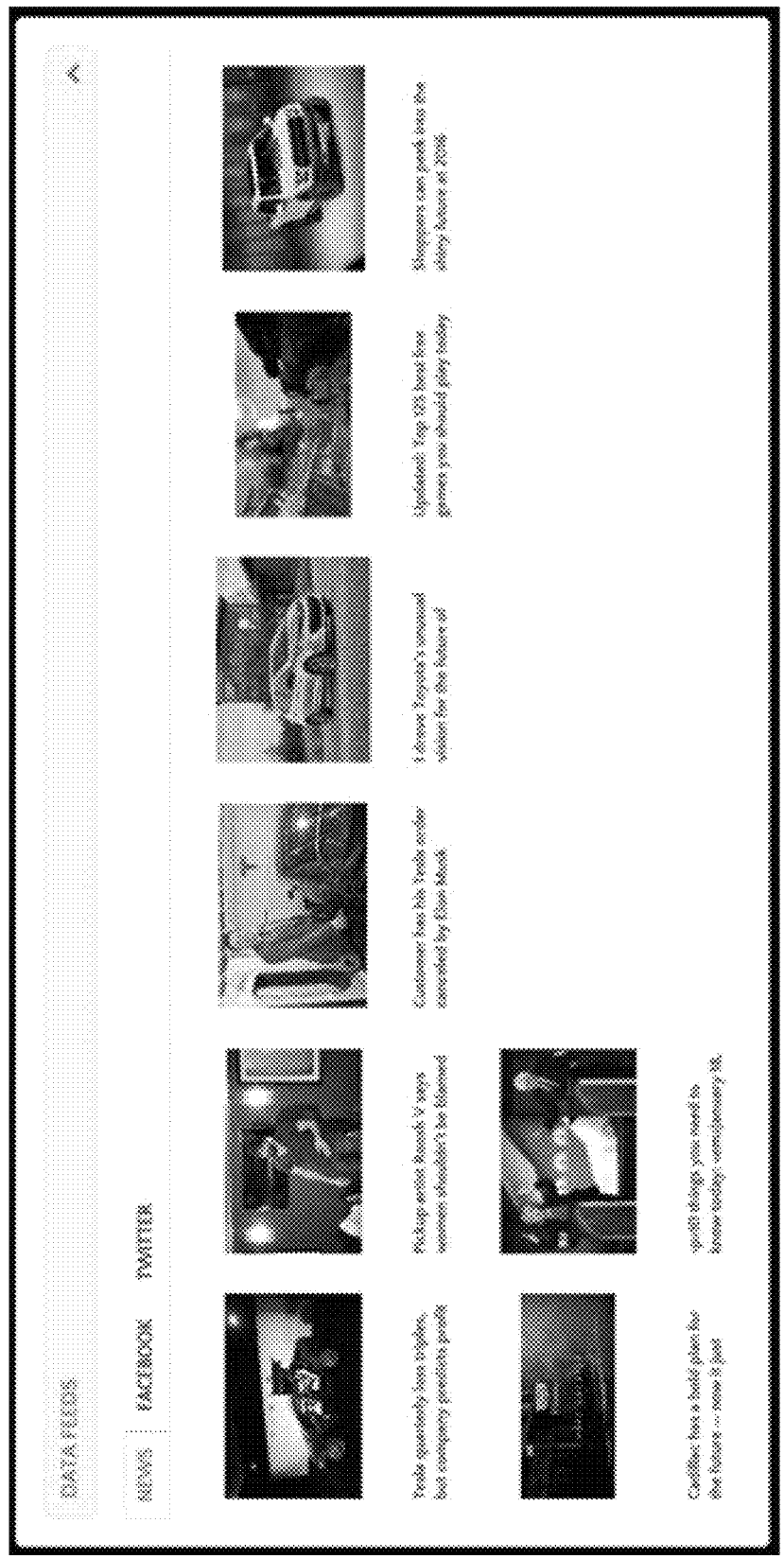
FIG. 21B is a graphical diagram illustrating an opinion search result of another sample webpage in the Group View from the opinion search engine showing US senators in accordance with the present disclosure.

FIG. 21A is a graphical diagram illustrating an opinion search result of a sample webpage in the Group View from the opinion search engine showing US senators; FIG. 21B is a graphical diagram illustrating an opinion search result of another sample webpage in the Group View from the opinion search engine showing US senators.

Figure 22:
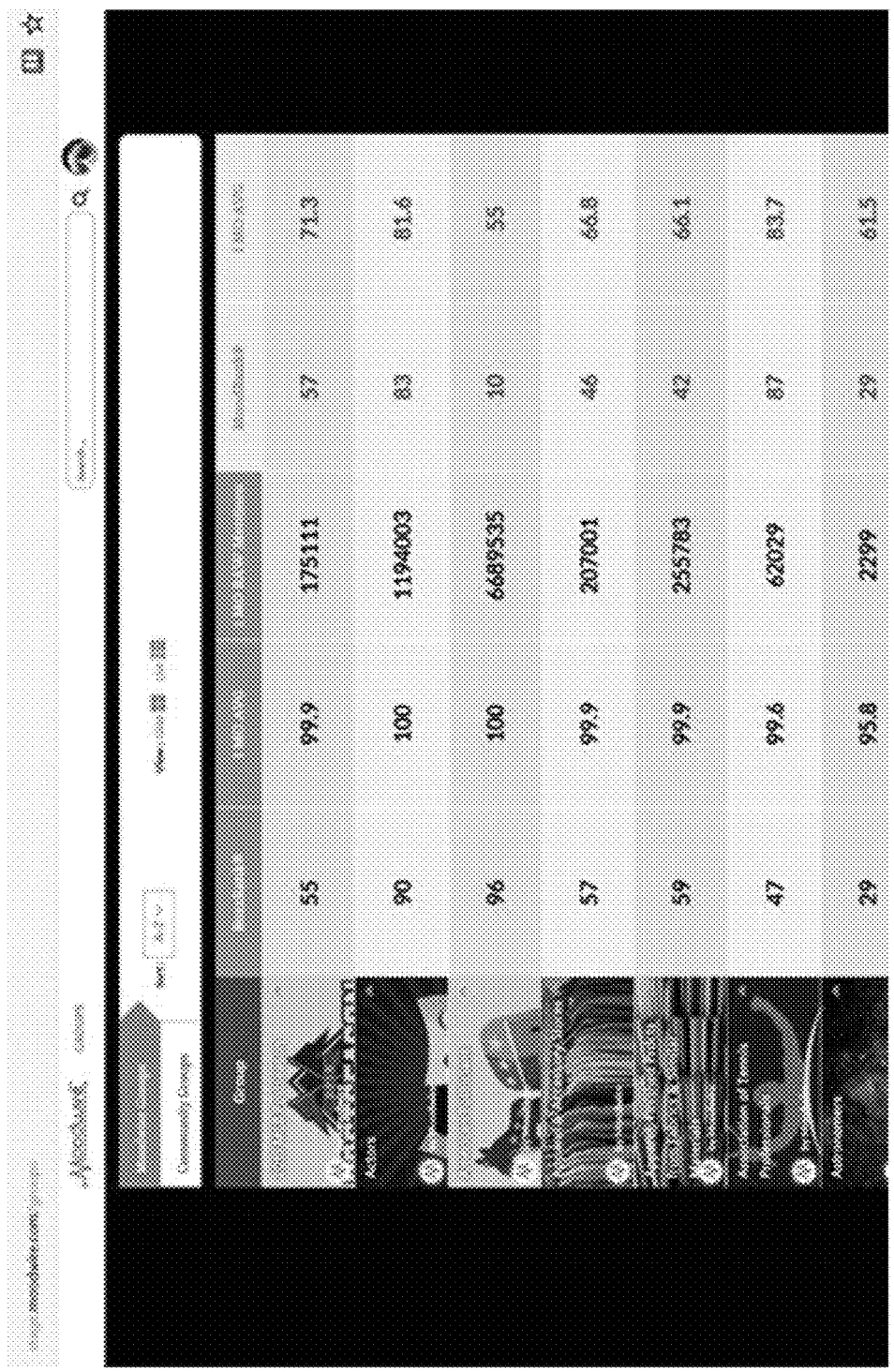
FIG. 22 is a graphical diagram illustrating an opinion search result showing the Groups Browser enabling comparison of key Group Analytics at a glance in accordance with the present disclosure.
Figure 23:
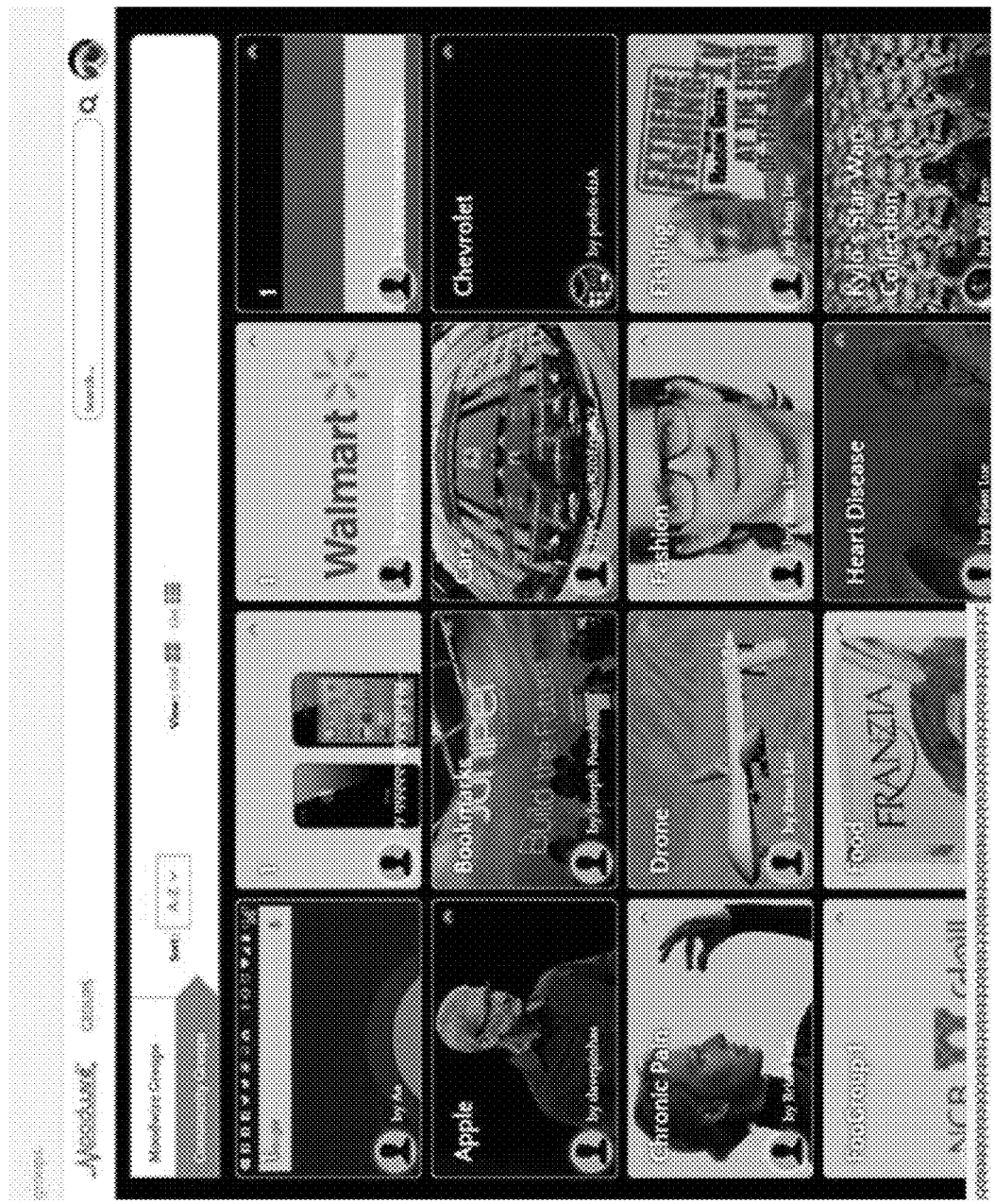
FIG. 23 is a graphical diagram illustrating an opinion search result showing the Community Members over the Internet can create their own curated Groups on the website of the opinion search engine in accordance with the present disclosure.
Figure 24:
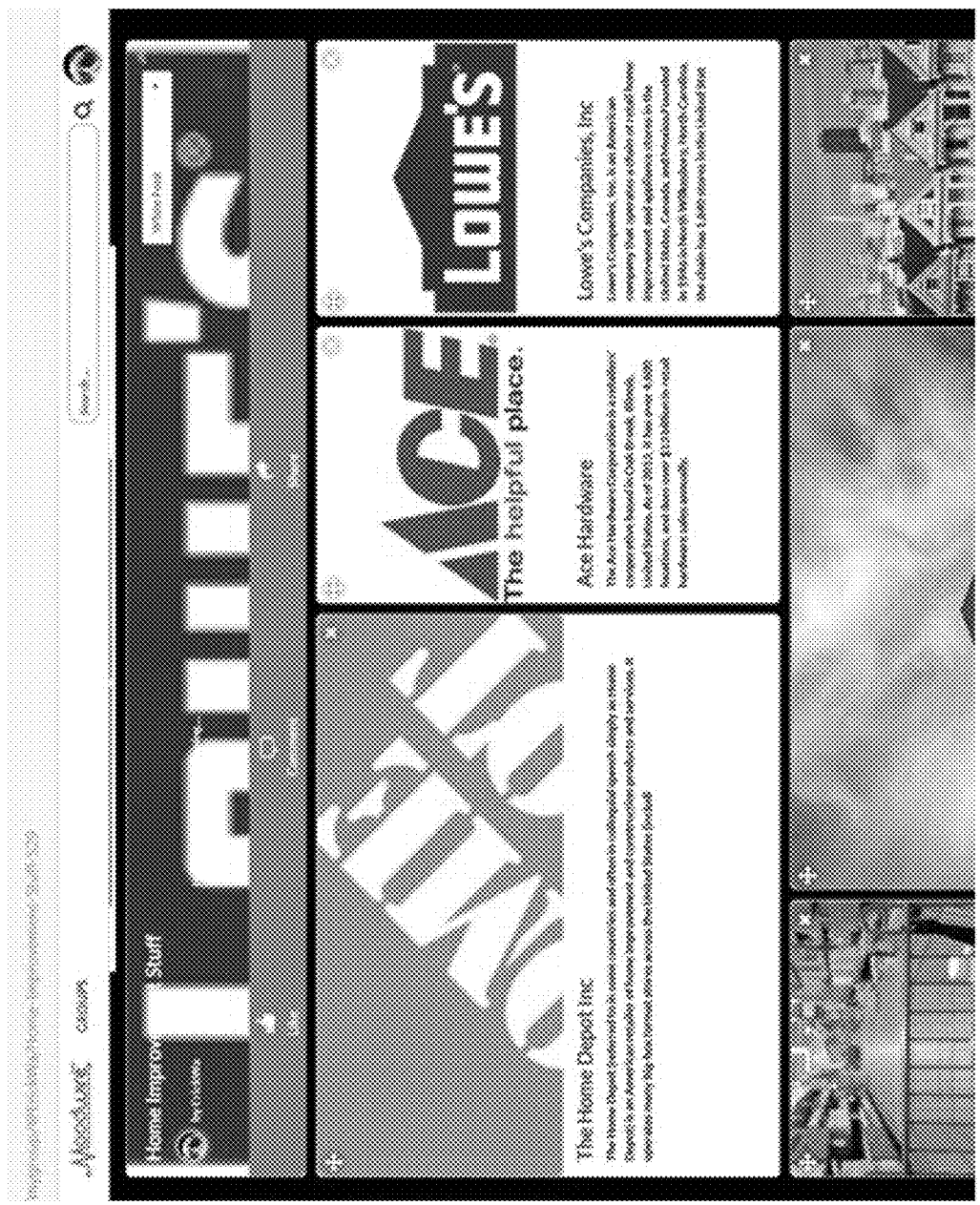
FIG. 24 is a graphical diagram illustrating one variation of an opinion search result showing a random assortment of electronic information Items, Groups, or Articles that the user may be interested in accordance with the present disclosure.
Figure 25:
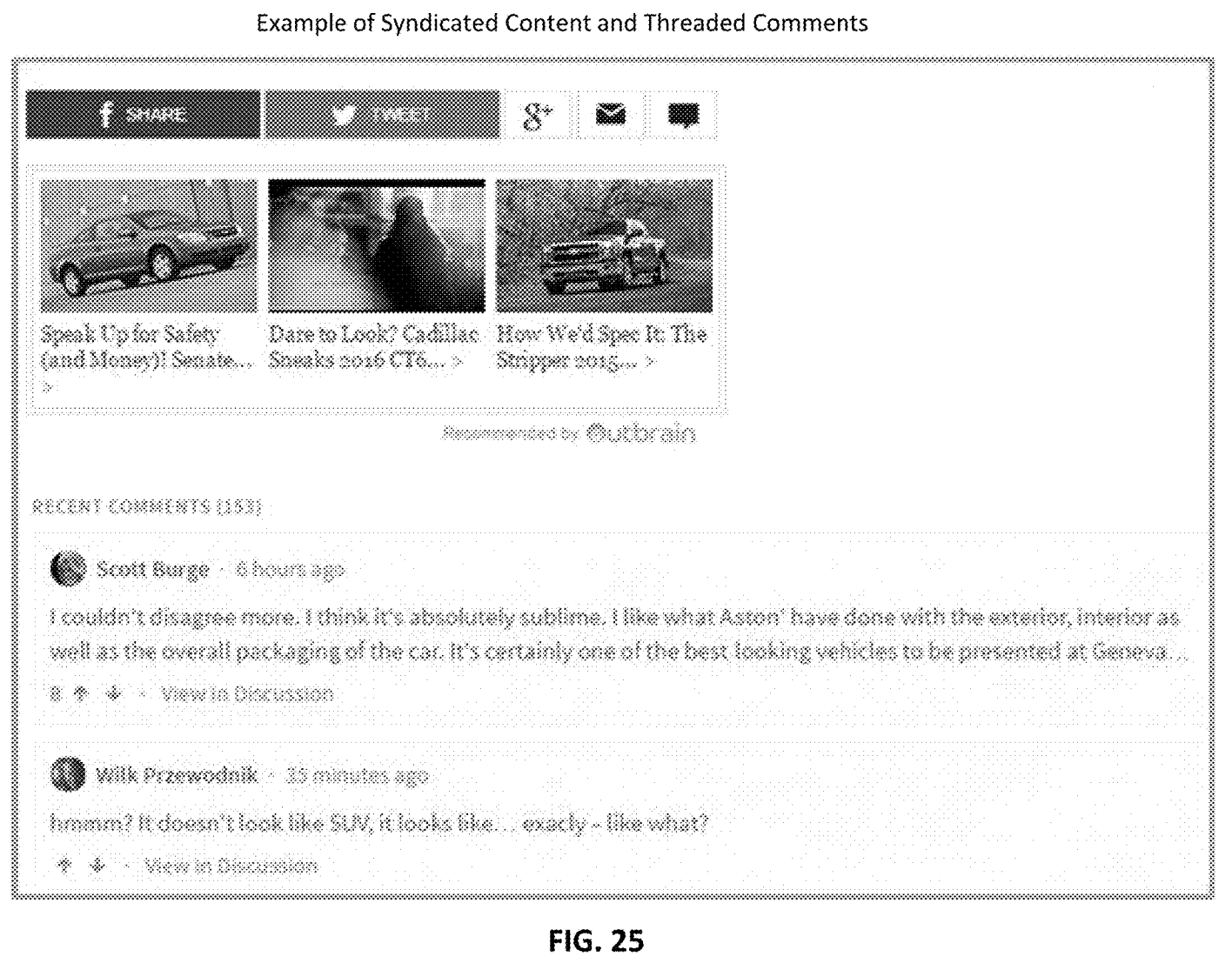

FIG. 22 is a graphical diagram illustrating an opinion search result showing the Groups Browser enabling comparison of key Group Analytics at a glance. FIG. 23 is a graphical diagram illustrating an opinion search result showing the Community Members over the Internet can create their own curated Groups on the website of the opinion search engine in accordance with the present disclosure. FIG. 24 is a graphical diagram illustrating one variation of an opinion search result showing a random assortment of electronic information Items, Groups or Articles that the user may be interested. FIG. 25 is a graphical diagram illustrating another sample webpage of the syndicated content with threaded comments in the opinion search engine showing US senators.

Figure 26A:
FIG. 26A is a graphical diagram illustrating a sample webpage of an opinion search engine over the Internet in accordance with the present disclosure.
Figure 26B:
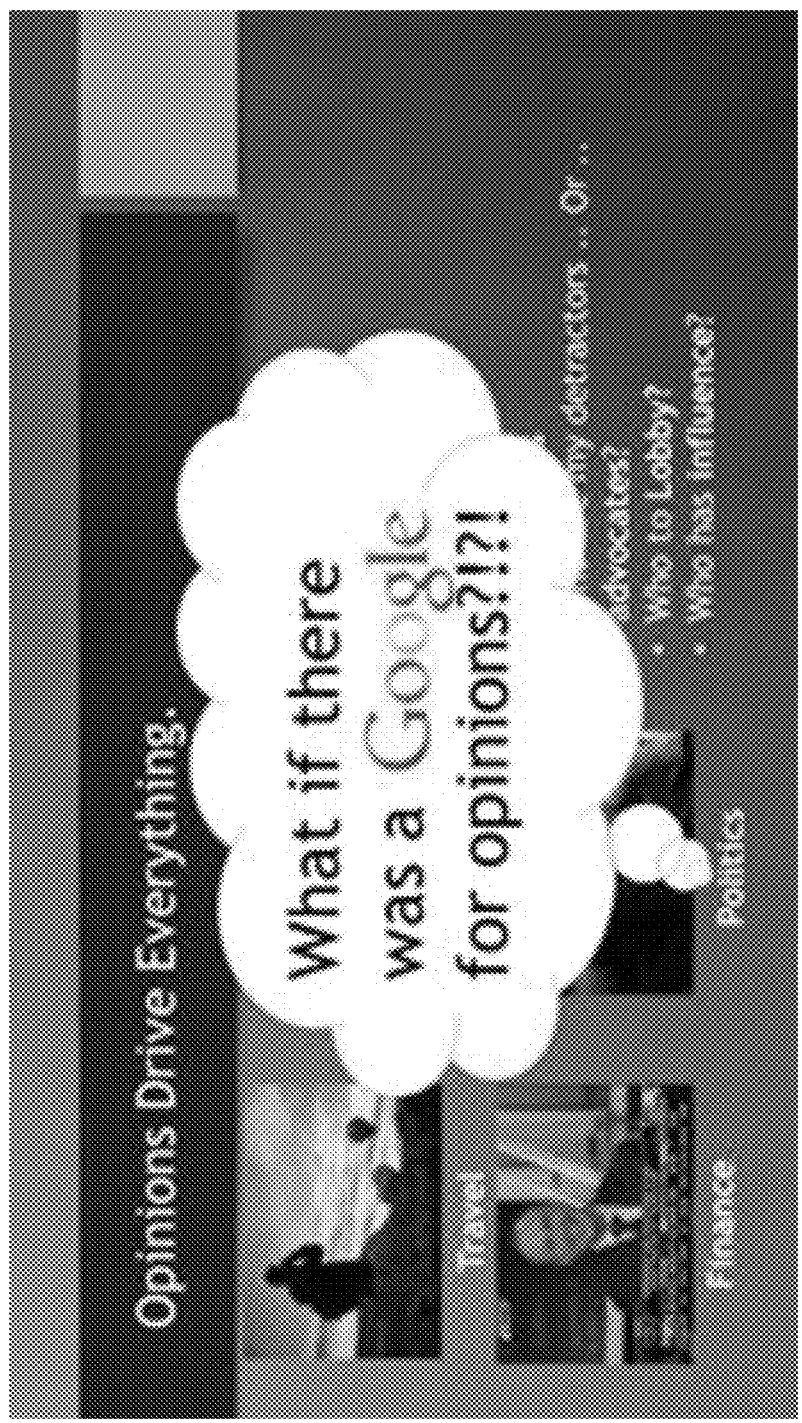
FIG. 26B is a graphical diagram illustrating a webpage of the Moodwire's opinion search engine driven by social media opinions in accordance with the present disclosure.
Figure 26C:
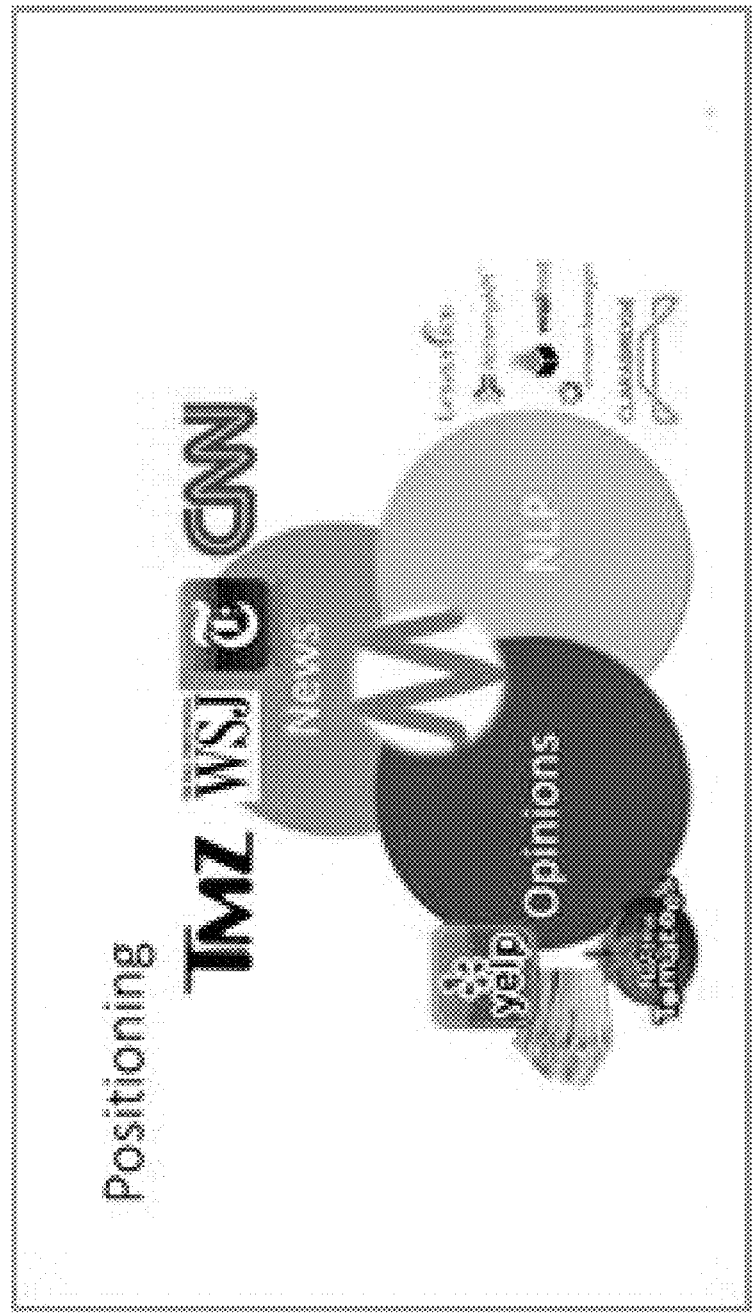
FIG. 26C is a graphical diagram illustrating a webpage of the Moodwire's opinion search engine over the Internet in the market place in accordance with the present disclosure.
Figure 26D:
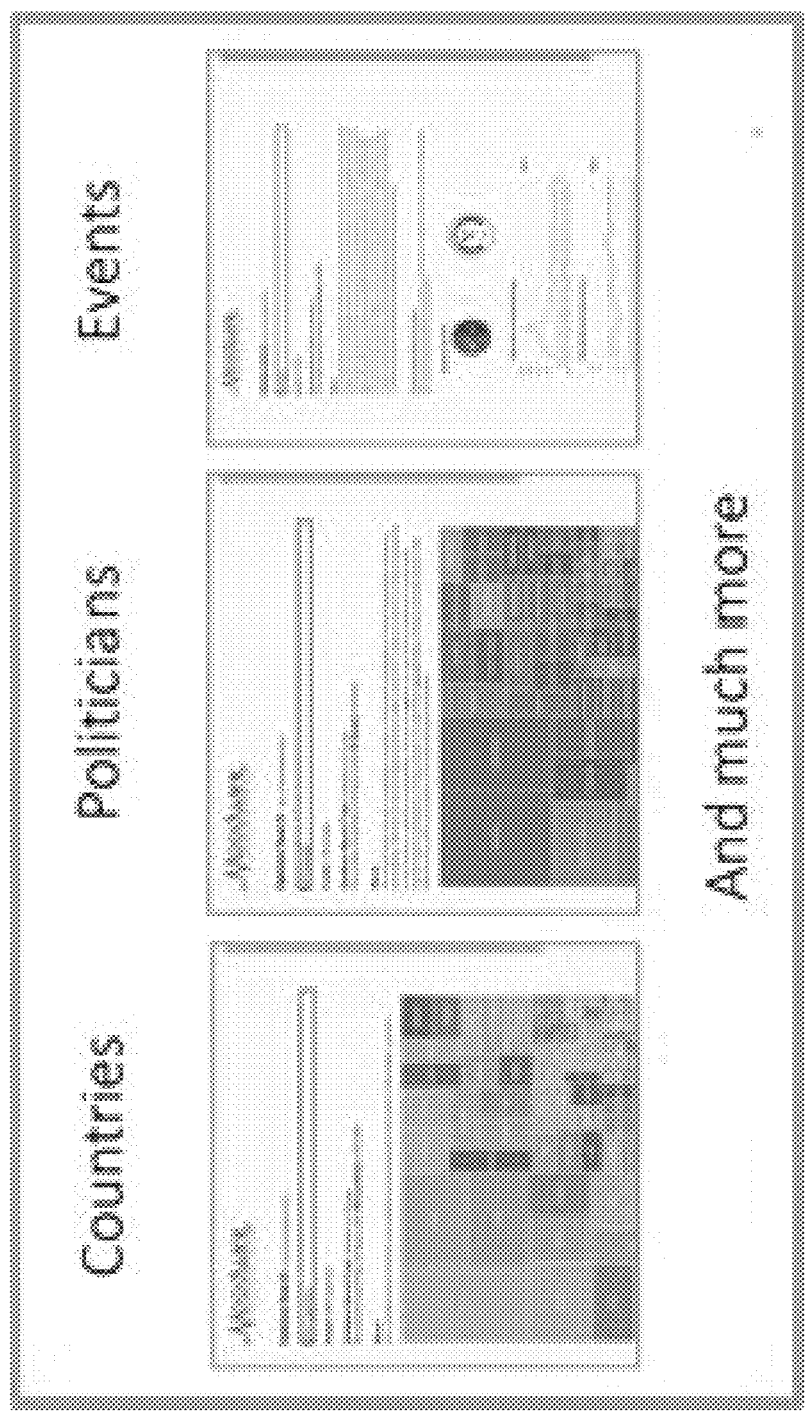
FIG. 26D is a graphical diagram illustrating a webpage of the Moodwire's topical grouping or unique domains in the opinion search engine over the Internet in accordance with the present disclosure.
Figure 26E:
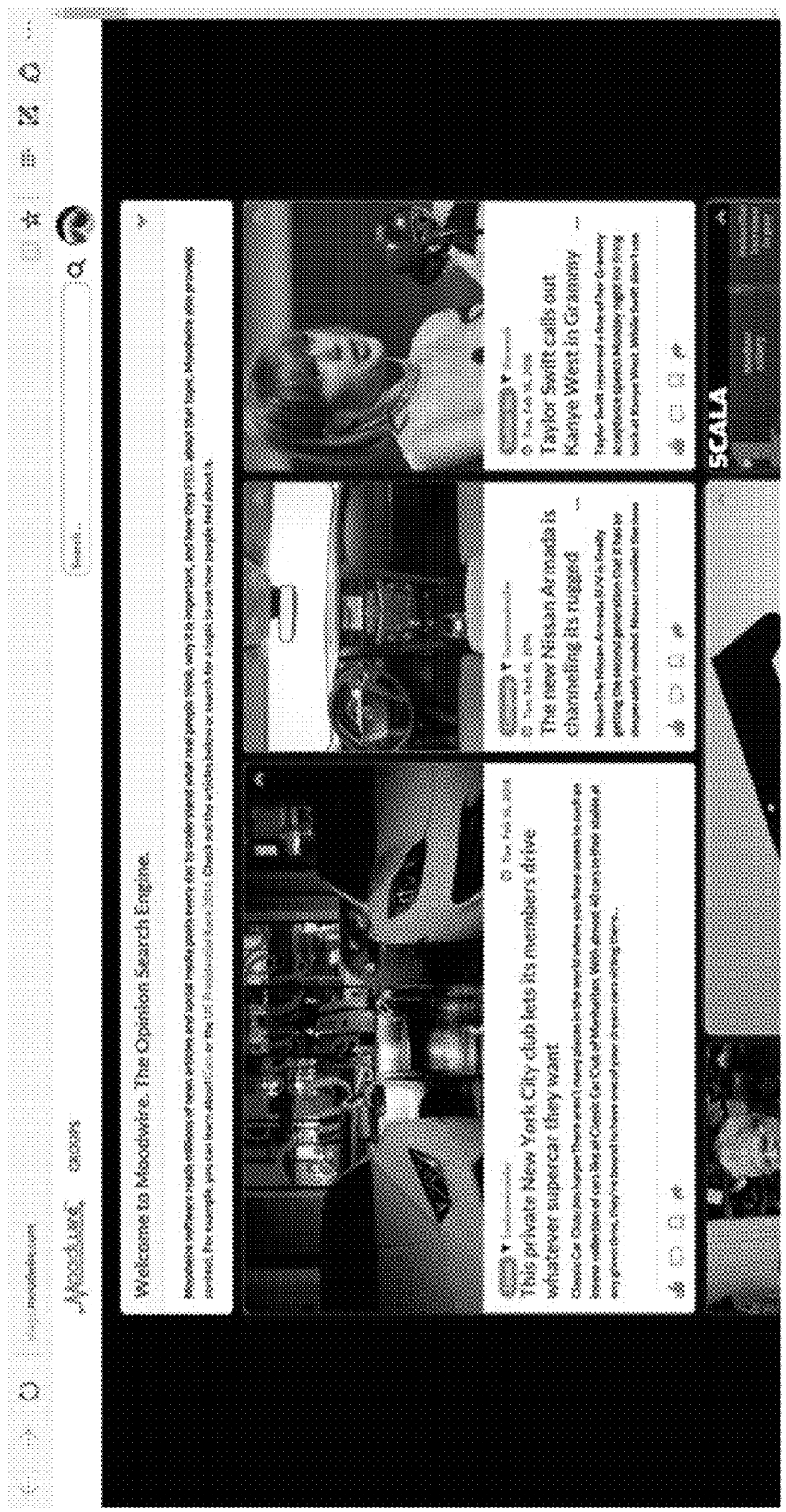
FIG. 26E is a graphical diagram illustrating a sample webpage of the Moodwire's landing page over the Internet with attractive graphical aesthetics in accordance with the present disclosure.

FIG. 26A is a graphical diagram illustrating a sample webpage xxx of an opinion search engine over the Internet. The sample webpage xxx shows an example of how Moodwire introduces the company and its products to new customer or partners. FIG. 26B is a graphical diagram illustrating a webpage of the Moodwire's opinion search engine driven by social media opinions in accordance with the present disclosure; FIG. 26C is a graphical diagram illustrating a webpage of the Moodwire's opinion search engine over the Internet in the market place in accordance with the present disclosure; FIG. 26D is a graphical diagram illustrating a webpage of the Moodwire's topical grouping or unique domains in the opinion search engine over the Internet in accordance with the present disclosure; FIG. 26E is a graphical diagram illustrating a sample webpage of the Moodwire's landing page over the Internet with attractive graphical aesthetics in accordance with the present disclosure.

Figure 27:
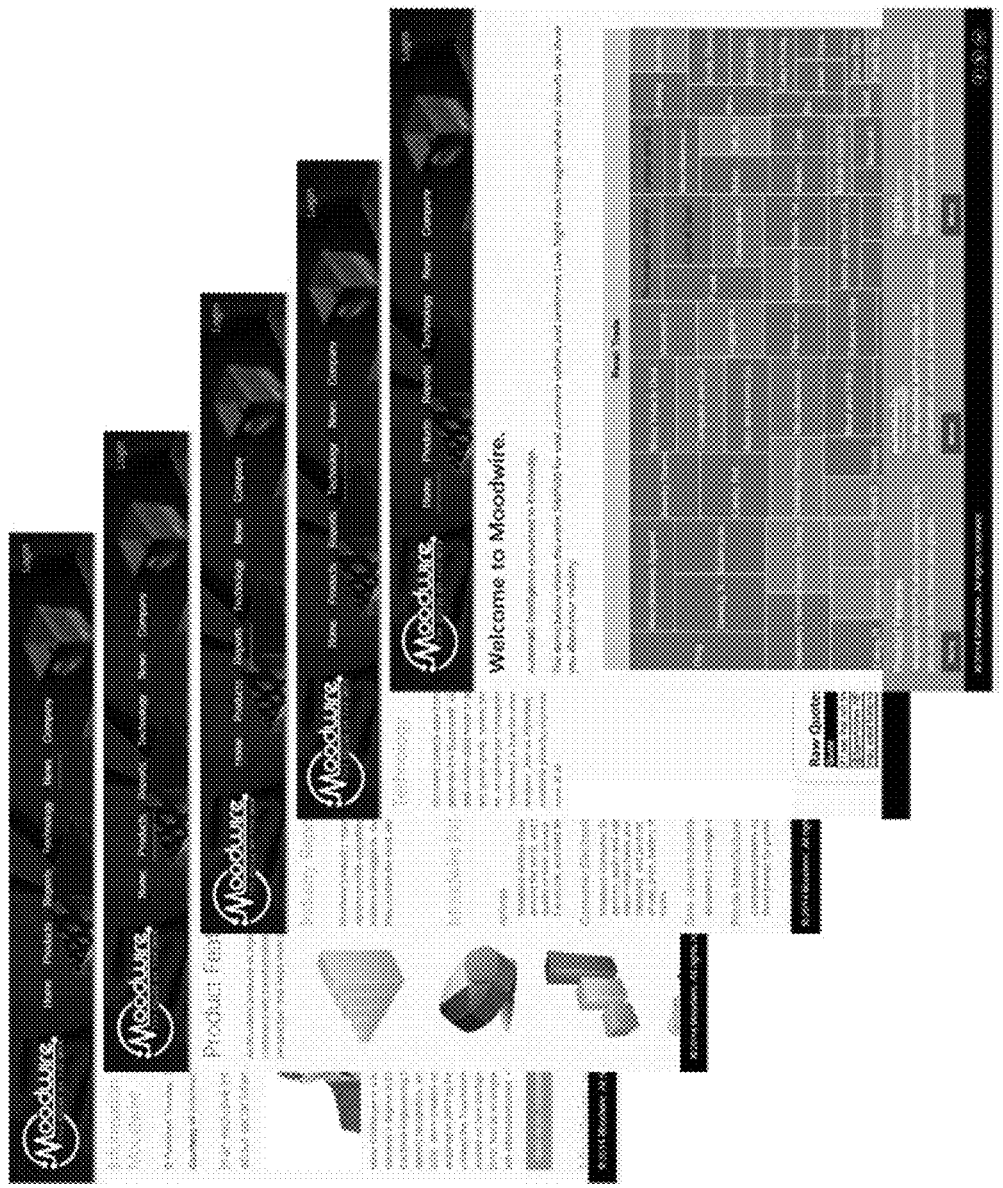
FIG. 27 is a graphical diagram illustrating sample webpages that are available for viewing by Moodwire Inc. in accordance with the present disclosure.

FIG. 27 is a graphical diagram illustrating sample webpages 530 that are available for viewing at the assignee's website, www.moodwire.com, as supplied by Moodwire Inc. (Moodwire) located in Menlo Park, Calif. Under the Home page at Moodwire, a user enters a query of S&P500 through the opinion search engine 20 and receives a return with the volume and sentiment of the entire S&P500 index. The Moodwire website also provides a user a wide variety of web resources, such as the Technology page, the Reports page, the Product page, the News page, and others.

Figure 28:
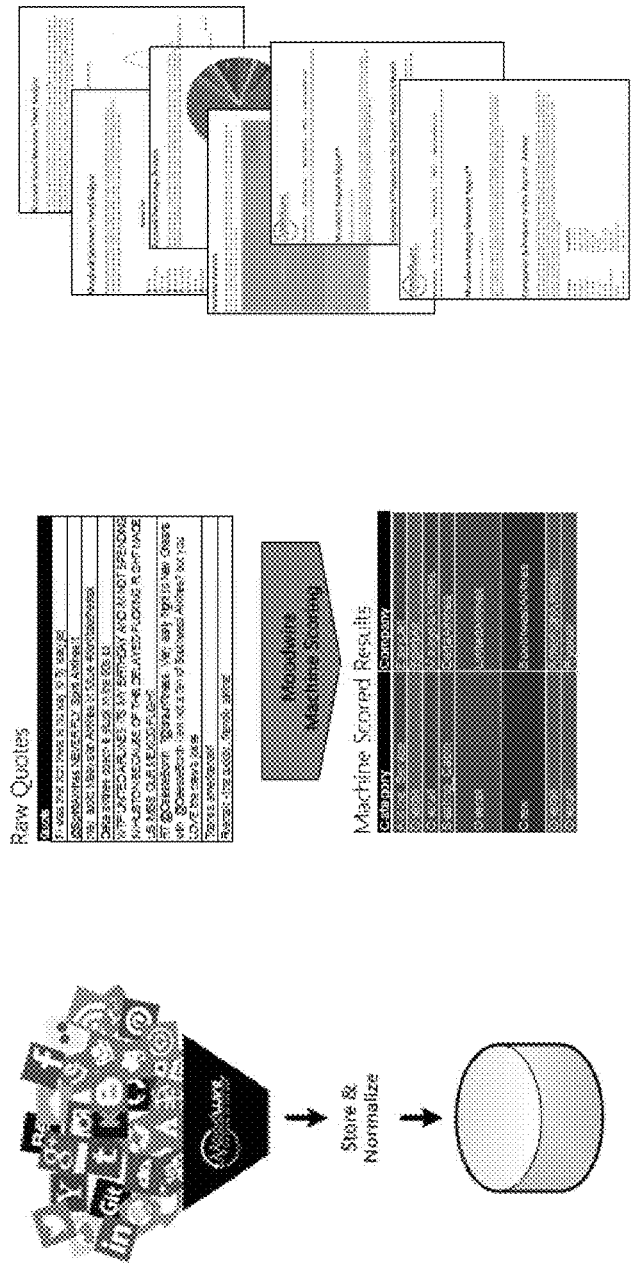
FIG. 28 is a graphical diagram that provides one illustration in the main partition processes of the opinion search engine in accordance with the present disclosure.

FIG. 28 is a graphical diagram 532 that provides one illustration in the main partition processes of the opinion search engine 20. In this example, the opinion search engine 20 is partitioned into (1) Gather and Find 534, (2) Process and Score 536, and (3) Reports and Insights 138. During the Gather and Find process 534, the opinion search engine 10 is configured to fetch information from thousands of sources and continuously crawl hundreds of websites over Internet for the updated social media electronic messages. The opinion search engine 10 can also be configured to process custom information or social media posts tailored to a specific company. The opinion search engine 10 is configured to normalize the gathered the social medial electronic messages and store the normalized information in the data storage aggregator (or a database) 34. In the Process and Score step 536, the opinion search engine 20 includes a statistical language processing that is capable of reading the actual text of social medial electronic message. The opinion search engine 20 is configured to reject certain information, such as spam, advertisements, and storms (e.g., huge numbers or retweets or repeated info) to separate the useful signals from the noise. The opinion search engine 20 is further configured to score each piece of social media electronic messages or textual data for the content of sentiment bias (toward positive sentiment or negative sentiment), and assign a suitable metatag to associate with an entity category (e.g., a correct industry, or a correct company). Under the Reports and Insights process 538, the opinion search engine 20 is configured distill the thousands of social media comments into categories relevant in each industry. The opinion search engine 20 is then configured to rank, score and group the a suitable level of results as a reflective and accurate portrayal of the mass public opinion posts and sentiments on a particular entity, a particular industry, or multiple entities relative to one another, as presented in visually transformed structured summary on a computer display.

Figure 29:
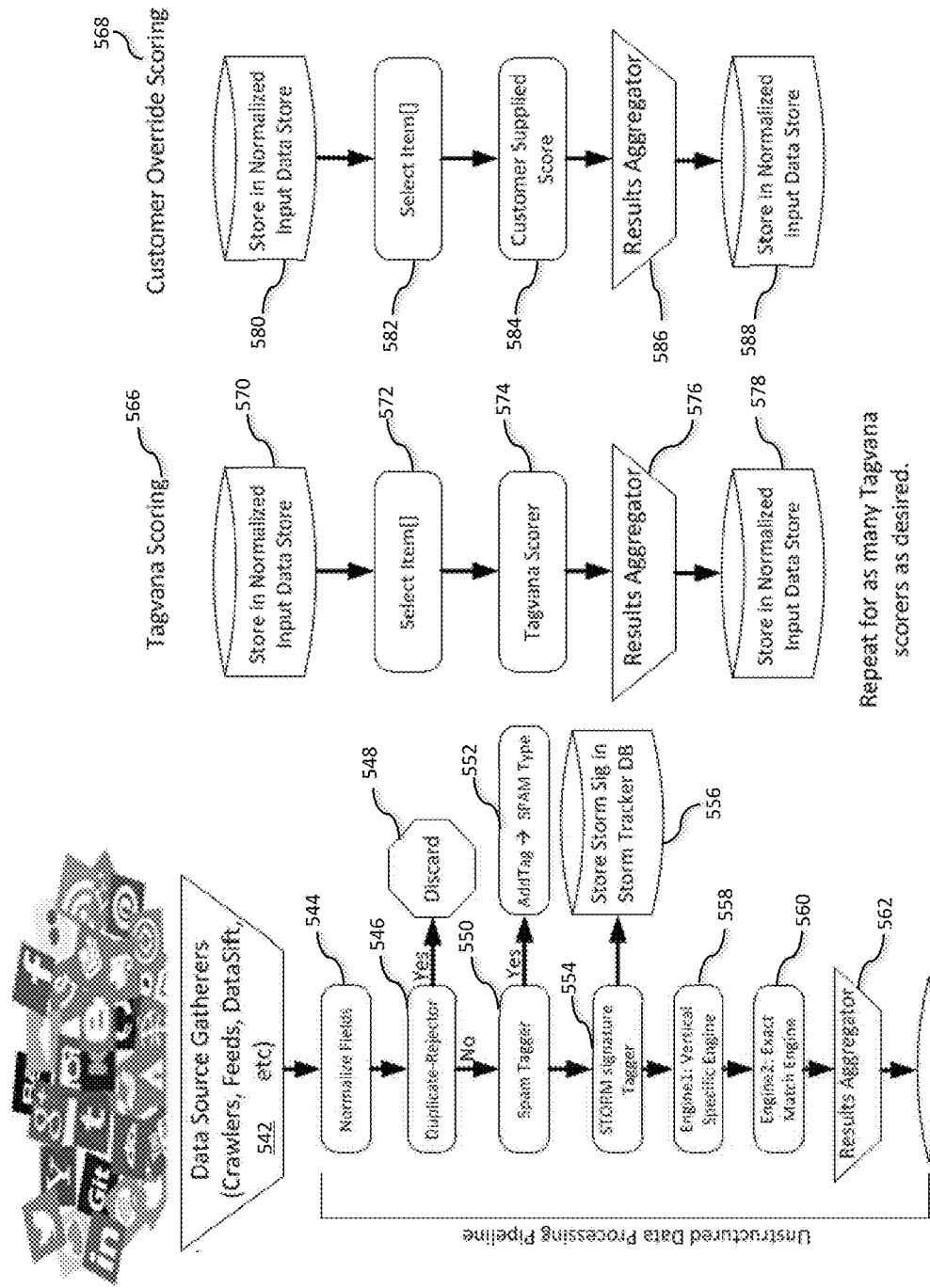
FIG. 29 is a flow diagram that illustrates the process flow of the opinion search system in normalizing and scoring unstructured social media electronic messages in accordance with the present disclosure.

FIG. 29 is a flow diagram 540 that illustrates the process flow of the opinion search system 10 (or the opinion search engine 20) in normalizing and scoring unstructured social media electronic messages. In this embodiment, at step 542, data source gatherers 16 in the opinion search system 10 collects the raw quotes from a wide variety of social media sites or data sources, such as Twitter, Facebook, Google+, etc. At step 544, the opinion search engine 20 is configured to normalize the fields of the received unstructured textual data, and transform the unstructured textual data into structured textual data with a specified and standard data format. At step 546, the duplicate-rejecter module 52 is configured to reject and remove any duplications among the received social media electronic messages, the textual data that is considered be a duplicate to another textual data will be discarded at step 548. At step 550, the spam tagger module (or spam checker module) 54 is configured to detect and identify spam messages and tags all spam textual data as spam type. The detected spam textual data are then discarded from further processing at step 552. At step 554, the STORM signature tagger 50 is configured to detect, identify and tag Twitter (or Twitter-like) storm pattern in the textual data, and at step 556, the STORM signature tagger 50 adds the Twitter storm patter to the Storm Tracker database. Optionally and preferably, multiple automated engines independently generate score for each piece of textual data that passes through, including the vertical-specific module 58 at step 558 and the exact match module 62 at step 560. At step 562, the opinion search system 10 aggregates the results from the prior process steps into aggregated results. At step 564, the opinion search system 10 stores the normalized input data and the aggregated results in the production data storage aggregator 22.

The opinion search engine 20 may also score the textual data by other methodologies, such as by Tagvana Scoring method 566 and the Customer Overriding Scoring method 568. In Tagvana Scoring method 566, the opinion search system 100 retrieves the unstructured textual data that have been normalized at step 570, select a particular piece of normalized textual data at step 572, score the piece of normalized textual data at step 574, repeat the scoring process for as many pieces of the normalized unstructured data as desired, generate an aggregated results at step 576, and store the aggregated results with scores in the data storage aggregator 22 at step 578. In the Customer Overriding Scoring method 568, the opinion search system 100 retrieves the unstructured textual data that have been normalized at step 580, select a particular piece of normalized textual data at step 582, score the piece of normalized textual data as supplied by an external source such as by customers at step 584, repeat the scoring process for as many as of the normalized unstructured data as desired, generate an aggregated results step 586, and store the aggregated results with scores in the data storage aggregator 22 at step 588.

Figure 30:
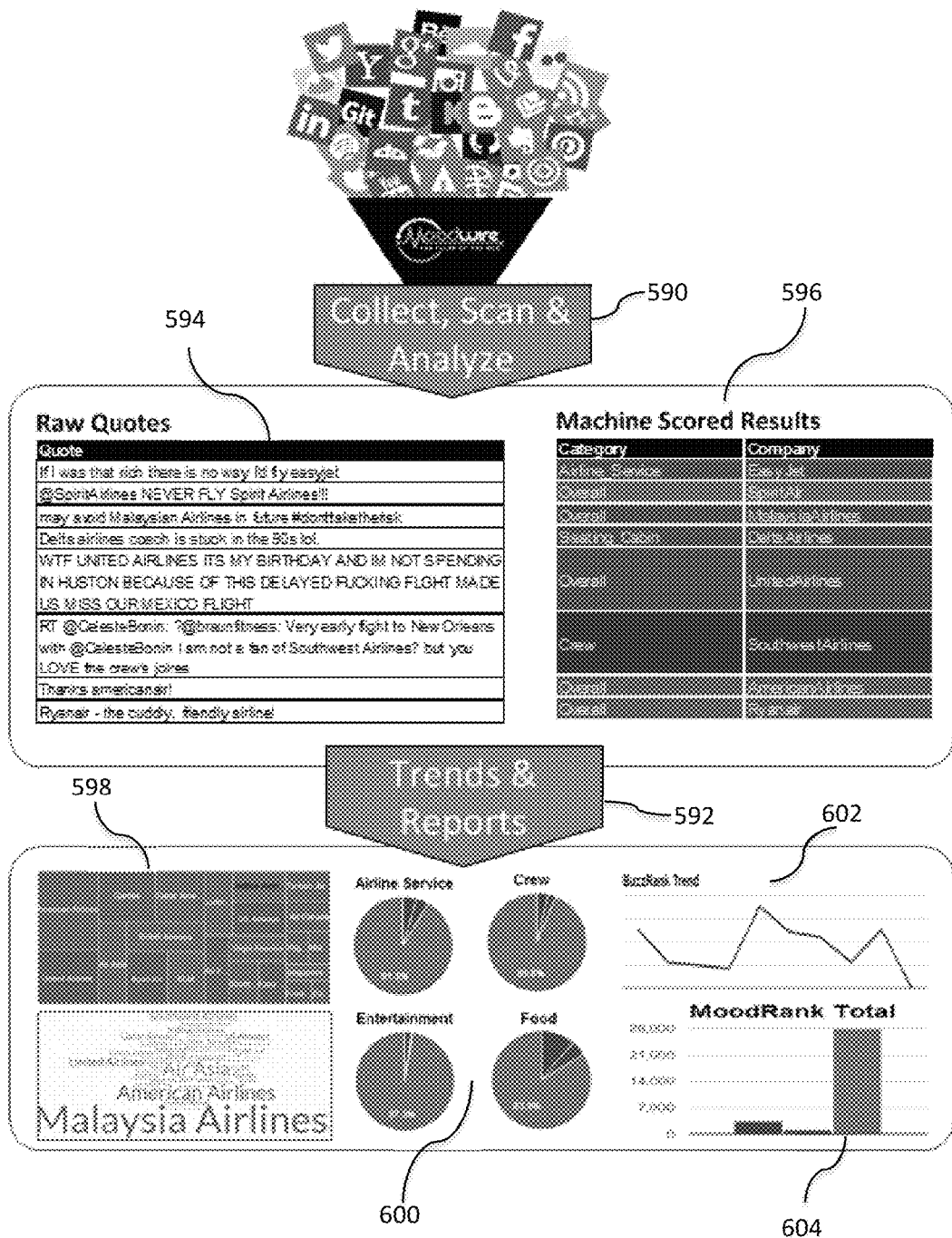
FIG. 30 is a graphical diagram that provides an illustration of the opinion search system in collecting, scanning, and analyzing with raw quotes and machine scored results and generating trends and reports with graphical representations in accordance with the present disclosure.

FIG. 30 is a graphical diagram that provides an illustration of the opinion search system in (1) collecting, scanning, and analyzing with raw quotes and machine scored results at step 590 and (2) generating trends and reports with graphical representations at step 592. In this example, the opinion search system 10 collects the unstructured social media electronic messages (e.g. textual data) relating to the airline industry from different social media sites, such as Twitter, Facebook, Google+, and others, as shown in the raw quotes 594 with sample raw quotes like "If I was that rich there is no way I'd fly easejet", "Thanks americanair!", and "Ryanair—the cuddly, friendly airline!". In other embodiments, the system 10 collects both unstructured and structured social media electronic messages. Next, the opinion search system 10 is configured to associate each social media electronic message to one or more categories, and score each unstructured social media electronic message (also referred to in some instances as raw quotes). The opinion search engine 20 in the opinion search system 10 analyzes the sentiment of each unstructured social media electronic message. The opinion search system 10 generates machine scored results 596 by category and company with color-coding to indicate the degree of positive sentiments or the degree of negative sentiments. When a user submits a query to the opinion search engine 20, the system 10 performs computations to generate visual representations for a word cloud 598, pie charts 600 (by airline service, crew, entertainment, and food), a buzzrank trend 602, and a moodrank total 604, as representative of big data summary and real-time analysis of synthesized public opinions and sentiments for one or more of the selected entities (e.g., airline) in the query.

Figure 31:
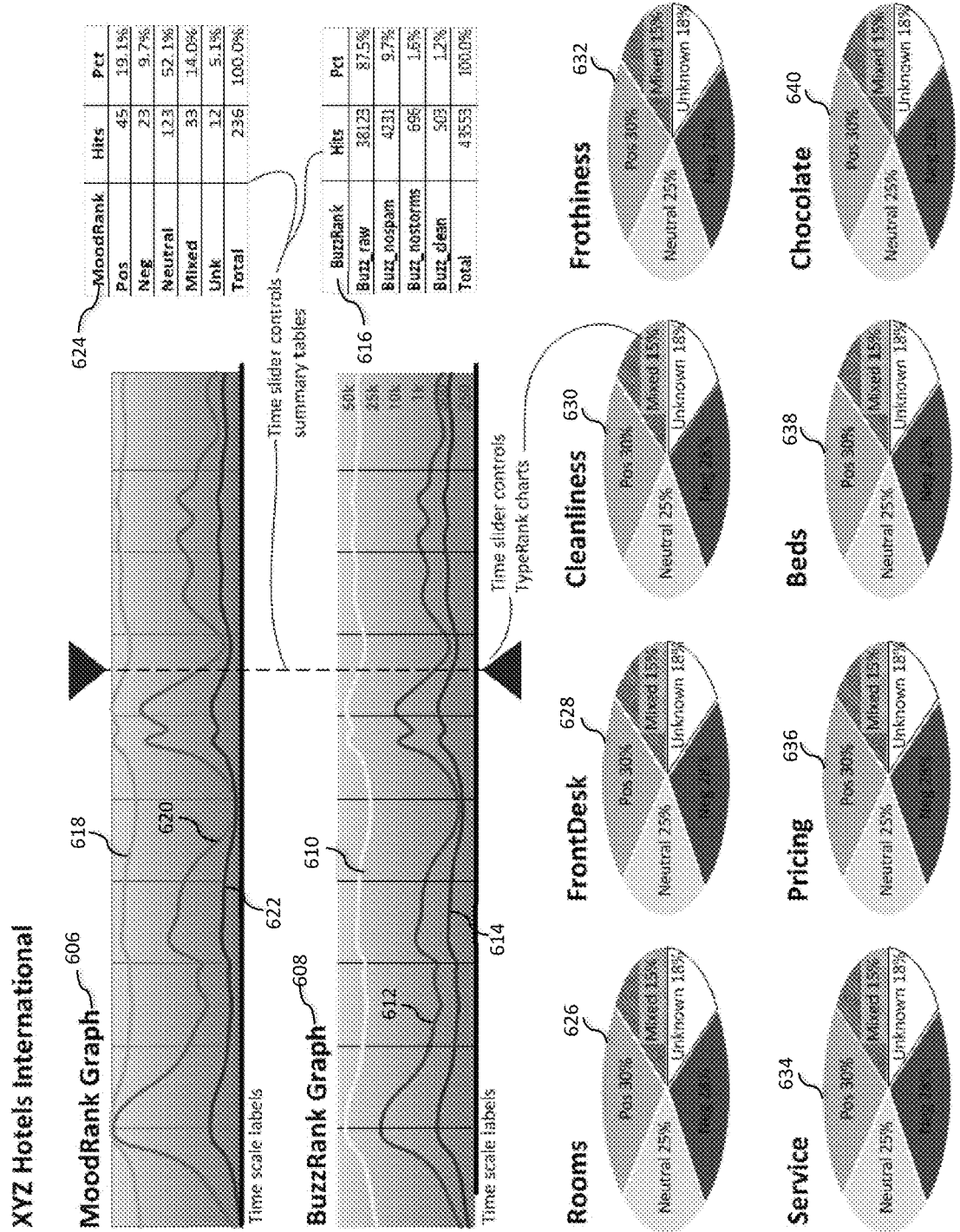
FIG. 31 is a graphical diagram illustrating sampling of synthesized public opinions in correlated MoodRank Graph and BuzzRank Graph for a particular hotel brand in accordance with the present disclosure.

FIG. 31 is a graphical diagram illustrating sampling of synthesized public opinions in correlated MoodRank Graph 606 and BuzzRank Graph 608 for a particular hotel brand (referred to here as "XYZ Hotels International"). The Buzz-Rank Graph 608 shows three sampling graphical curves 610, 612, 614, where a first graphical curve 610 illustrates a higher amplitude (or buzz) with a more sustaining buzz over time, while the second curve 612 depicts amplitude or buzz fluctuations that are lower than the first graphical curve 610, and the third curve 614 resembles anemic characteristics with relatively low buzz compared to the second graphical curve 612 and the first graphical curve 610. A BuzzRank table 616 classifies social media electronic message into one of the four categories: Buzz_raw, Buzz_nospam, Buzz_nostorms, or Buzz_clean, and the corresponding calculated percentage of category type.

The MoodRank Graph 606 shows three sampling graphical curves 618, 620, 622, where the first graphical curve 618 illustrates a higher sustainable amplitude over time, while the second curve 620 shows a more amplitude fluctuation relative to the first graphical curve 618, and the third graphical curve 622 has a lower amplitude with anemic fluctuation compared to the second curve 620 and the first curve 618. A MoodRank table 624 classifies social media electronic messages into one of the five categories: Pos(itive), Neg(ative), Neutral, Mixed, and Unk(nown), with the corresponding calculated percentage of each category type.

Additional classifications and other types of matrices in performing data analytics on the social media electronic messages are possible, which can be extended into the different kinds of TypeRank charts on the sentiments or opinions of XYZ Hotels International. These various charts summarizes the matrices and the opinion search system 10 computes the percentages of the social media electronic messages to reflect positive, negative, mixed, neutral, or known opinion toward the XYZ Hotels International regarding the Rooms 626, FrontDesk 628, Cleaniness 630, Frothiness 632, Service 634, Pricing 636, Beds 638, and Chocolate categories 640. The adjustment on the time slider control of the MoodRank graph 606 and BuzzRank graph 608 affect the computed percentages for displaying on the respective summary tables and TypeRank charts.

Figure 32:
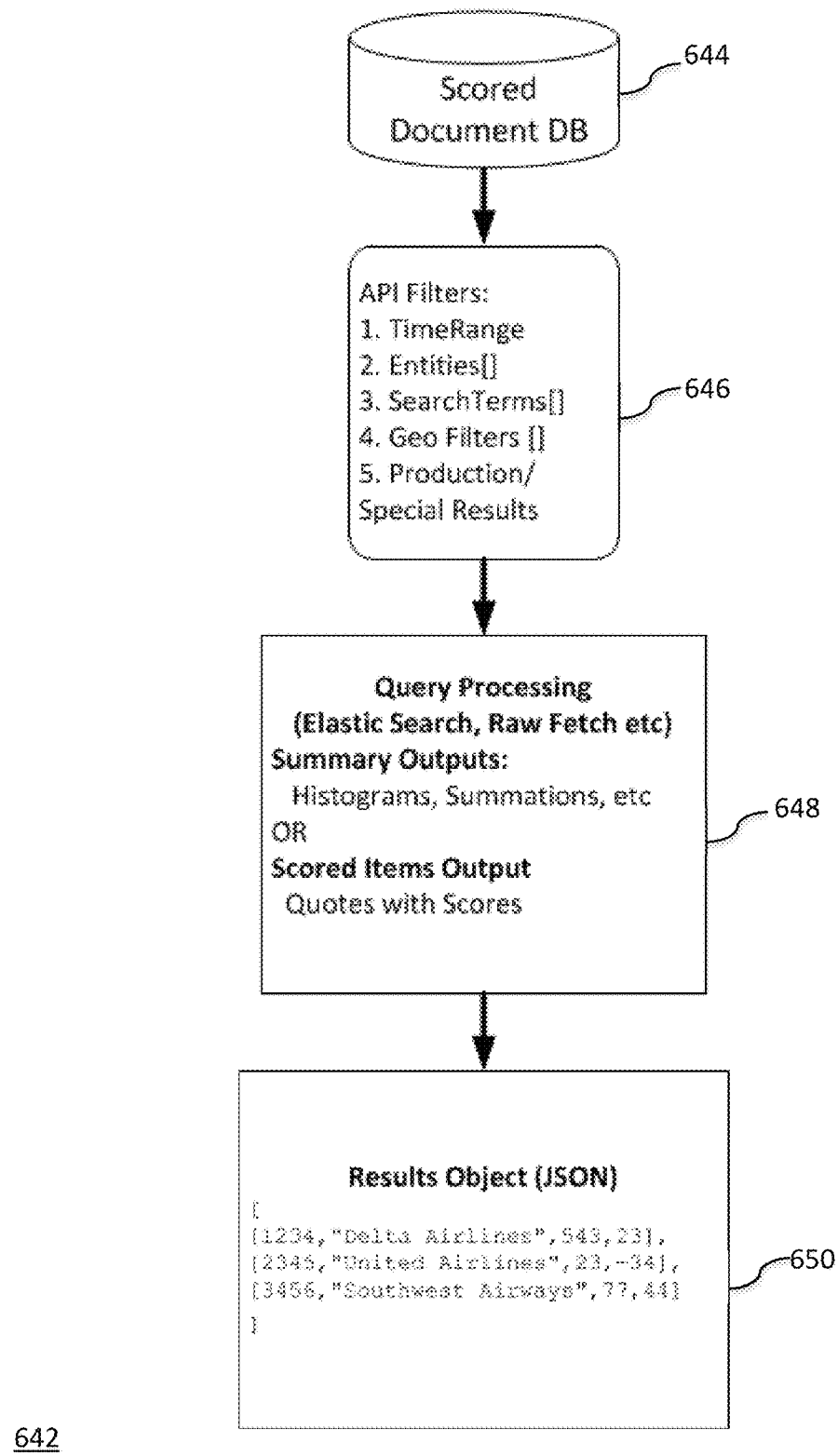
FIG. 32 is a flow diagram illustrating the process flow of the query API pipeline procedure in accordance with the present disclosure.

FIG. 32 is a flow diagram illustrating the process flow 642 of the query API pipeline procedure. At step 644, the opinion search system 10 stores the scored information in the data storage aggregator (or database) 22. Once a query term is entered on the web portal, at step 646, the opinion search system 10 processes the scored documents from the database 22 through various API filters, including TimeRange, Entities, SearchTerms, Geo Filters, and Production/Special Results. The API filters separates out the information in the document database that is not relevant for the query term, and leave only the relevant information for the output. At step 648, the opinion search system 10 processes the data through query processing, such as elastic search, raw fetch, etc., where the API generates the histograms, summations, entity metadata, relationships, and other summary outputs. Alternatively, if the summary outputs are not generated, then the scored items output is generated. As a result of the query API pipeline procedure, at step 650, the opinion search system 10 produces results object (JSON) with ID, names, scores, and various other associated metadata for generating for an API output.

Figure 33:
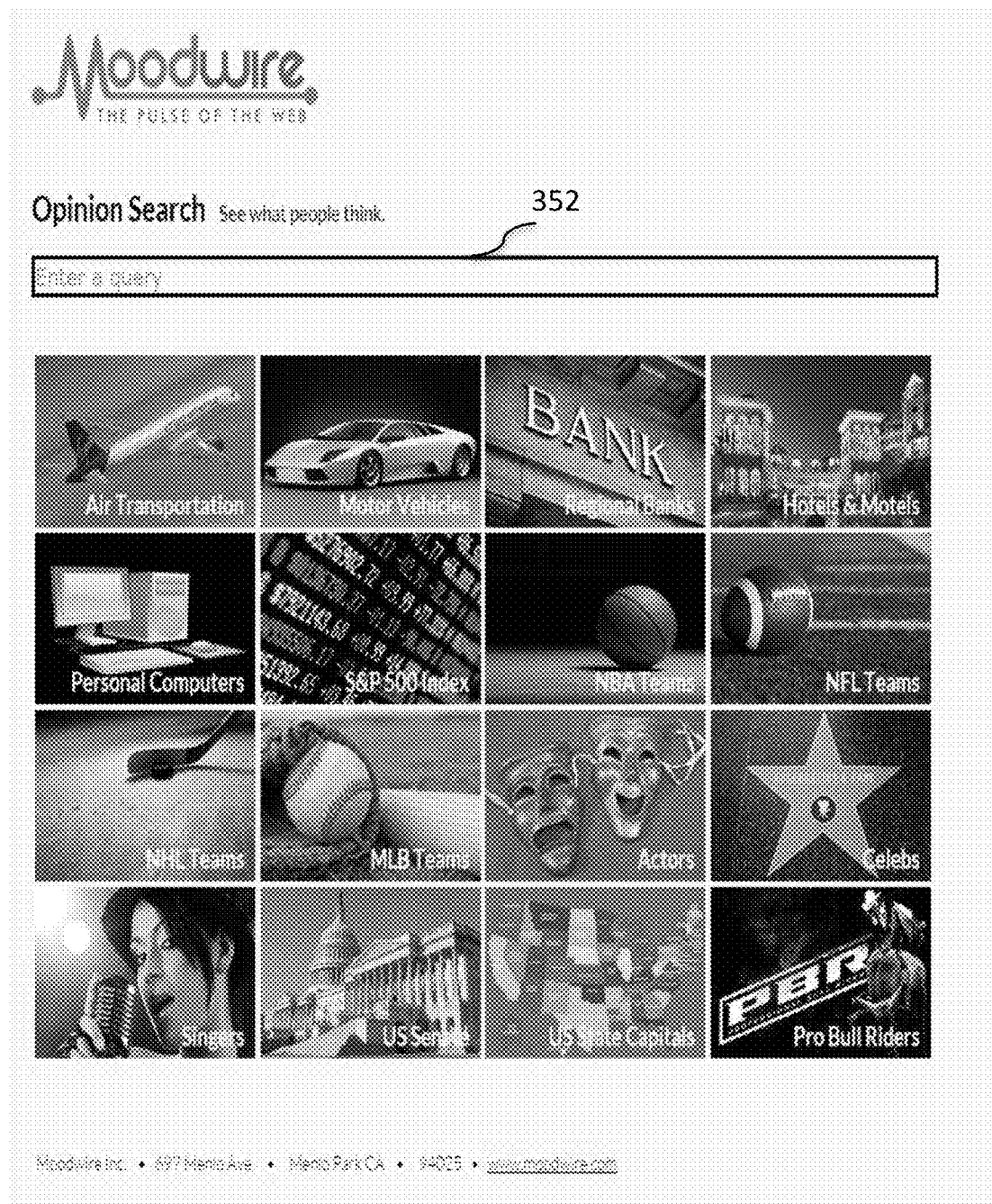
FIG. 33 is a graphical diagram illustrating an example of the opinion search interface screen on a webpage as hosted by Moodwire Inc. in accordance with the present disclosure.

FIG. 33 is a graphical diagram illustrating an example of the opinion search interface screen 652 on a webpage as hosted by Moodwire Inc. In this example, the opinion search system 10 by Moodwire Inc. provides a search bar in which a user can access the web portal and enter a query for conducting an opinion search through the Internet to assess the public opinion (somewhat akin to polling public opinions except the process here is conducted through a computer search engine) on a particular topic, or comparative entities. Intended as a user friendly function, some topical categories placed underneath the search bar provides some suggested topics that the user may consider in forming a search query, such as airline transportation, motor vehicles, regional banks, hotels and motels, personal computers, S&P 500 Index, NBA teams, etc., are available as clickable block icons that can quickly allow the user to see the sentiment of that specific common topic.

Figure 34:
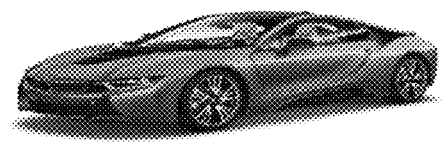
FIG. 34 is a graphical diagram illustrating one embodiment of an aggregated result generated by the opinion search engine with a topic image, sentiment and buzz, related links, news stories and quotes, syndicated content and comments in accordance with the present disclosure.
Figure 34:
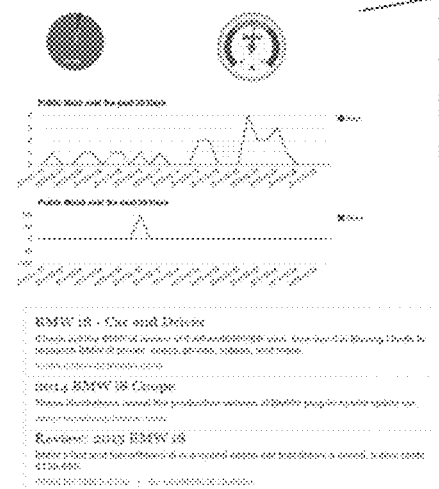

FIG. 34 is a graphical diagram illustrating one embodiment of an aggregated result generated by the opinion search engine 20 with a topic image 654, sentiment and buzz 656, related links (presentable in a mini table format) 658, news stories and quotes 660, syndicated content 662, and comments 664. In this example, when "BMW i8" is entered as a query, opinion search engine 20 is configured to process, return and display an image of the BMW i8 vehicle and a short introduction paragraph from Wikipedia. The opinion search result page can also display the sentiment and buzz of the vehicle, with two-dimensional graphs and charts to show the relative sentiment and relative buzz over time. Alternatively, variations or modifications of the two-dimensional graphs and charts are also contemplated within the spirit of the present invention, as well as three-dimensional representations of the sentiment and buzz characteristics. Another section on the opinion search result page displays topics related to BMW i8, such as cars in general, BMW the manufacturer, other BMW car models, and competing manufacturers' car models may also be displayed on the result page. The related topics table may contain clickable hyperlinks to either Moodwire database or other webpages. In addition, the opinion search result page can have a new stories and quotes section that shows the latest online reviews or news articles that references BMW i8. A syndicated content section displays user generated content from Twitter, Facebook, Google+, and other social media sites. Furthermore, the opinion search result page can display comments by users from various online forums and communities that discuss about BMW i8. The opinion search result page in this example is intended to show one illustration, and does not limit the present disclosure to precise sectional comments, where modifications, additions, subtractions may be practiced without departing from the spirits of the present disclosure.

Figure 35:
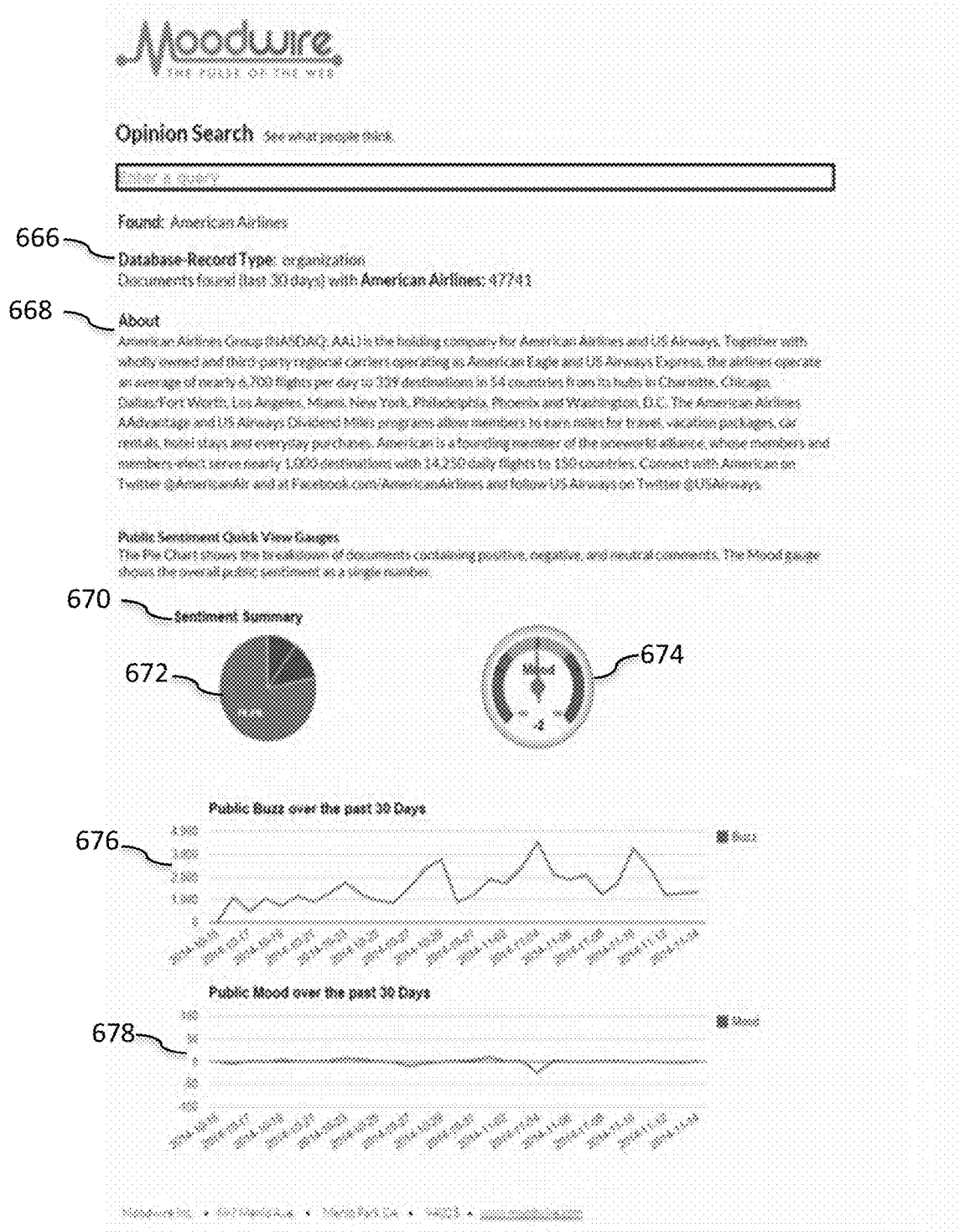
FIG. 35 is a graphical diagram illustrating an example of the opinion search result displayed with the sentiment summary, public buzz, and public mood over a period of time in accordance with the present disclosure.

FIG. 35 is a graphical diagram illustrating an example of the opinion search result displayed with the sentiment summary, public buzz and public mood over a time period. In the search bar as shown in FIG. 33, the user enters the search query of "American Airlines", which returns the transformed visual representation as illustrated in FIG. 39A. When the user clicks in the top left region with the text "American Airlines" in FIG. 39A, the resulting page displayed is shown in FIG. 35. The record type and the number of documents 666 associated with the search query is displayed toward the top, with the general information 668 immediately follow. A sentiment summary 670 of the search query is displayed below the general information. The sentiment summary contains one pie chart 672, one mood gauge 674, and two line charts 676, 678. The pie chart details the breakdown of documents related to the search query by positive sentiments, negative sentiments, or neutral sentiments. The mood gauge summarizes the overall public sentiment (mood) and display as a single number on the gauge. One of the line charts tracks the public buzz on the entity for the past thirty days, and the other line chart tracks and displays the public sentiment on the entity for the past thirty days.

Figure 36:
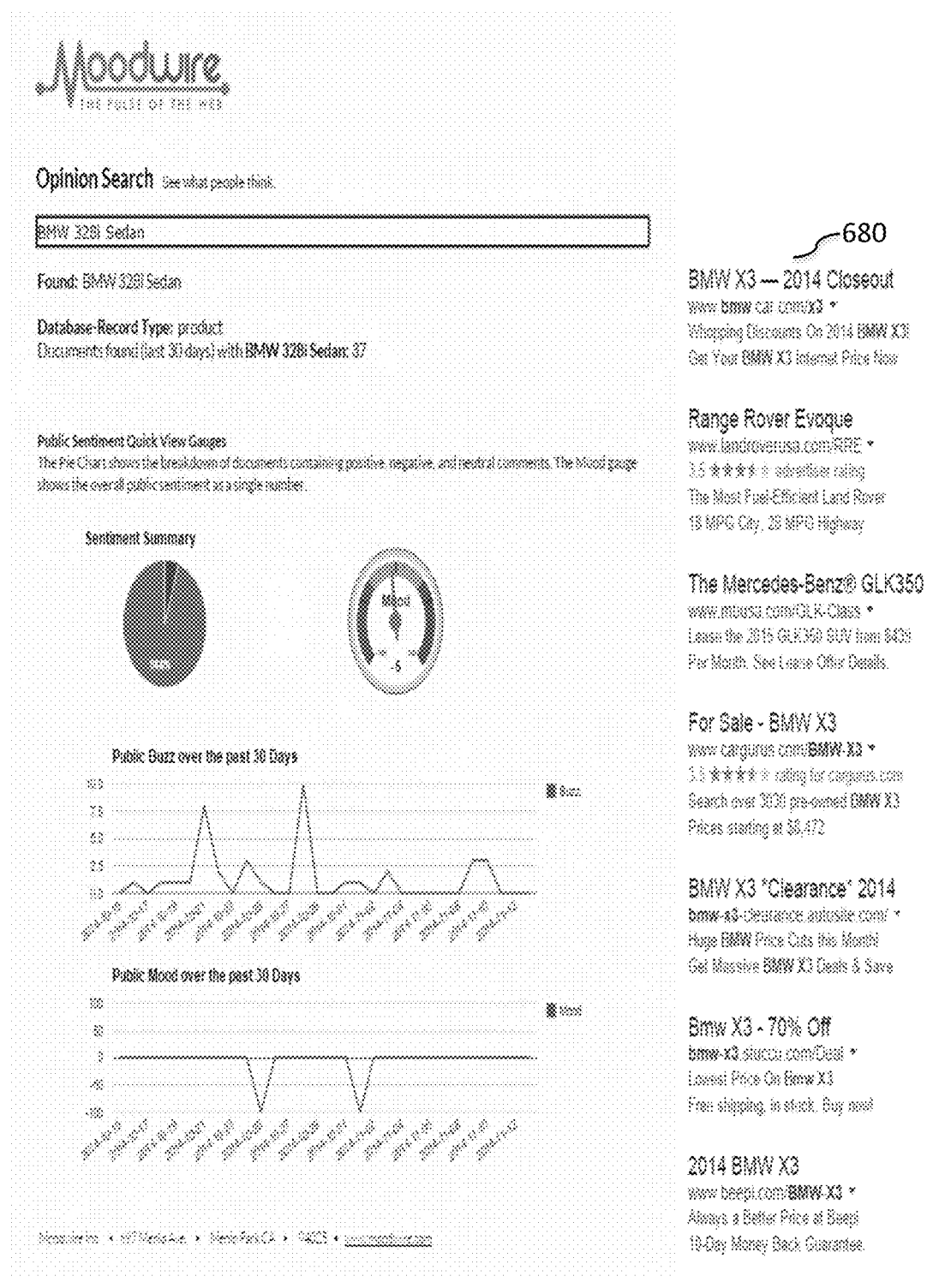

FIG. 36 is a graphical diagram illustrating an embodiment of the opinion search result displayed with both the sentiment summary and the computed advertisements related to the search query. In addition to the sentiment summary with pie charts and line graphs of public buzz and public mood, relevant, associated, and related information 680 to the search query of "BMW 328i sedan" are displayed on the right side of the opinion search result page, with advertisements other car models are in the similar class or compete with BMW 328i sedan market or BMW car dealerships that may be offering special promotion on certain vehicles for consumers who are interested in a BMW 328i sedan.

Figure 37:
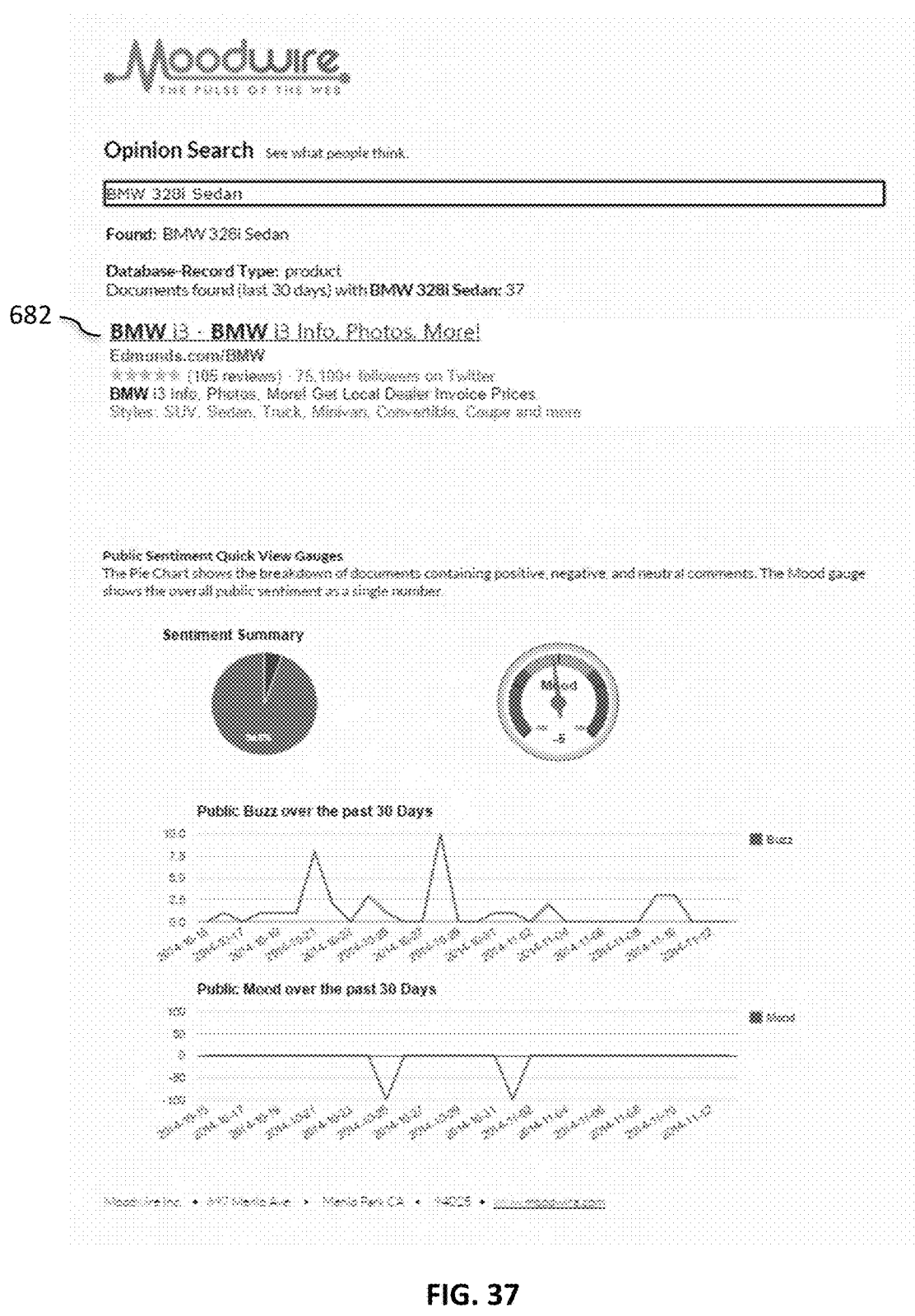

FIG. 37 is a graphical diagram illustrating an embodiment of the opinion search engine result with the sentiment summary and a related advertisement. After the user enters "BMW 328i Sedan" in the query box, the opinion search engine 20 processes and returns a sentiment summary, and a related vehicle advertisement 682 with social medial ratings of an auto dealer, which sells similar vehicle, BMWi3, relative to the BMW 328i Sedan.

Figure 38:
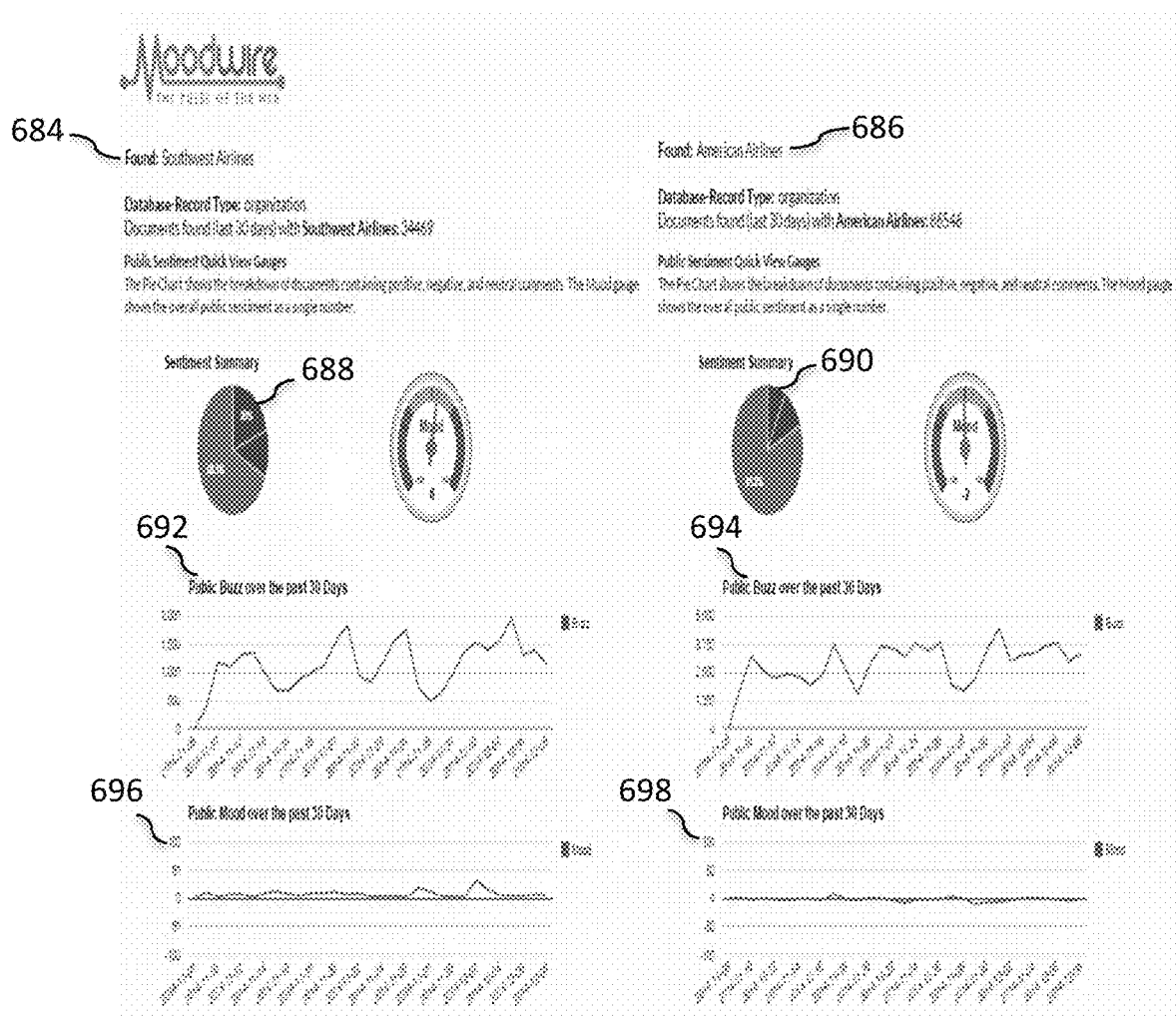
FIG. 38 is a graphical diagram illustrating one embodiment of the opinion search result, which provides sentiment summaries, public buzzes, and public moods for two entities in accordance with the present disclosure.

FIG. 38 is a graphical diagram illustrating one embodiment of the opinion search result that provides sentiment summaries, public buzzes and public moods for two entities. In the query box 652, a user may enter a query term, which compares Southwest Airlines 684 with American Airlines 686. The opinion search engine 20 is configured to compute, process, and display the results with sentiment summaries, public buzzes, and public moods for both entities side by side, which may reveal the public opinions about the two airlines. In this example, Southwest Airlines has a higher percentage of positive sentiment 688 over the positive sentiment 690 of American Airlines. The public buzz chart 692 for Southwest Airlines and the public buzz chart 694 for American Airlines appear to be somewhat similar, although American Airlines has a greater amount of public comments over the same time period. Southwest Airlines, however, has a higher public mood chart 696 relative to a public mood chart 698 for American Airlines.

FIGS. 39A-O are graphical diagrams illustrating the different examples of opinion search results from the opinion search engine 20 with the visual transformed structural representation. In one embodiment, the visual transformed structural representation comprises a tree map. FIG. 39A is a sample search result 700 for "air transportation". The result visual transformed page 300 displays the record type and the number of air transportation related documents found within the last 30 days on the production data storage aggregate 34. The result visual transformed page 700 displays some general information about the air transportation industry, with a geometric region 702 that comprises top ranked companies based on the amount of social media electronic messages. The size of each sub-geometric region for a particular company reflect the percentage of textual data relative to the entire body of the textual data for the ranked companies in air transported industry shown in the geometric region 702. The color of the block displayed reflects the majority sentiment, such as positive (coded as green) sentiment or negative (coded as red) sentiment, toward the entity name within the block. In this example, JetBlue Airways has a block color in green to reflect the generally public positive sentiment, while United Airlines has block color in red to reflect the generally public negative sentiment. The structural visual mapping representation can also displays the different entities by the size of the block.

Figure 39K:
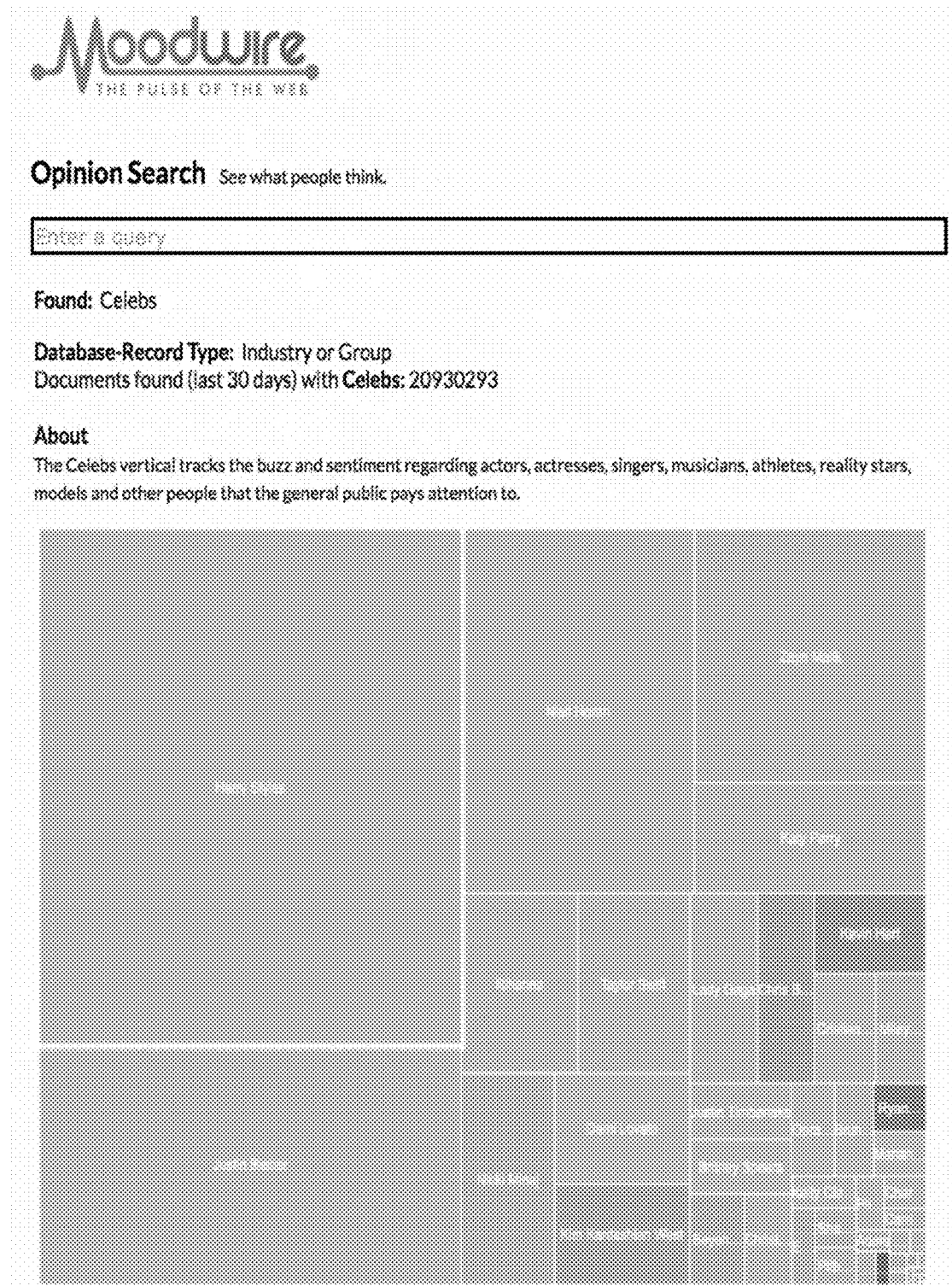
FIGS. 39A-O are graphical diagrams illustrating the different examples of opinion search results from the opinion search engine with the visual transformed structural representation in accordance with the present disclosure.
FIG. 39B is an embodiment of the search result for motor vehicles.
FIG. 39C is an embodiment of the search result for regional bank.
FIG. 39D is an embodiment of the search result for US state capitals.
FIG. 39E is an embodiment of the search result for S&P 500 Index.
FIG. 39F is an embodiment of the search result for NBA teams.
FIG. 39H is an embodiment of the search result for NHL teams.
FIG. 39I is an embodiment of the search result for MLB teams.
FIG. 39J is an embodiment of the search result for actors.
FIG. 39L is an embodiment of the search result for singers.
FIG. 39M is an embodiment of the search result for US senate.
FIG. 39N is an embodiment of the search result for professional bull riders.
Figure 39M:
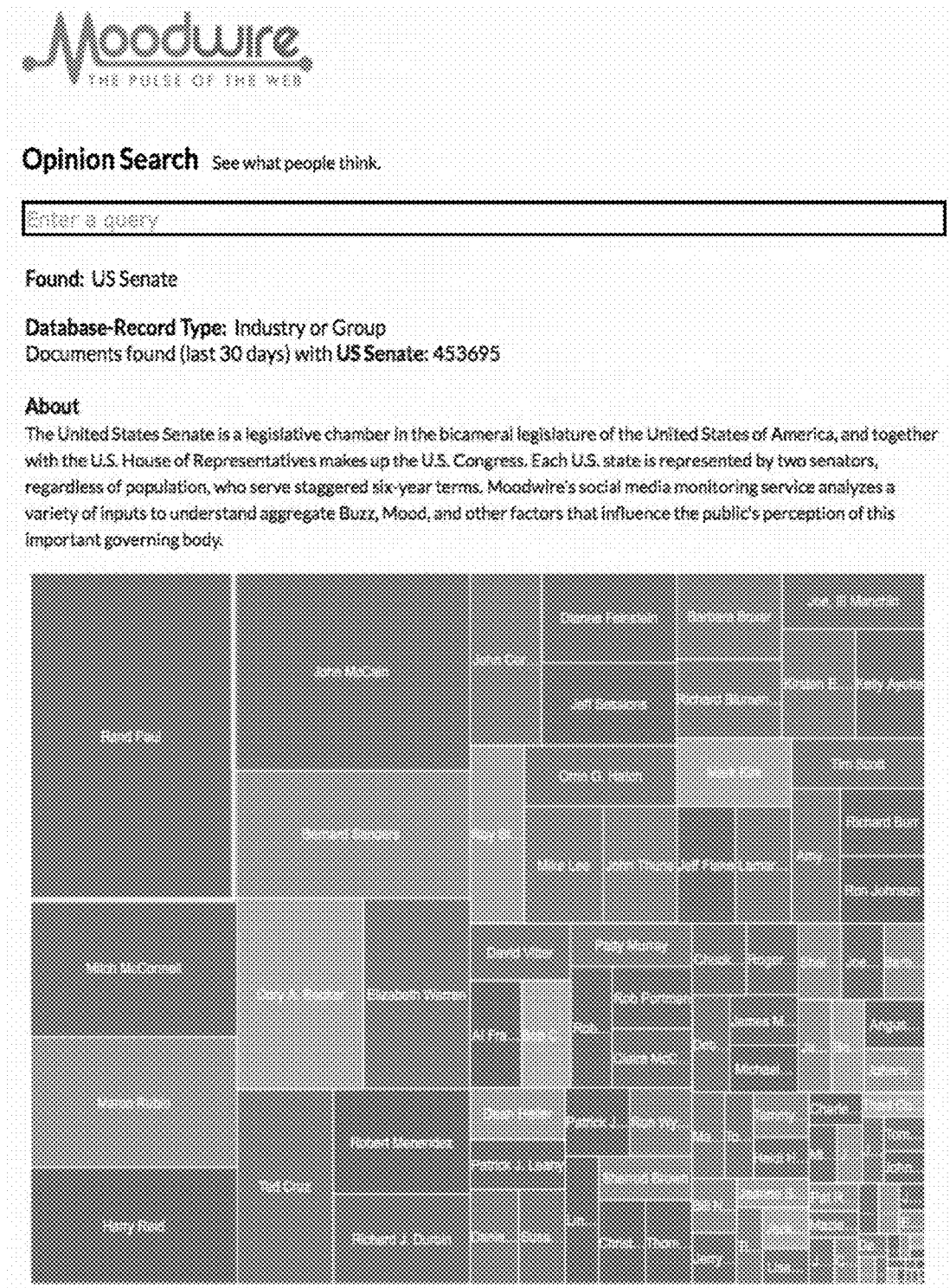

In this embodiment of the displayed result, the blocks are organized by size from top to bottom and then left to right such that the top left corner of the visual mapping representation structure is the entity with the most number of related documents for the topic. The other diagrams in FIGS. 19B-O illustrate similar types of process and display result for different query, entities, or industry. FIG. 19B is a sample search result for motor vehicles industry over the last 30 days with substantial public sentiments about BMW, Mercedes, Toyota and others; FIG. 39C is a sample search result for regional banks industry over the last 30 days with HSBC dominating the public sentiments from social medial sites; FIG. 39D is a sample search result for US state capitals over the last 30 days with substantial public sentiments about Phoenix, Denver and others; FIG. 39E is a sample search result for S&P 500 Index over the last 30 days with substantial public sentiments about eBay Inc., Starbucks Corp., Facebook Inc. Starwood Hotel and Resorts, Wal-Mart Stores Inc., and others; FIG. 39F is a sample search result for NBA teams over the last 30 days with fairly equally distributed public sentiments over many NBA teams; FIG. 39G is a sample search result for NFL teams over the last 30 days with substantial public sentiments about New England Patriots, Seattle Seahawks, Dallas Cowboys, Pittsburgh Steelers, Baltimore Ravens, and others; FIG. 39H is a sample search result for NHL teams dominated by Washington Capitals over the last 30 days; FIG. 39I is a sample search result for MLB teams dominated by San Francisco Giants over the last 30 days; FIG. 39J is a sample search result for actors over the last 30 days with substantial public sentiments about Justine Bieber, Ariana Grande, and others; FIG. 39K is a sample search result for celebs or celebrities over the last 30 days with substantial public sentiments about Harry Styles, Justin Bieber, Niall Horan and others; FIG. 39L is a sample search result for singers over the last 30 days with substantial public sentiments about Harry Styles, Justin Bieber and others; FIG. 39M is a sample search result for US senate over the last 30 days with a substantial amount of public sentiments about several senators, including Rand Paul, John McCain, Mitch McConnell, Bernard Sanders, and others; FIG. 39N is a sample search result for professional bull riders over the last 30 days dominated by the trio of Professional Bull Riders Inc., Ryan Miller, and Carlos Garcia; FIG. 19O is a sample search result for hotels and motels over the last 30 days with substantial public sentiments about Marriott International Inc., Marriott Hotels and Resorts, Hilton Hotels Corp., and others.

Figure 40:
FIG. 40 is a graphical diagram illustrating an embodiment of the word cloud generated from an opinion search result, which shows another visual transformed structural representation by company products in accordance with the present disclosure.

FIG. 40 is a graphical diagram illustrating an embodiment of the word cloud 704 generated from an opinion search result which shows another visual transformed structural representation by company products. In this example, the design of the word cloud 704 comprising of a host of Apple products, which is presented as a combination of horizontal, vertical and color coding of iPad, iPad2, iPhone, iPhone 3GS, iPhone4, iPhone5, iPhone6, iPhone6Plus, Apple MacBook, MacII. The color coding scheme reflect the degree of positive sentiments, the degree of negative sentiments, or neutral sentiments about the various Apple products. As an added feature, the user is able to click on different parts of the word cloud 704 to show the opinion search result for that particular word or Apple product.

Figure 41:
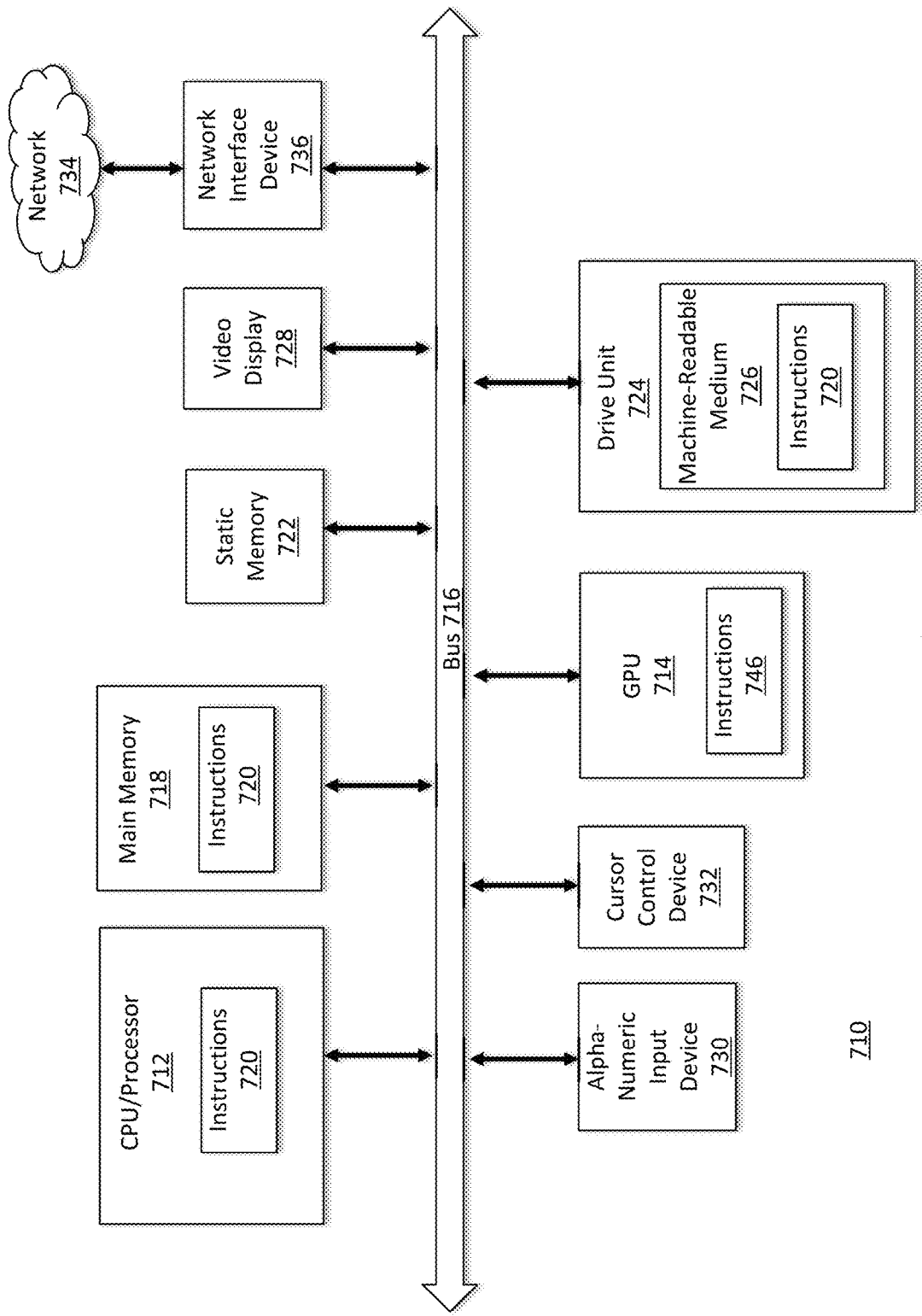
FIG. 41 is a block diagram illustrating an exemplary computer system for processing the push notifications upon which a computing embodiment of the present disclosure may be implemented in accordance with the present disclosure.

FIG. 41 is a block diagram illustrating an exemplary computer system for processing the push notifications upon which a computing embodiment of the present disclosure may be implemented. A computer system 710 includes a processor 712 (e.g., a central processing unit (CPU), a graphics processing unit (GPU), or both) are coupled to a bus 716 or other communication medium for sending and receiving information. The processors 712, 714 may be an example for implementing a computer on the mobile device, or other equivalent processors that are used to perform various functions described herein. In some cases, the computer system 710 may be used to implement the CPU 712 and the GPU 714 as a system-on-a-chip integrated circuit. The computer system 710 also includes a main memory 718, such as a random access memory (RAM) or other dynamic storage device, coupled to the bus 716 for storing information and instructions 720 to be executed by the CPU 712 and the GPU 714. The main memory 718 also may be used for storing temporary variables or other intermediate information during execution of instructions 720 by the CPU 712 and the GPU 714. The computer system 710 further includes a read only memory (ROM) 722 or other static storage device coupled to the bus 716 for storing static information and instructions 720 for the CPU 712 and the GPU 714. A data storage device 724 with a computer-readable medium 726, such as a magnetic disk (e.g., a hard disk drive), an optical disk, or a flash memory, is provided and coupled to the bus 716 for storing information and instructions 720. The computer system 710 (e.g., desktops, laptops, tablets) may operate on any operating system platform using Windows® by Microsoft Corporation, MacOS or iOS by Apple, Inc., Linux, UNIX, and/or Android by Google Inc.

The computer system 710 may be coupled via the bus 716 to a display 728, such as a flat panel for displaying information to a user. An input device 730, including alphanumeric, pen or finger touchscreen input, other keys, or voice activated software application (also referred to as intelligent personal assistant or a software application that uses a natural language user interface) is coupled to the bus 716 for communicating information and command selections to the processor 712. Another type of user input device is cursor control 732, such as a mouse (either wired or wireless), a trackball, a laser remote mouse control, or cursor direction keys for communicating direction information and command selections to the CPU 712 and the GPU 714 and for controlling cursor movement on the display 728. This input device typically has two degrees of freedom in two axes, a first axis (e.g., x) and a second axis (e.g., y), that allows the device to specify positions in a plane.

The computer system 710 may be used for performing various functions (e.g., calculation) in accordance with the embodiments described herein. According to one embodiment, such use is provided by the computer system 710 in response to the CPU 712 and the GPU 714 executing one or more sequences of one or more instructions contained in the main memory 718. Such instructions may be read into the main memory 718 from another computer-readable medium 726, such as storage device 724. Execution of the sequences of instructions contained in the main memory 718 causes the CPU 712 and the GPU 714 to perform the processing steps described herein. One or more processors in a multi-processing arrangement may also be employed to execute the sequences of instructions contained in the main memory 718. In alternative embodiments, hard-wired circuitry may be used in place of or in combination with software instructions to implement the present disclosure. Thus, embodiments of the present disclosure are not limited to any specific combination of hardware circuitry and software.

The term "computer-readable medium" as used herein refers to any medium that participates in providing instructions to the CPU 712 and the GPU 714 for execution. Common forms of computer-readable media include, but are not limited to, non-volatile media, volatile media, transmission media, a floppy disk, a flexible disk, a hard disk, magnetic tape, any other magnetic medium, a CD-ROM, a DVD, a Blu-ray Disc, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read. Non-volatile media includes, for example, optical or magnetic disks, such as the storage device 724. Volatile media includes dynamic memory, such as the main memory 718. Transmission media includes coaxial cables, copper wire, and fiber optics. Transmission media can also take the form of acoustic or light waves, such as those generated during radio wave and infrared data communications.

Various forms of computer-readable media may be involved in carrying one or more sequences of one or more instructions to the CPU 712 and the GPU 714 for execution. For example, the instructions may initially be carried on a magnetic disk of a remote computer. The remote computer can load the instructions into its dynamic memory and send the instructions over a network 734 through a network interface device 736. The bus 716 carries the data to the main memory 718, from which the CPU 712 and the GPU 714 retrieve and execute the instructions. The instructions received by the main memory 718 may optionally be stored on the storage device 724 either before or after execution by the CPU 712 and the GPU 1714.

The network (or communication) interface 736, which is coupled to the bus 716, provides a two-way data communication coupling to the network 734. For example, the communication interface 736 may be implemented in a variety of ways, such as an integrated services digital network (ISDN), a local area network (LAN) card to provide a data communication connection to a compatible LAN, a Wireless Local Area Network (WLAN) and Wide Area Network (WAN), Bluetooth, and a cellular data network (e.g. 3G, 4G). In wireless links, the communication interface 736 sends and receives electrical, electromagnetic or optical signals that carry data streams representing various types of information.

The computer system 710 is a computing machine, which is capable of executing a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The memory 724 includes a machine-readable medium on which is stored one or more sets of data structures and instructions 720 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 720 may also reside, completely or at least partially, within memory 724 and/or within the processor 712 during execution thereof by computer system 710, with memory 718 and processor 712 also constituting machine-readable, tangible media.

The data structures and instructions 720 may further be transmitted or received over a network 734 via network interface device 736 utilizing any one of a number of well-known transfer protocols HyperText Transfer Protocol (HTTP)). Network 734 can generally include any type of wired or wireless communication channel capable of coupling together computing nodes (e.g., the computer system 710). This includes, but is not limited to, a local area network, a wide area network, or a combination of networks. In some embodiments, network 734 includes the Internet.

Certain embodiments are described herein as including logic or a number of components, modules, or mechanisms. Modules may constitute either software modules (e.g., code and/or instructions embodied on a machine-readable medium or in a transmission signal) or hardware modules (or hardware units, or hardware circuits, depending on engineering implementation). A hardware module is a tangible unit capable of performing certain operations and may be configured or arranged in a certain manner. In example embodiments, one or more computer systems (e.g., the computer system 710) or one or more hardware modules of a computer system (e.g., a processor 712 or a group of processors) may be configured by software an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 712 or other programmable processor) that is temporarily configured by software to perform certain operations. It will be appreciated that the decision to implement a hardware module mechanically, in dedicated and permanently, configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 712 configured to using software, the general-purpose processor 712 may be configured as respective different hardware modules at different times. Software may accordingly configure a processor 712, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 712 that are temporarily configured (e.g., by software, code, and/or instructions stored in a machine-readable medium) or permanently configured to perform the relevant operations. Whether temporarily or permanently configured, such processors 712 may constitute processor-implemented (or computer-implemented) modules that operate to perform one or more operations or functions. The modules referred to herein may, in some example embodiments, comprise processor-implemented (or computer-implemented) modules.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed and desired to be secured by Letters Patent of the United States is:

1. A computer-implemented method for conducting an opinion search and generating an opinion visualization result for display on a computer screen, comprising:
   receiving a query to an opinion search engine;
   extracting entity information and attributes from each structured electronic social media message in the plurality of structured electronic social media messages and extracting entity information and attributes from each normalized unstructured electronic social media message in the plurality of unstructured electronic social media messages;
   scoring a composite sentiment value and attributes for the text in each structured electronic social media message or each normalized unstructured electronic social media message,
   storing the scored structured electronic social media messages and the scored normalized unstructured electronic social media message in a database; and
   aggregating the results of the scored structured electronic social media messages and the scored normalized unstructured electronic social media messages for one or more entities organized for display as a transformed visual representation based on the extracted one or more entities from the search query;
   wherein the transformed visual representation comprises a timeline entity graphical view with social media inflections over a period of time and a heat map of social media sentiments for the industry associated with the entity, the size and color coding for each company in the industry dependent on the amount of social medial posts and the type of sentiment.

2. The system of claim 1, wherein the transformed visual representation comprises a single entity graphical view.

3. The system of claim 1, wherein the transformed visual representation comprises a comparison entity graphical view between two similar entities.

4. The system of claim 1, wherein the transformed visual representation comprises a comparison entity graphical view between two dissimilar entities.

5. The system of claim 1, wherein the transformed visual representation comprises a timeline entity graphical view with social media inflections over a period of time.

6. The system of claim 1, wherein the transformed visual representation comprises a generating a group analytics from a groups browser at a group website associated with the opinion search engine.

7. A system for opinion processing and visualization for display on a computer screen, comprising:
- a data acquisition module configured to collection information on entities from structured and unstructured data sources, the data acquisition module configured to combine voluminous structured data from the structure data sources into a normalized representation to be stored in an entity database, each structured data being normalized with encoded one or more attribute for linking to the original structured data source, the data acquisition module configured to normalize the unstructured data from the unstructured data source into a post database;
- an analytics module configured to retrieve and link each post data from the post database to an entity in the entity database, the analytics module configured to determine the sentiment type associated with each electronic post linked to a particular entity, the analytics module configured to score the quality of each electronic post based on a predetermined criteria, the analytics module configured to compare one or more entities over time based on different attributes including buzz ranking and mood ranking, wherein the buzz ranking and the mood ranking for a particular entity are scored relative to the confined number of entities in the entity database; and
- a visualization module configured to aggregate the results of the scored structured electronic social media messages and the scored normalized unstructured electronic social media messages for one or more entities organized for display as a transformed visual representation based on the extracted one or more entities from the search query, the transformed visual representation including buzz ranking and mood ranking;
- wherein the transformed visual representation comprises a timeline entity graphical view with social media inflections over a period of time and a heat map of social media sentiments for the industry associated with the entity, the size and color coding for each company in the industry dependent on the amount of social medial posts and the type of sentiment.

8. The system of claim 7, wherein the transformed visual representation comprises a single entity graphical view.

9. The system of claim 7, wherein the transformed visual representation comprises a comparison entity graphical view between two similar entities.

10. The system of claim 7, wherein the transformed visual representation comprises a comparison entity graphical view between two dissimilar entities.

11. The system of claim 7, wherein the transformed visual representation comprises a timeline entity graphical view with social media inflections over a period of time.

12. The system of claim 7, wherein the transformed visual representation comprises a generating a group analytics from a groups browser at a group website associated with the opinion search engine.

13. The system of claim 7, wherein the electronic social media posts are linked to a particular entity by network similarity which the entity $e_i$ is computed using a different set similarity metrics.

14. The system of claim 13, wherein the network similarity comprises an overlap similarity that measures the overlap between two sets of similarity metrics, which defines the size of the intersection divided by the smaller of the size of the two sets, represented as follows:

$$\text{overlap}(X, Y) = \frac{|X \cap Y|}{\min(|X|, |Y|)},$$

wherein the symbol X represents the entities in the electronic social media posts, and the symbol Y represents the network of entity $e_i$.

15. The system of claim 7, wherein the analytics module comprises an entity identification/extraction module configured group entities into different sets of entity domains for collecting data on the entities that form the basis of topic discussions on social media.

16. The system of claim 7, wherein the different sets of entity domains are constructed with a domain model, the domain model being identified by the terms, phrases and the normalized occurrences in the sampled corpus through a vector space model to model the domain.

17. The system of claim 7, wherein the analytics module comprises an entity identification/extraction module configured for linking of entities by identifying a reference in an electronic social media post to an entity in the entity database, the similarity of a particular electronic social media post to the domain document-term matrix and identifying the most similar domain which the entity is a member of in the entity database.

18. The system of claim 17, wherein the similarity of a particular electronic social media post to the entity:
- if a similarity value is above or equal to a pre-determined adaptive threshold, the link of the electronic social media post to the entity is identified as a match; and
- if a similar value id less than the pre-determined adaptive threshold, the link of the electronic social media post to the entity is identified is not identified as a match.

* * * * *